United States Patent
Kim et al.

(10) Patent No.: US 9,357,446 B2
(45) Date of Patent: May 31, 2016

(54) METHOD AND DEVICE FOR PERFORMING HANDOVER IN MOBILE COMMUNICATION SYSTEM

(71) Applicant: Samsung Electronics Co., Ltd., Gyeonggi-do (KR)

(72) Inventors: Soeng Hun Kim, Gyeonggi-do (KR); Gert Jan Van Lieshout, Middlesex (GB); Sang Bum Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/421,794

(22) PCT Filed: Aug. 14, 2013

(86) PCT No.: PCT/KR2013/007359
§ 371 (c)(1),
(2) Date: Feb. 13, 2015

(87) PCT Pub. No.: WO2014/027852
PCT Pub. Date: Feb. 20, 2014

(65) Prior Publication Data
US 2015/0215825 A1   Jul. 30, 2015

(30) Foreign Application Priority Data

Aug. 14, 2012  (KR) .................. 10-2012-0088995
Sep. 28, 2012  (KR) .................. 10-2012-0109172
Oct. 9, 2012   (KR) .................. 10-2012-0111951
Nov. 2, 2012   (KR) .................. 10-2012-0123712
Nov. 12, 2012  (KR) .................. 10-2012-0127549

(51) Int. Cl.
*H04W 36/00*  (2009.01)
*H04W 76/04*  (2009.01)
(Continued)

(52) U.S. Cl.
CPC ...... *H04W 36/0055* (2013.01); *H04W 36/0088* (2013.01); *H04W 36/30* (2013.01); *H04W 36/38* (2013.01); *H04W 72/0413* (2013.01); *H04W 76/048* (2013.01)

(58) Field of Classification Search
None
See application file for complete search history.

(56) References Cited

U.S. PATENT DOCUMENTS

2010/0197316 A1  8/2010  Aoyama et al.
2011/0199910 A1  8/2011  Oh et al.
(Continued)

FOREIGN PATENT DOCUMENTS

KR  10-2009-0086441  8/2009
KR  10-2010-0042662  4/2010
(Continued)

OTHER PUBLICATIONS

International Search Report dated Nov. 1, 2013 in connection with International Patent Application No. PCT/KR2013/007359, 7 pages.
Written Opinion of International Searching Authority dated Nov. 1, 2013 in connection with International Patent Application No. PCT/KR2013/007359, 4 pages.

(Continued)

Primary Examiner — Christine Duong

(57) ABSTRACT

A method for transmitting a channel state by a terminal in a communication system, according to one embodiment, comprises the steps of: receiving discontinuous reception (DRX) configuration information from a base station; determining whether the terminal is set to transmit channel state information only in onDuration according to a DRX operation; determining whether an arbitrary subframe to be received is a subframe included in onDuration if the terminal is set to transmit the channel state information only in onDuration according to the configuration; and not transmitting the channel state information on the arbitrary subframe if the arbitrary subframe is not a subframe included in onDuration. According to the embodiment, the terminal can efficiently report channel state information.

14 Claims, 38 Drawing Sheets

(51) Int. Cl.
*H04W 36/30* (2009.01)
*H04W 36/38* (2009.01)
*H04W 72/04* (2009.01)

(56) References Cited

U.S. PATENT DOCUMENTS

2011/0237266 A1* 9/2011 Cai .............................. 455/450
2011/0249578 A1* 10/2011 Nayeb Nazar et al. ....... 370/252
2015/0163740 A1* 6/2015 Lee et al. ..................... 370/311

FOREIGN PATENT DOCUMENTS

| KR | 10-2010-0050340 | 5/2010 |
| KR | 10-2011-0129951 | 12/2011 |

OTHER PUBLICATIONS

Extended European Search Report issued for EP 13829244.6 dated Mar. 22, 2016, 11 pgs.
Samsung, "Discussion on CQI/SRS Transmission During DRX", R2-114180, 3GPP TSG-RAN2 #75 Meeting, Aug. 16, 2011, 5 pgs.
Samsung, "Discussion on DRX Cycle and CQI/SRS Transmission", R2-124082, 3GPP TSG-RAN WG2 Meeting #79, Aug. 7, 2012, 5 pgs.
Intel Cororation, "Enhancement of DRX Operation", R2-123976, 3GPP TSG-RAN Meeting #79, Aug. 7, 2012, 3 pgs.
Samsung, "Discussion on Mandating CQI/SRS Transmission During Uncertain Period", R2-124687, 3GPP TSG-RAN WG2 Meeting #79bis, Sep. 28, 2012, 4 pgs.

* cited by examiner

METHOD AND DEVICE FOR PERFORMING HANDOVER IN MOBILE COMMUNICATION SYSTEM

CROSS-REFERENCE TO RELATED APPLICATION(S)

The present application claims priority under 35 U.S.C. §365 to International Patent Application No. PCT/KR2013/007359 filed Aug. 14, 2013, entitled "METHOD AND DEVICE FOR PERFORMING HANDOVER IN MOBILE COMMUNICATION SYSTEM". International Patent Application No. PCT/KR2013/007359 claims priority under 35 U.S.C. §365 and/or 35 U.S.C. §119(a) to Korean Patent Application Nos. 10-2012-0088995 filed Aug. 14, 2012, 10-2012-0109172 filed Sep. 28, 2012, 10-2012-111951 filed Oct. 9, 2012, 10-2012-0123712 filed Nov. 2, 2012 and 10-2012-0127549 filed Nov. 12, 2012, and which are incorporated herein by reference into the present disclosure as if fully set forth herein.

TECHNICAL FIELD

The present invention relates to a handover method and apparatus for use in a mobile communication system.

BACKGROUND ART

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the 3$^{rd}$ Generation Partnership Project (3GPP). LTE is a technology designed to provide high speed packet-based communication of up to 100 Mbps and its standardization is completed almost currently.

In the mobile communication system, supporting mobility is one of the significant issues. Particularly when the terminal is handed over to a cell which is interfered by neighbor cells significantly, the handover is likely to fail due to the failure of acquiring correct information from the target cell.

DISCLOSURE OF INVENTION

Technical Problem

The present invention aims to provide a method and apparatus for facilitating acquisition of information from the target cells even when the terminal undergoes significant interference from neighboring cells in the course of handover.

Solution to Problem

In accordance with an aspect of the present invention, a channel state transmission method of a terminal in a communication system includes receiving Discontinuous Reception (DRX) configuration information from a base station, determining whether the DRX configuration instructs to transmit channel state information only in an on-duration (onDuration) of DRX operation, determining, when the DRX configuration instructs to transmit channel state information only in the onDuration of DRX operation, a subframe to arrive is included in the onDuration, and skipping, when the subframe is not included in the onDuration, transmission of the channel state information in the subframe.

In accordance with another aspect of the present invention, a terminal for transmitting channel state in a communication system includes a transceiver which transmits and receives to and from a base station and a control unit which controls receiving Discontinuous Reception (DRX) configuration information from the base station, determines whether the DRX configuration instructs to transmit channel state information only in an on-duration (onDuration) of DRX operation, determines, when the DRX configuration instructs to transmit channel state information only in the onDuration of DRX operation, a subframe to arrive is included in the onDuration, and controls skipping, when the subframe is not included in the onDuration, transmission of the channel state information in the subframe.

Advantageous Effects of Invention

The present invention is advantageous in that the terminal is capable of reporting channel state information efficiently.

Also, the present invention is advantageous in terms of facilitating handover to a target cell undergoing significant interference from neighboring cells by providing the information inevitable for the handover operation of the target cell.

MODE FOR THE INVENTION

In the following, detailed description of well-known functions and structures incorporated herein may be omitted to avoid obscuring the subject matter of the present invention. Exemplary embodiments of the present invention are described with reference to the accompanying drawings in detail. A description is made of the LTE system and carrier aggregation briefly before explaining the present invention.

Figure 1:
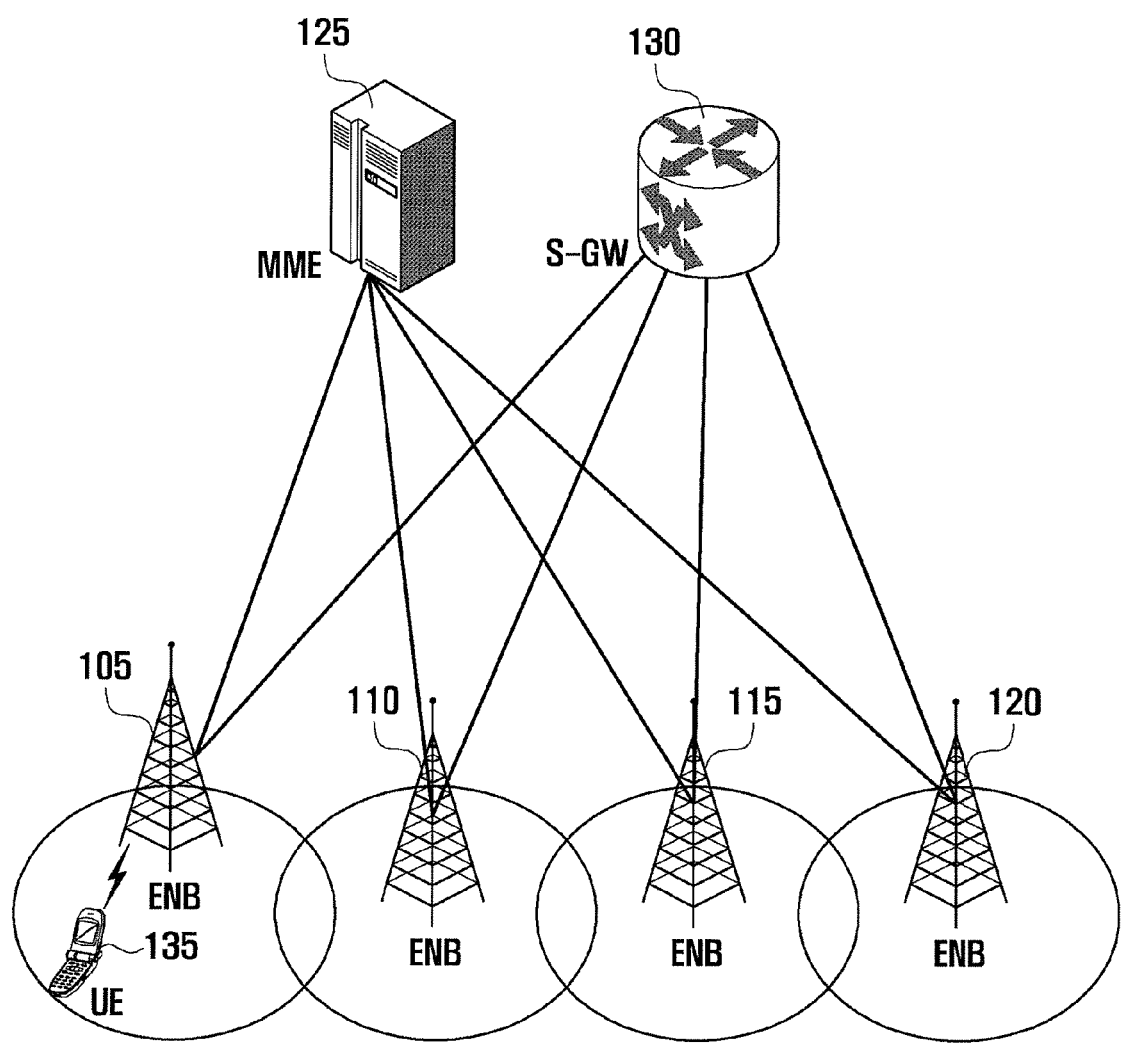
FIG. 1 is a diagram illustrating LTE system architecture to which the present invention is applied.

FIG. 1 is a diagram illustrating LTE system architecture to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UMTS system. The eNBs allow the UE 135 to establish a radio channel and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as buffer states, power headroom states, and channel states of the UEs. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
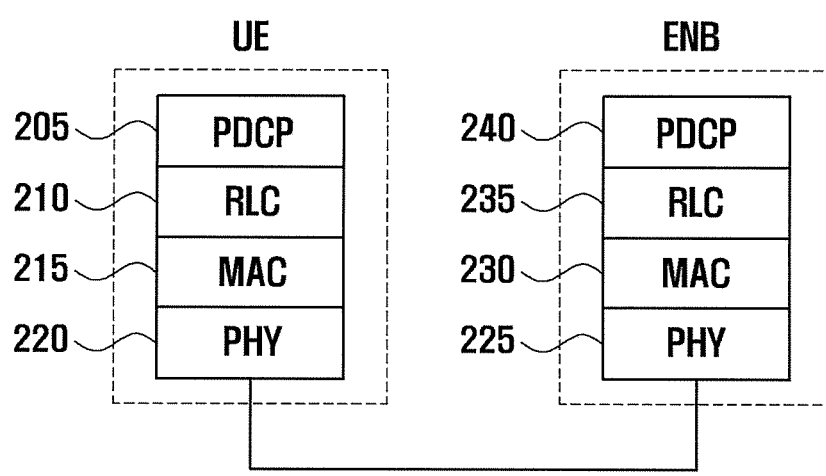
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the upper layer.

When the UE is handed over from a cell A to another cell B, the eNB sends the UE a dedicated RRC control message including partial system information of the cell B in order to negate direct acquisition of the system information of the cell B at the UE. For example, the UE receives the Master Information Block (MIB), System Information Block (SIB) 1 and SIB 2 with the exception of SFN information. After handover to the target cell, the UE communicates with the target cell using the system information received in advance and checks SFN of the cell based on the MIB received at an appropriate time.

If the cell B is a pico cell and experiencing severe interference from the cell A, it is difficult for the UE to acquire the MIB of the target cell after handover to the cell B. This situation may continue until the UE move from the location where the handover is triggered to the cell center and thus the UE operate incorrectly without information.

Figure 3:
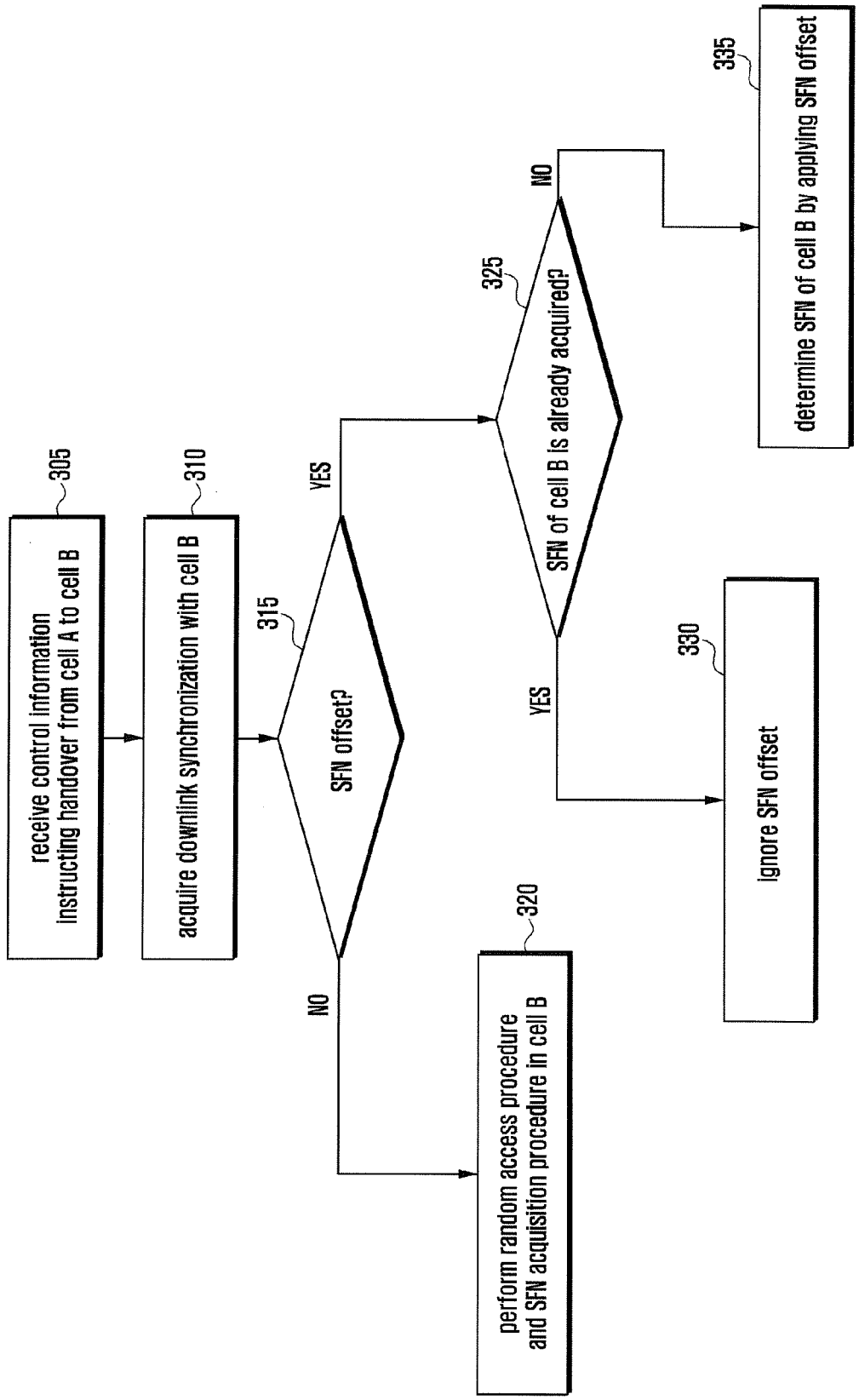
FIG. 3 is a flowchart illustrating the UE operation according to the first embodiment.
Figure 4:
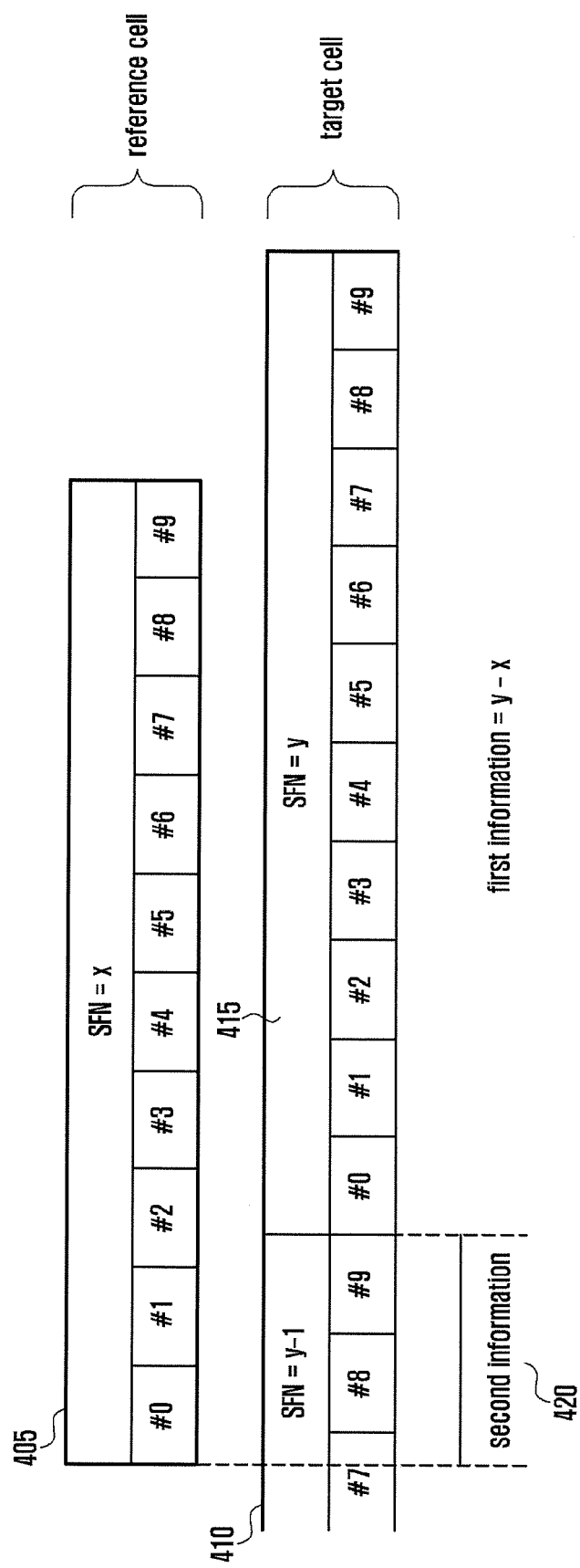
FIG. 4 is a diagram illustrating a System Frame Number (SFN) offset.

FIG. 3 is a flowchart illustrating the UE operation according to the first embodiment. FIG. 4 is a diagram illustrating the SFN offset.

In the embodiment of FIGS. 3 and 4, the SFN offset between the source and target cells is sent to the UE such that the UE operates correctly based thereon even when it fails to acquire the SFN from the target.

The UE operation is described hereinafter.

The UE receives an RRC control message commanding handover from an eNB at step 305.

The UE acquires downlink synchronization with the target cell and perform a random access procedure based on the information included in the RRC control message at step 310.

The UE determines whether the RRC control message includes SFN offset information at step 315. If so, the procedure goes to step 325 and, otherwise, step 320.

If the handover to the target cell is completed, the UE sends the target cell a handover complete message and performs an MIP acquisition procedure to acquire SFN of the target cell at step 320. That is, the UE receives and decodes the MIB at the first subframe of every radio frame by applying a predetermined MCS on predetermined frequency resource (e.g. center frequency resource). If the MIB is decoded successfully, the UE applies the MSB 10 bit of the SFN indicated by the MIB to determine the SFN of the current radio frame.

At step 325, the UE determines whether the SFN of the target cell is acquired. For example, the UE may have acquired SFN already during the measurement on the target cell before the handover. If the SFN has been acquired already, the UE ignores the SFN offset information and determines the SFN of the current cell by applying the previously acquired SFN information at step 330. If the handover is completed, the UE sends the target cell a control message notifying that the handover is completed successfully. Otherwise if no SFN has been acquired, the UE calculates the SFN of the current cell by applying the SFN offset information at step 335. The SFN offset information includes the first information indicating the difference between the SFNs of the reference cell and the target cell and the second information indicating the difference between the subframe 0 of the reference cell and the subframe 0 of the target cell. The SFN of the target cell to be used for acquiring the first information may be the SFN of the radio frame which is later in time than but closest to the radio frame of the reference cell among the radio frames of the target cell. Also, it may be the SFN of the radio frame which is earlier in time than but closest to the radio frame of the reference cell. For example, if there are the radio frames 410 and 415 of the neighbor target cell which are close in time to the radio frame 405 of the reference cell, the first information is the difference between the SFNs of the radio frames 405 and 415, i.e., y-x.

The second information is the difference between a predetermined subframe of the reference cell and a predetermined subframe of the target cell, i.e., the difference between the $0^{th}$ subframes as denoted by reference number 420.

The UE maintains the radio frame boundary and SFN of the source cell until the handover to the target cell is completed, identifies the radio frame boundary of the target cell ager the handover to the target cell is completed, and adds the first information to the SFN of the radio frame of the source cell which precedes and is closest to the radio frame boundary to acquire the SFN.

Also, the UE may identify the subframe boundary of the target cell and the radio frame boundary of the frame including the subframe by applying the first and second informations to calculate the SFN of the radio frame.

In order to check the SFN offsets of the neighbor cells, the eNB may command the UE to measure the SFN offset. The reason for checking the SFN offsets of the neighboring cells is because the UE cannot acquire the MIB at the cell boundary area of the neighboring cell due to the severe interference of the neighboring cells. Accordingly, in order to acquire the SFN offset associated with the cell (e.g., pico cell) from which it is difficult to acquire MIB due to the interference, the eNB instructs the UE located in a cell having the center frequency different from the center frequency of the pico cell to acquire the SFN offset. This is because the UE is capable of approaching the center of the pico cell to acquire the SFN offset while maintain the connection with the current cell.

In order to accomplish this, a Self-Organized Network (SON) is used in the present invention. In SON, if an unknown cell is found around, the eNB instructs the UE to report the cell Global Identifier (CG) of the cell, and the UE tries to receive the SIB1 of the corresponding cell during a predetermined period (hereinafter, T321). If the SIB1 is received successfully, the UE report the CGI information and PLAIN identifier included in the SIB1 to the eNB.

In the present invention, the eNB instructs the UE to SFN offset along with report CGI. The T321 is applied differently depending on whether the SFN offset report is configured or not such that the user measure the SFN offset more correctly.

Figure 5:
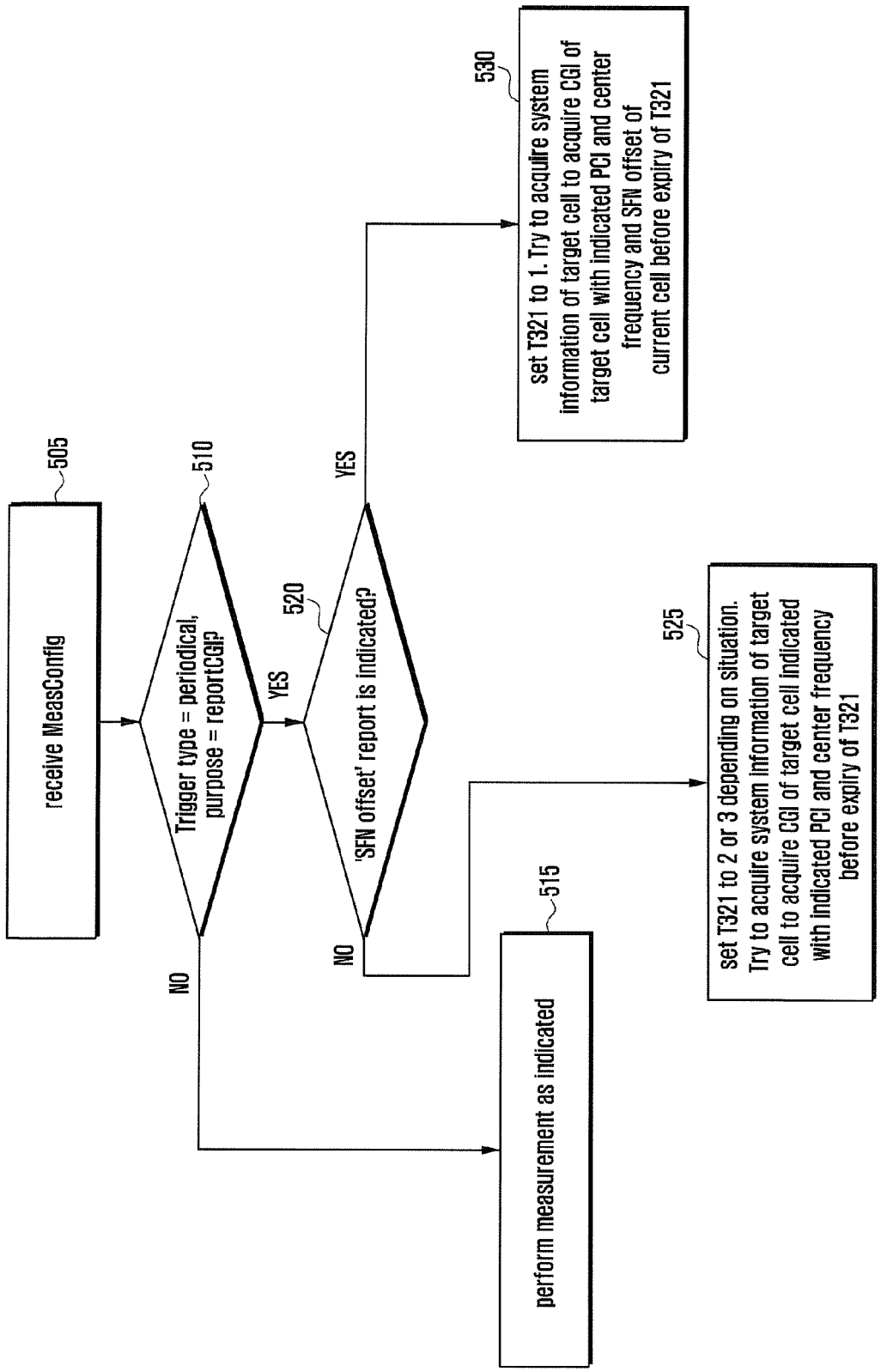
FIG. 5 is a flowchart illustrating another UE operation according to the first embodiment.

FIG. 5 is a flowchart illustrating another UE operation according to the first embodiment.

Referring to FIG. 5, the UE receives measurement configuration information (measConfig) form the eNB at step 505. The measurement configuration information includes measurement target and measurement report trigger information. The measurement target information includes center frequency information and physical cell identifier (PCI), and the measurement report trigger information includes the information on whether the measurement is event-driven, periodic, or upon receipt of the information such as CGI information which the eNB commands to receive.

The UE determines whether the measurement configuration information includes the trigger type set to 'periodic' and the purpose set to 'CGI report' at step 510. If the information is not included, the UE performs measurement and reports measurement result according to the legacy technology at step 515. If the information is included, the UE determines whether the SFN offset report is indicated at step 520. If the SFN offset report is indicated, the procedure goes to step 530 and, otherwise, step 525.

At step 525, the UE sets the T321 to an appropriate value according to condition 1.

[Condition 1]

If an autonomous gap for use in measurement is indicated, the UE sets the T321 to value 2 and, otherwise, value 3.

The autonomous gap is of generating and using a gap (time duration for muting transmission/reception) arbitrarily for the UE to perform measurement without acceptance of the eNB. In the case of using the autonomous gap, it is preferred to set the T321 to a small value to avoid communication failure between the UE and the eNB. That is, the value 2 has to be less than the value 3.

The UE tries to acquire the SIB1 of the cell identified with the PCI and the indicated center frequency until the T321 expires. If the SIB1 is acquired before expiry of the T321, the UE sends the eNB a predetermined RRC control message including the CGI and PLMN identifier included in the SIB1. If it fails to acquire the information before expiry of the T321, the UE sends the eNB a predetermined RRC control message including the information acquired successfully.

The UE sets the T321 to a predetermined value 1 at step 530. The UE tries to acquire the MIB and SIB1 of the cell identified with the PCI and indicated center frequency before expiry of the T321. If the MIB and SIB1 are acquired before expiry of the T321, the UE calculates the SFN offset between the current serving cell and the target cell using the SFN information of the target cell which is acquired from the MIB. Next, the UE sends the eNB a predetermined RRC control message including the SFN offset and the CGI and PLMN identifier of the target cell. If the above information is not acquired before expiry of the T321, the UE sends the eNB a predetermined RRC control message including the information acquired successfully.

When the UE is handed over from a macro cell to a pico cell, if may be difficult to receive the SIB1. Unlike MIB, since the SIB1 is transmitted on the frequency resource varying dynamically, it is impossible to apply an interference cancellation scheme and this may result in a severe problem. The SIB1 carries scheduling information of other system information or TDD configuration information. Accordingly, if the UE fails to receive the SIB1 correctly, it may be difficult to receive other system information.

In the present invention, if the UE is handed over to a pico cell in which it may be difficult to receive the SIB1, a dedicated RRC control message is used for the source cell to provide the UE the SIB1 information. Even when the system information is modified after the UE's handover to the pico cell, the SIB1 information is provided through the dedicated RRC control message.

From the viewpoint of the eNB, although the SIB1 is provided to the UE experiencing severe interference from the current macro cell through the dedicated control message, it is possible to provide the other UEs with the SIB1 by applying a normal system information modification procedure. That is, the UE which receives the SIB1 through the dedicated control message also may receive the paging information notifying of the modification of the system information. According to the conventional technology, the UE which has received the above information determines whether it is necessary to receive the modified system information based on the SIB1 received through a common channel. The UE which receives the SIB1 through the dedicated control message is likely to be in an environment difficult to receive the SIB1 through the common channel and thus it is likely to be useless for the UE to try to receive the SIB1, resulting in unnecessary battery consumption. In order to solve this problem, if the SIB1 or control information included in the SIB1 is received through the dedicated control message, the UE assumes that there is no need of receiving the SIB1 through the common channel during a predetermined period in the present invention. The SIB1 transmitted through the dedicated control message is referred to as dedicated SIB1, and the SIB1 transmitted through the common channel is referred to as common SIB1. The dedicated SIB1 may include part of the information carried in the common SIB1 but the included information is identical with that of the common SIB1.

Figure 38:
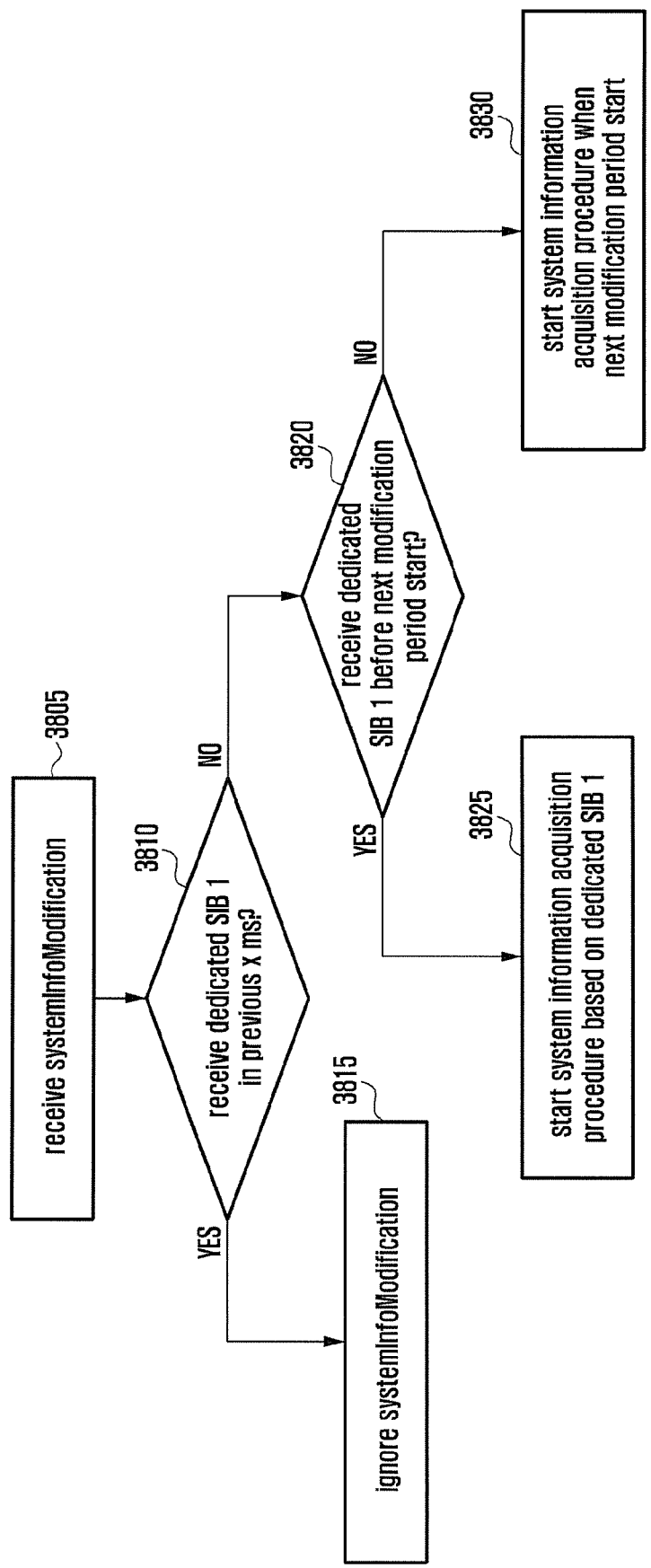
FIG. 38 is a flowchart illustrating the UE operation procedure according to another embodiment of the present invention.

FIG. 38 shows the UE operation.

The UE receives systemInfoModification at step 3805. The systemInfoModification is the control information notifying the UE of the modification of the system information and transmitted to the UE through the paging message. The UE in the connected state receives the paging message at least once at a predetermined interval to detect the systemInfoModification.

The UE determines whether the dedicated SIB1 has been received in x ms before the receipt of the paging message at step 3810. The dedicated SIB1 is transmitted from the eNB to the UE through the dedicated RRC control message and includes predetermined control information as a part of the original system information. The dedicated SIB1 may include the information as follows.

System information scheduling information: Information indicating the interval and time period of transmission of system informations.

value tag: Integer incrementing by 1 whenever the system information is modified. The UE determines whether to receive the modified system information by referencing the value tag.

TDD configuration information: Information provided when the corresponding cell is the cell operating in TDD. This is a predetermined integer indicating a pattern of downlink and uplink subframes.

If the dedicated SIB1 has been received in the previous x ms, this means that the UE has performed the new system information acquisition procedure already based on the dedicated SIB1, the UE ignores the received systemInfoModification at step 3815. That is, the UE does not attempt receiving the common SIB1. Otherwise if the dedicated SIB1 has not been received in the previous x ms, the procedure goes to step 3820.

At step 3820, the UE determines whether the dedicated SIB1 is received before the next modification period starts. If the dedicated SIB1 is not received before the start of the next modification period, the UE starts a system information acquisition procedure from the start time of the next modification period at step 3830. That is, the UE tries to receive the common SIB1 at the start time of the next modification period and, if the common SIB2 is received, determines whether the rest system information is received by referencing the value tag. If the dedicated SIB1 is received in the middle of attempting to receive the common SIB1, the UE stops attempting receipt of the common SIB1, determines whether to receive the rest system information by referencing the value tag of the dedicated SIB1, and checks the time duration for receiving the rest system information. The modification period means the minimum period in which the system information can be modified. That is, the system information may be modified typically at the start time of the modification period but not in the modification period. This is for allowing a plurality UEs to apply the newly modified system information simultaneously.

If the procedure goes to step 3825, this means that the UE has received the dedicated SIB1 before the start of the next modification period. If UE postpones the application of the dedicated SIB1 to the next modification period, this may affect bad influence to the system. For example, if the modified system information is the TDD configuration information and if the UE uses the old TDD configuration information to the next modification period, severe interference may occur. Accordingly, upon receipt of the dedicated SIB1, the UE applies the dedicated SIB1 immediately unlike the normal system information modification procedure. For example, the UE determines whether to acquire the rest system information by referencing the value tag and, if it is necessary to receive the rest system information, starts the procedure for acquiring the rest system information immediately. At this time, although the system information is acquired wholly in the current modification period, the UE receives the system information in the next modification period again to prepare for the modification of the rest system information in the next modification period. Also, if the dedicated SIB1 is received, the UE may apply the control information, e.g. TDD configuration, included in the SIB1 immediately but the value tag to the next modification period. In this case, the UE starts the rest system information acquisition at the start time of the next modification period.

If it is determined to modify the system information in the $[n+1]^{th}$ modification period, the eNB has to send the UE the dedicated SIB1 before the start of the $[n+1]^{th}$ modification period. However, the dedicated SIB1 may be transmitted even when the dedicated SIB1 is transmitted to the UE after the start of the $[n+1]^{th}$ modification period due to the retransmission on the RLC layer. In order to prepare for such a case, if the dedicated SIB1 is received in the $m^{th}$ modification period, the UE determines whether the value tag of the SIB1 is different from the value tag received most recently (or value tag stored in the UE). if the tow values mismatch, this means that it is necessary to acquire the system information, and thus the UE receives predetermined system information, e.g. SIB2, immediately by referencing the system information scheduling information included in the dedicated SIB1. Although the rest system information is received successfully before the end of the $m^{th}$ modification period, the UE receives the rest system information one more time in the $[m+1]^{th}$ to apply the system information received in the $[m+1]^{th}$ or later finally. Accordingly, the rest system information received in the $m^{th}$ modification period is applied until receiving the rest system information again in the $[m+1]^{th}$ modification period or later, and the rest system information received in the $[m+1]^{th}$ modification period or later is applied finally. The rest system information means the system information which the UE in the connected state has to receive with the exception of the SIB1.

Second Embodiment

In order to accomplish the above objective, the LTE mobile communication system adopts Discontinuous Reception operation which allows the UE to transmit uplink control signal only in the active time to minimize UE power consumption. However, the current discontinuous reception operation is inefficient for the service generating uplink data periodically such as VoIP.

This is because the UE has to check PDCCH at every 8 ms per HARQ process to determine whether to apply adaptive retransmission.

Figure 6:
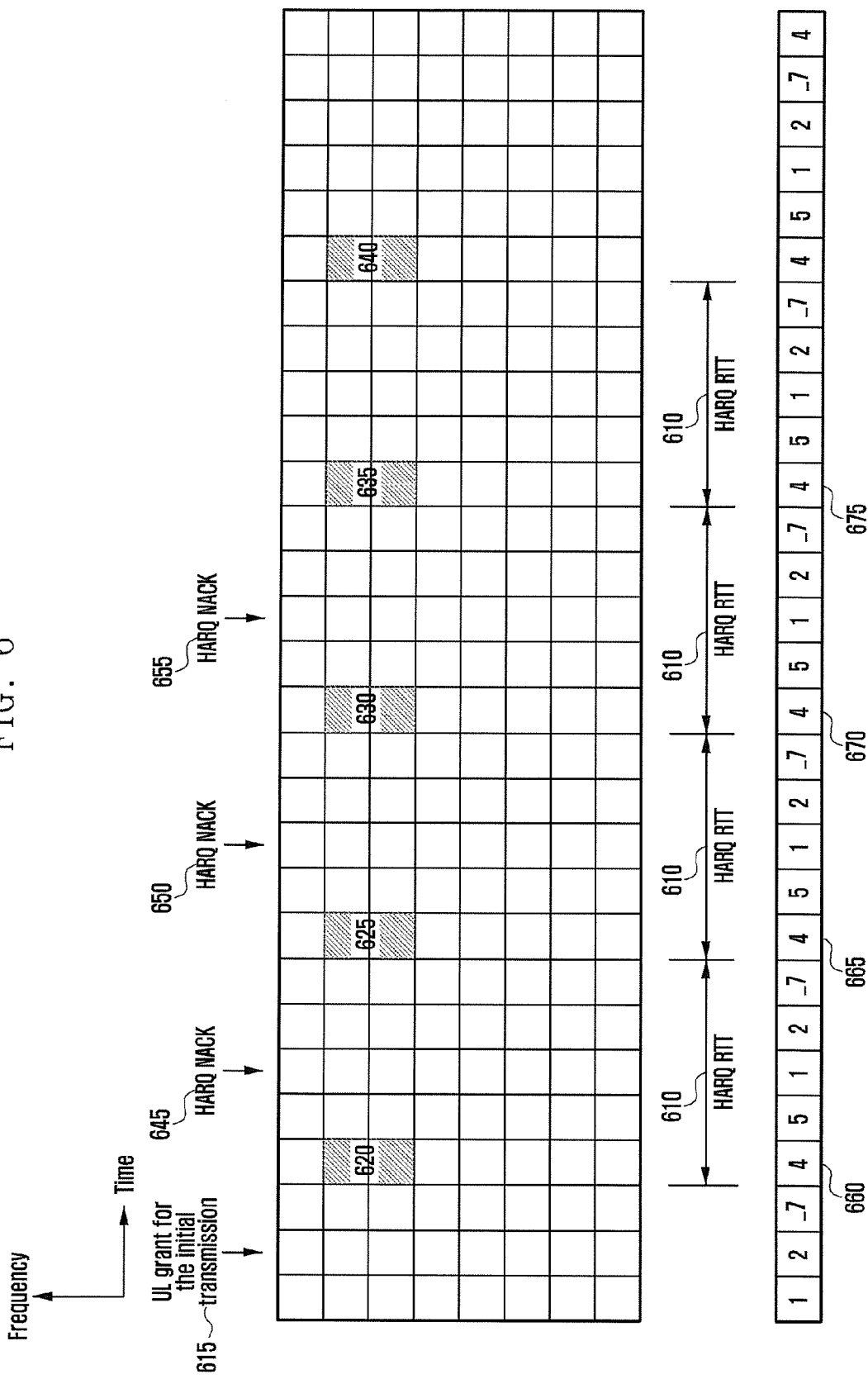
FIG. 6 is a diagram illustrating uplink transmission in the LTE system.

FIG. 6 is a diagram illustrating uplink transmission in the LTE system.

Referring to FIG. 6, the uplink transmission resource is the frequency/time resource. In the LTE mobile communication system, the unit transmission resource is defined by a frequency band having a predetermined width during a timeslot having a predetermined length. One regular quadrilateral denotes the unit transmission resource, and the unit transmission resource is referred to as resource block. The resource block is 1 msec on the time axis and referred to as subframe or Transmission Time Interval (TTI).

The eNB scheduler allocates the UE the uplink transmission resource through a control channel called Physical Downlink Control Channel (PDCCH), and the allocated transmission resource can be used for transmitting and retransmitting the same packet at an interval of HARQ Round Trip Time (RTT) 610 on the time axis.

The UE performs initial transmission of uplink data through the allocated transmission resource 620 and analyzes the HARQ feedback information received at a predetermined time to determine whether to perform HARQ retransmission. if the HARQ feedback information is HARQ Negative Acknowledgement (NACK) as denoted by reference number 645, the UE retransmits the data using the same transmission resource 625 at the next HARQ transmission timing. The data retransmission is repeated until the HARQ ACK is received. That is, if the HARQ feedback information is HARQ NACK as denoted by reference number 650, the UE retransmits the data using the same transmission resource 330 at the next HARQ retransmission timing.

Afterward, if the HARQ ACK is received as denoted by reference number 655, the uplink data transmission procedure ends. As described above, in the synchronous HARQ process, if the HARQ NACK is received, the uplink transmission resource is allowed automatically. Since it is not preferred to transmit the same data over a predetermined number of times in view of transmission efficiency, the maximum number of retransmissions is limited. For example, if the maximum number of retransmissions is set to 3, the UE determine the transmission resource is invalid after three retransmissions although the HARQ ACK is not received. If the HARQ NACK is received repeatedly on the transmission resources 625, 630, and 635, the UE determines that the transmission resource 640 is invalid after the last retransmission 635 which is determined based on the maximum number of retransmissions and discards the data stored in the buffer. The initial transmission and retransmission are performed in the same HARQ process. The HARQ process includes the soft buffer for buffering the HARQ data, and the transmitter stores the data to be transmitted and the receiver stores the received data. If the retransmitted data is received in a certain HARQ process, the data stored in the process and the received retransmission data re soft-combined. The HARQ process is allocated an identifier. In the synchronous HARQ, the HARQ process identifier corresponds to the data transmission/reception time one by one, and the transmission and the retransmission are performed always in the processing indicated by the same identifier. For example, the time when the data transmitted on the transmission resource 620 replaced by a specific HARQ identifier, e.g. process 4, and the data retransmission is performed at the timings 660, 665, 670, 675, and 680 corresponding to the processor 4. In the normal HARQ operation as above, if the HARQ ACK is received, it is determined that the corresponding data is transmitted successfully and notifies the upper layer of the successful transmission.

Figure 7:
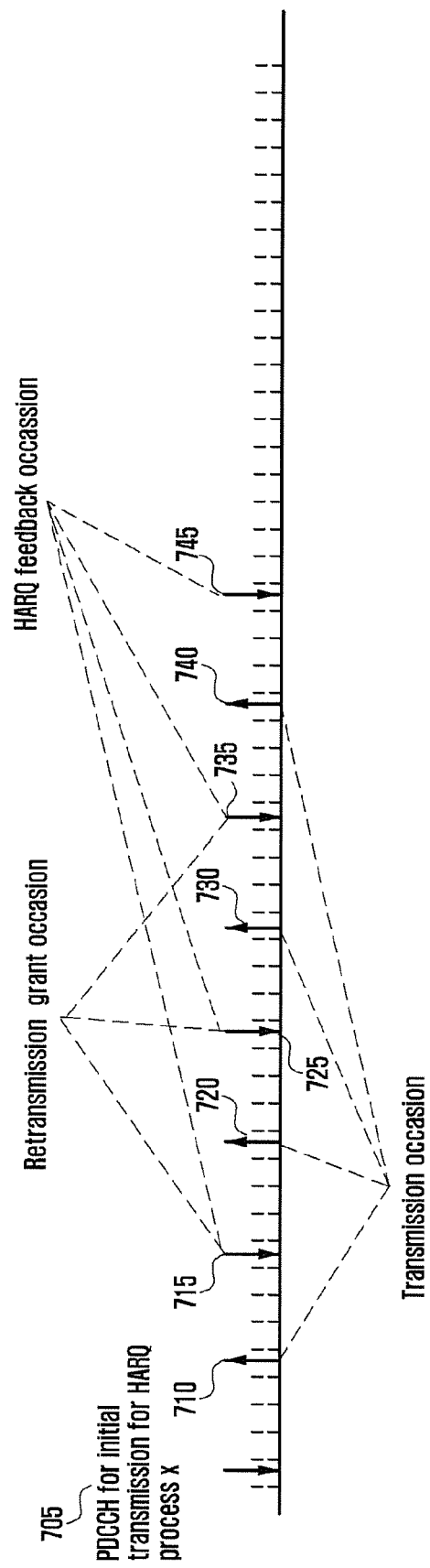
FIG. 7 is a diagram illustrating uplink transmission on the time axis in the LTE system.

FIG. 7 is a diagram illustrating uplink transmission on the time axis in the LTE system.

Referring to FIG. 7, the uplink transmission of the UE is performed in such a way that the UE is allocated uplink transmission resource and acquires the size of packet for transmission and MCS information to be applied. The above information is carried in a control message called uplink grant which is transmitted in a predetermined format on the physical channel called PDCCH. The grant message may indicate initial transmission or adaptive retransmission using a predetermined field. If the grant message for the initial transmission is received in a HARQ process x at a certain timing as denoted by reference number 705, the UE performs initial transmission on the transmission resource allocated at the TTI after 4 TTIs since the TTI at which the uplink grant is received as shown in part 710. For example, if the grant message for initial transmission is received at $y^{th}$ TTI, the initial transmission is performed at $(y+4)^{th}$ TTI. Afterward, the UE may perform the HARQ retransmission of the MAC PDU at every $8^{th}$ TTI. The HARQ retransmission is allowed until the CURRENT_TX_NB reaches the maxim number of transmissions. In an embodiment, the TTIs at which the UE is capable of performing HARQ transmission and retransmission for a certain HARQ process are referred to as transmission occasions. Assuming that the maximum number of transmissions is 4, there are transmission occasions 710, 720, 730, and 740 in FIG. 7. If a NACK is received at the previous feedback occasion or if the grant message indicating adaptive retransmission at the retransmission grant occasion, the UE performs uplink transmission at the transmission occasion and, otherwise, skips uplink transmission even at the transmission occasion. The feedback occasion is the time after 4 TTIs since the time when the uplink transmission has been performed. In FIG. 7, time points 715, 725, 735, and 745 may be the feedback occasions or not depending on whether the uplink transmission is performed at the transmission occasion. The retransmission grant occasions are the time points where the grant message indicating adaptive retransmission is supposed to be received and TTIs occurring at every 8 TTIs since the initial transmission between the initial transmission grant receipt occasion 705 and the last transmission occasion 740. It is noticed that the retransmission grant occasion and the feedback occasion are identical with each other. This is because the feedback occasion occurs after 4 TTI since a certain uplink transmission and the retransmission grant occasion precedes a certain uplink transmission as much as 4 TTIs.

As shown in FIG. 7, upon receipt of the grant message indicating initial transmission, the UE can determine the transmission occasion and retransmission grant occasion as follows. In the following equation, y denotes the time point when the grant indicating initial transmission is received, and n denotes the maximum number of transmissions.

$$\text{transmission occasion}=(y+4)^{th}\ TTI, (y+4+1\times 8)^{th}\ TTI, (y+4+2\times 8)^{th}\ TTI, \ldots, (y+4+(n-1)\times 8)^{th}\ TTI$$

$$\text{retransmission grant occasion}=(y+1\times 8)^{th}\ TTI, (y+2\times 8)^{th}\ TTI, \ldots, (y+(n-1)\times 8)^{th}\ TTI$$

The UE increases CURRENT_TX_NB by 1 whenever the transmission occasion calculated above arrives regardless whether transmission occurs actually and monitors the PDCCH at ever retransmission grant occasion to detect receipt of the grant message indicating adaptive retransmission.

The uplink transmission operation is identical with the semi-persistent resource-based transmission with the except that the uplink grant indicating initial transmission is not received. That is, after transmitting the packet on the semi-persistent transmission resource, the UE monitors PDCCH at every retransmission grant occasion until the last transmission occasion of the packet expires.

Typically, the semi-persistent transmission resource for VoIP occurs at an interval of 20 msec, and the maximum number of transmissions is 5 or 6. Although it depends on the channel condition of the UE, it is inefficient to monitor PDCCH at every retransmission grant occasion to the last transmission occasion in view of battery consumption by taking notice that the packet is transmitted successfully after 2 or 3 transmissions in most cases. Particularly for the battery constrained UE, the battery lifespan shortage problem caused by unnecessary power consumption is more influential than the gain obtained through the adaptive retransmission. In order to solve this problem, the present invention proposes a method and apparatus for monitoring PDCCH to determine whether to restrict or disable or enable the adaptive retransmission selectively for the UE for which battery saving is important, e.g. the UE operating in DRX mode.

For explanation convenience, the terms related to DRX are described briefly hereinafter.

Active Time: Time duration in which the UE monitors PDCCH in the DRX mode. The time duration for monitoring PDCCH to receive the adaptive retransmission grant is included in the active time. In more detail, the active time is defined as follows. Detailed description thereof is specified in 36.321.

At least one of onDurationTimer, drx-InactivityTimer, drx-RetransmissionTimer, and mac-ContentionResolutionTimer is running. Hereinafter, referred to as the first type Active Time A scheduling Request is set on PUCCH and is pending. Hereinafter, referred to as the second type Active Time.

An uplink grant for a pending HARQ retransmission can occur and there is data in the corresponding HARQ buffer. Hereinafter, referred to as the third type Active Time. If the uplink grant for the pending HARQ retransmission occurs, this means that the uplink grant indicating adaptive retransmission occurs.

A PDCCH indicating a new transmission addressed to the C-RNTI of the UE has not been received after successful reception of a Random Access Response for the preamble not selected by the UE). Hereinafter, referred to as the fourth type Active Time.

This embodiment relates to a method for saving the battery power of the UE by adjusting the third type Active type. The onDurationTimer, drx-InactivityTimer, and drx-RetransmissionTimer are the timers set by the eNB to the respective values for the UE to monitor PDCCH when a predetermined condition is fulfilled.

If a subframe is included in at least one of the first to fourth type active times, the subframe belongs to the Active Time such that the UE monitors PDCCH.

Non Active Time: Time duration in which the UE does not monitor PDCCH in DRX mode. This is the sleep time in the entire period with the exception of the active time.

Typically, the UE operating in the DRX mode turns off the power to the transceiver at all times except for the active time so as to minimize power consumption. In the case of VoIP, the uplink initial transmission occurs at every 20 msec and if the UE transitions to the active time at each retransmission occasion up to the last transmission occasion for receiving PDCCH, this causes a waste of battery power for receiving the adaptive retransmission grant transmitted at a low incidence frequency. In order to solve this problem, the present invention applies the third type active time selectively according to the instruction of the eNB.

In an embodiment, the eNB sends the UE having a high probability of significant battery consumption by the third type active time such as VoIP a control message instructing to apply the third type active time selectively. The control message may include DRX-related configuration information.

If the DRX starts afterward, the UE determines whether to apply the third type active time depending on whether the control information is received. In more detail, if the control information has not been received, the UE applies the third type active time and, otherwise if the control information has been received, applies a modified third type active time. The modified third type active time, is the active time in which whether to monitor PDCCH in the subframe at which the uplink grant for pending HARQ retransmission may occur is determined by the HARQ processor. In more detail, when a subframe is the subframe in which retransmission uplink grant may occur in corresponding to the HARQ process having data, if one of the second and third conditions is fulfilled, the active time is not regarded as the third active time (i.e. if the subframe is not other type active time, the UE does not monitor PDCCH in the subframe).

[Condition 2]

Although the uplink transmission is performed in the HARQ process, no HARQ feedback is received due to the measurement gap. The measurement gap is a time period configured to occur at a predetermined interval in order for the UE to perform measurement on the serving and other frequencies. The UE performs neighbor cell measurement without communication with the serving cell in the subframe corresponding to the measurement gap.

If no HARQ feedback is received due to the measurement gap, the UE cannot determine whether to per non-adaptive retransmission. If the uplink transmission is performed ordinarily, the data reception failure probability is higher than the data reception success probability. Accordingly, if such a situation occurs, the UE operates as if the HARQ feedback of ACK is received. That is, the UE stops non-adaptive retransmission and resumes the retransmission only when the eNB instruct the adaptive retransmission explicitly. However, the third type Active Time is not applied, the UE may not monitor PDCCH to detect the adaptive retransmission, resulting in failure of correct data transmission operation.

In order to solve this problem, the UE determines whether to apply the third type Active Time by checking whether the condition 2 is fulfilled.

[Condition 3]

The data stored in the corresponding HARQ process is the MAC PDU transmitted in the random access procedure.

The random access procedure is made up of transmitting at the UE a preamble, transmitting at the eNB a random access response message, and transmitting at the UE a MAC PDU using the uplink transmission resource allocated by means of the random access response message. Typically, the random access procedure is triggered when the data to be transmitted occurs at the UE, and the UE stores the MAC PDU to be transmitted in a predetermined buffer called a message 3 buffer and if a random access response message is received, transmits the MAC PDU stored in the message 3 buffer. At this time, the eNB cannot identify the UE which transmits the MAC PDU and thus the third type Active Time is applied for normal operation, i.e. adaptive retransmission, when transmitting the MAC PDU stored in the message 3 buffer.

Figure 8:
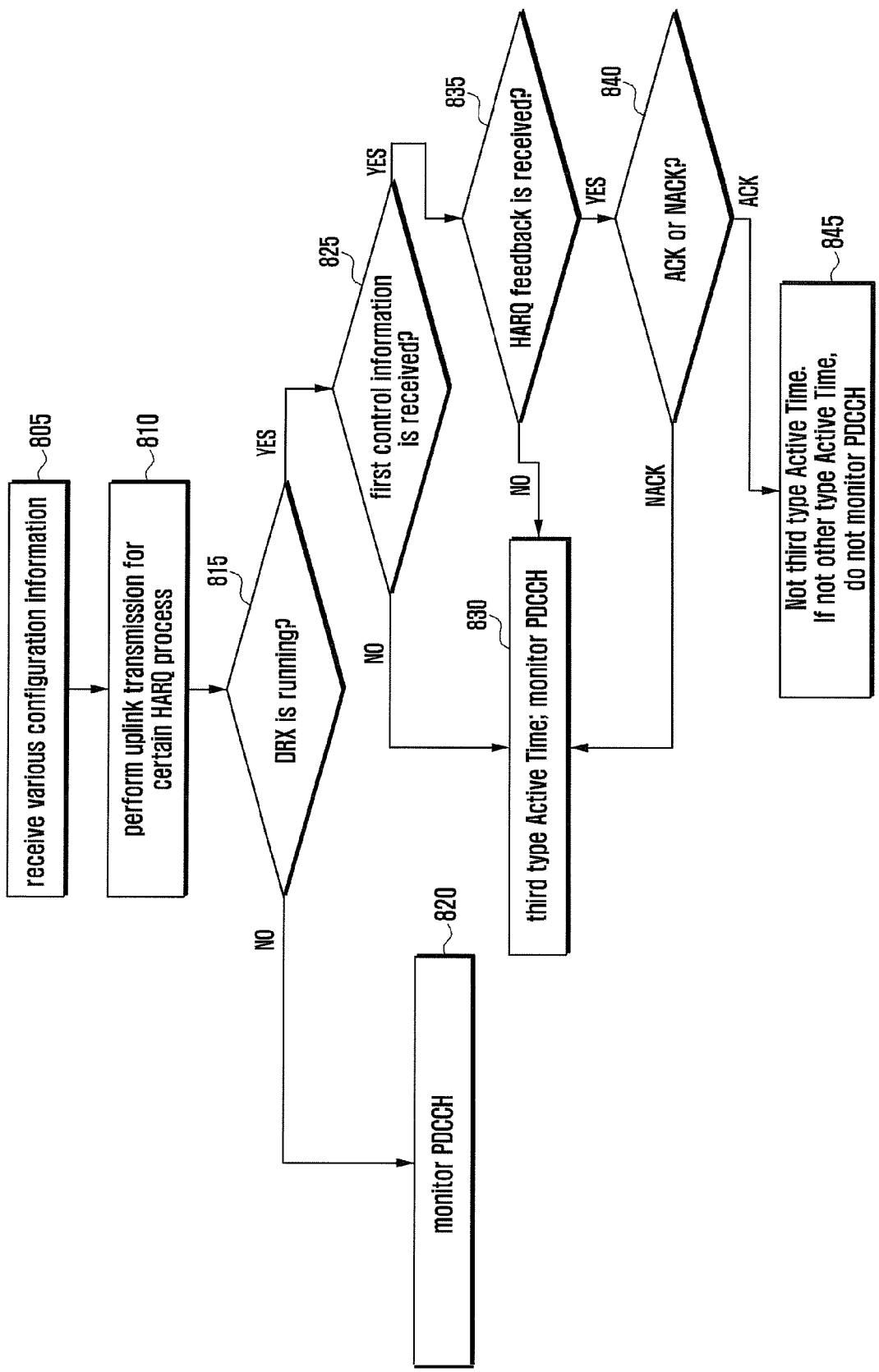
FIG. 8 is a flowchart illustrating the UE operation according to the second embodiment.

FIG. 8 is a flowchart illustrating the UE operation according to the second embodiment. Referring to FIG. 8, the UE receives various configuration informations from the eNB at step 805. The configuration informations may includes DRX configuration information, measurement gap configuration information, and the first control information indicating whether to apply the third type Active Time (or whether to use adaptive retransmission). The configuration informations may be transmitted in one control message or respective control messages. The DRX configuration information may include onDurationTimer length, drx-InactivityTimer length, drx-RetransmissionTimer length, DRX cycle length, and start time of onDuration. The measurement gap configuration information may include a measurement gap cycle and measurement gap start time. The first control information may be a 1-bit information indicating whether to apply the third type Active Timer selectively.

The UE performs uplink transmission for a predetermined HARQ process at step 810 and determines whether to monitor PDCCH in the subframe at which an uplink grant indicating adaptive retransmission for the uplink transmission may be received at step 815.

At step 815, the UE determines whether the DRX is running. If so, the procedure goes to step 820 and, otherwise, step 825. If the DRX is running, this means that the DRX control information (e.g. DRX cycle) is configured to the UE.

The UE monitors PDCCH in the corresponding subframe at step 820. If Channel Quality Indication (CQI) transmission on Physical Uplink Control Channel (PUCCH) is configured in the subframe, the UE performs CQI transmission on the PUCCH. If SRS transmission is configured in the subframe, the UE transmits SRS.

The UE determines whether the first control information is configured at step 825 and, if so, the procedure goes to step 835 and, otherwise, step 830. If the first control information is configured, this means that the first control information has been received through a predetermined control message and thus the third type Active Time selective application operation is configured.

At step 830, if data is stored in the HARQ processor, the UE determines that the subframe is the third type Active Time. That is, the UE monitors PDCCH in the subframe. If no data is stored in the HARQ process, e.g. if the CURRENT_TX_NB has reached the maximum number of transmission times and thus the UE has discarded the data stored in the buffer, the UE assumes that the subframe is the third type active time. That is, the UE does not monitor PDCCH in the subframe. If it is determined that the subframe is the third type Active Time or other type Active Time and if CQI or SRS transmission on PUCCH is configured in the subframe, the UE performs the corresponding uplink transmission. If the subframe is neither the third type Active Time nor other type Active Time, the UE does not perform any uplink transmission although the CQI or SRS transmission on PUCCH is configured in the subframe.

At step 835, the UE determines whether the HARQ feedback corresponding to the most recent uplink transmission of the HARQ process is received correctly and whether the mace PDU stored in the HARQ process is the MAC PDU acquired from the message 3 buffer. That is, if the reception time of the HARQ feedback corresponding to the most recent uplink transmission matches the measurement gap, this means that the HARQ feedback is not received correctly and thus the procedure goes to step 830. If the most recent uplink transmission is the MAC PDU transmission performed in the random access procedure (i.e. the MAC PDU is of being acquired from the message 3 buffer), the procedure goes to step 830. If the HARQ feedback is received successfully or if the transmitted MAC PDU is not of being acquired from the message 3 buffer, the UE determines whether the HARQ feedback is ACK or NACK at step 840. If the HARQ feedback is ACK, the UE assumes that the subframe is not the third type Active Time at step 845. If the HARQ feedback is NACK, the UE assumes that the subframe is the third type Active Time.

Figure 9:
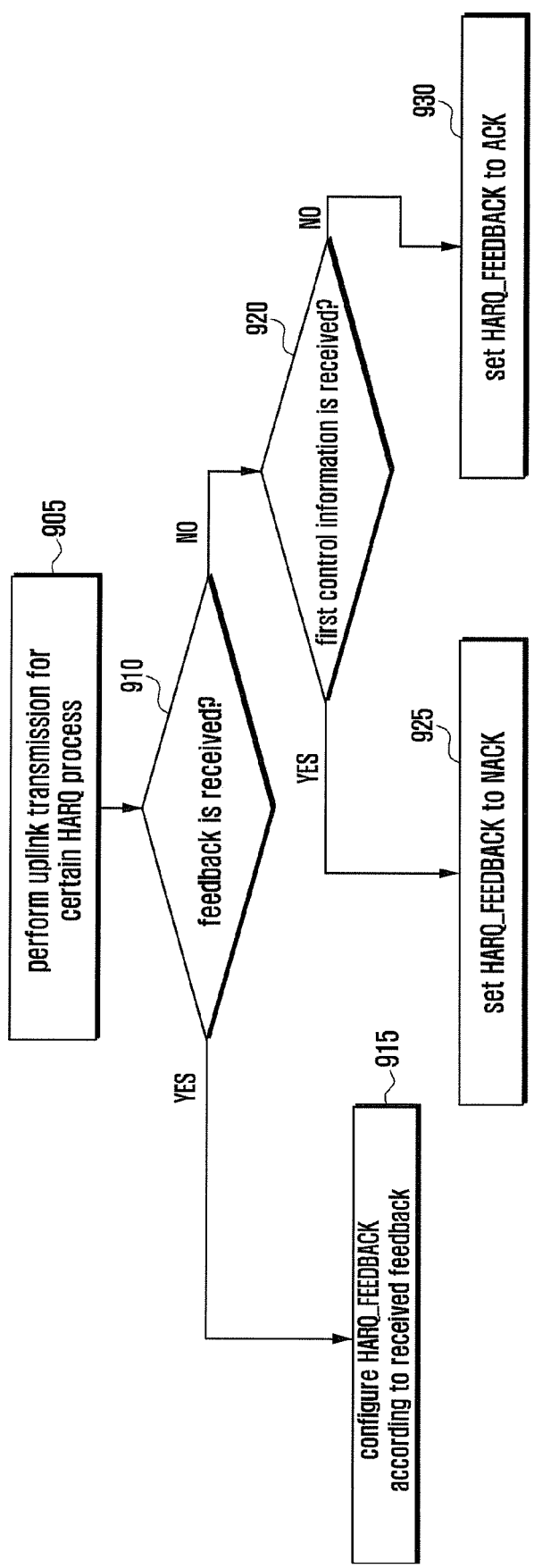
FIG. 9 is a flowchart illustrating another UE operation according to the second embodiment.

FIG. 9 is a flowchart illustrating another UE operation according to the second embodiment.

FIG. 9 is directed to the method of configuring feedback selectively depending on whether the first control information is configured when the feedback corresponding to the uplink transmission of the UE is not received due to the measurement gap. If the first control information is configured (this means that the adaptive retransmission is impossible), the UE assumes the receipt of NACK and, if the first control information is not received (this means that the adaptive retransmission is possible), assumes the receipt of ACK so as to delay retransmission until the adaptive retransmission is indicated.

The UE performs uplink transmission for a certain HARQ process at step 905. In order to set HARQ_FEEDBACK variable for the HARQ process, the procedure goes to step 910.

At step 910, the UE determines whether an HARQ feedback is received in correspondence to the uplink transmission. If the HARQ feedback is received, the UE sets the HARQ_FEEDBACK variable according to the received HARQ feedback at step 915.

If the HARQ feedback corresponding to the uplink transmission is not received for a reason such as measurement gap, the procedure goes to step 920.

The UE determines whether the first control information is configured at step 920. If the first control information is configured, this means the followings.

The first control information has not been received and any control message for releasing the first control information.

A function of configuring the third Active Time selectively is configured.

A function of applying HARQ buffer management selectively is configured (the meaning of applying HARQ buffer management selectively described later).

A function of applying adaptive retransmission selectively is configured.

If the first control information is configured, the UE sets the HARQ_FEEDBACK to NACK at step 925. That is, the non-adaptive retransmission is performed at the next retransmission subframe.

If the first control information is not configured, the UE sets the HARQ_FEEDBACK to ACK at step 930. That is, the non-adaptive retransmission is not performed at the next retransmission subframe.

Figure 10:
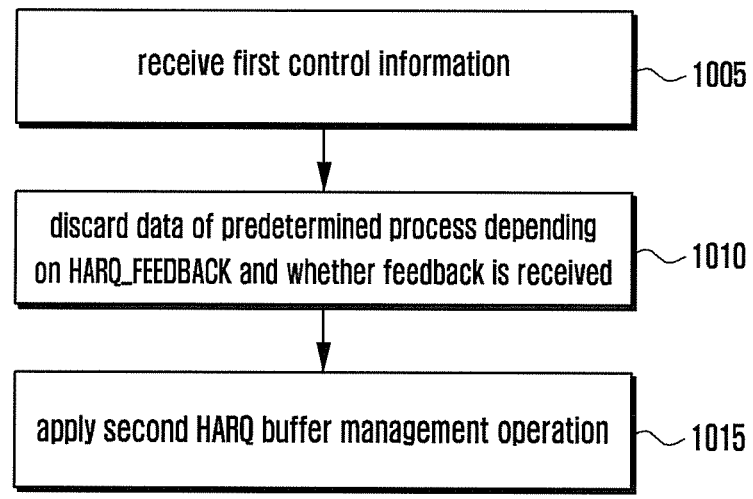
FIG. 10 is a flowchart illustrating another UE operation according to the second embodiment.

FIG. 10 is a flowchart illustrating another UE operation according to the second embodiment.

Referring to FIG. 10, in order to apply adaptive retransmission selectively depending on whether the first control information is configured, if the first control information is configured the UE discards the data stored in the HARQ process so as to prevent the adaptive retransmission from occurring in the process.

The UE receives the first control information at step 1005.

The UE receives the HARQ feedback in the uplink HARQ process storing data currently and selects the process storing the mace PDU which is not being acquired from the message 3 buffer among the processes of which HARQ_FEEDBACK is set to ACK and discards the data stored in the selected process at step 1010. The UE maintains the data stored in the process in which the feedback is not received for a reason such as process having HARQ_FEEDBACK set to NACK and measurement gap.

The UE applies the second HARQ buffer management operation for the next HARQ operation at step 1-15.

<Second HARQ Buffer Management Operation>

If the received HARQ feedback is NACK and if the CURRENT_TX_NB has not reach the maximum number of transmissions, the UE maintains the data stored in the HARQ buffer.

If the received HARQ feedback is NACK and if the CURRENT_TX_NB has reached the maximum number of transmissions, the UE discards the data stored in the HARQ buffer.

If the received HARQ feedback is ACK the UE discards the data stored in the HARQ buffer regardless whether the CURRENT_TX_NB has reached the maximum number of transmissions.

If no HARQ feedback has been received due to the measurement gap and if the CURRENT_TX_NB has not reached the maximum number of transmissions, the UE maintains the data stored in the HARQ buffer.

If no HARQ feedback has been received due to the measurement gap and if the CURRENT_TX_NB has reached the maximum number of transmissions, the UE discards the data stored in the HARQ buffer.

If the first control information is not configured or if the selective application of adaptive retransmission is not configured, the UE applies the first HARQ buffer management operation.

<First HARQ Buffer Management Operation>

If the CURRENT_TX_NB has not reached the maximum number of transmissions, UE maintains the data stored in the HARQ buffer and, otherwise the CURRENT_TX_NB has reached the maximum number of transmissions, discards the data stored in the HARQ buffer, regardless of the receipt (or not) and the type of the HARQ feedback.

Figure 16:
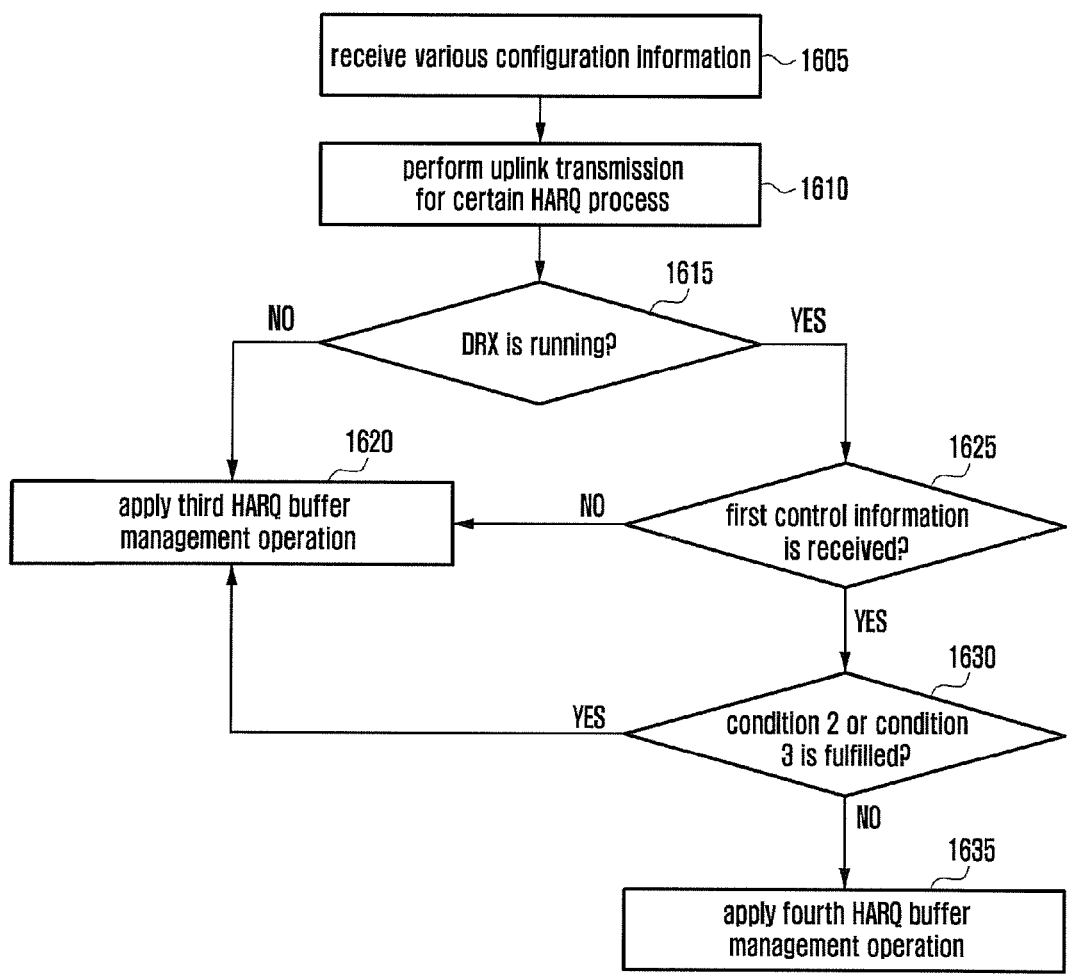
FIG. 16 is a flowchart illustrating another UE operation according to the second embodiment.
Figure 17:
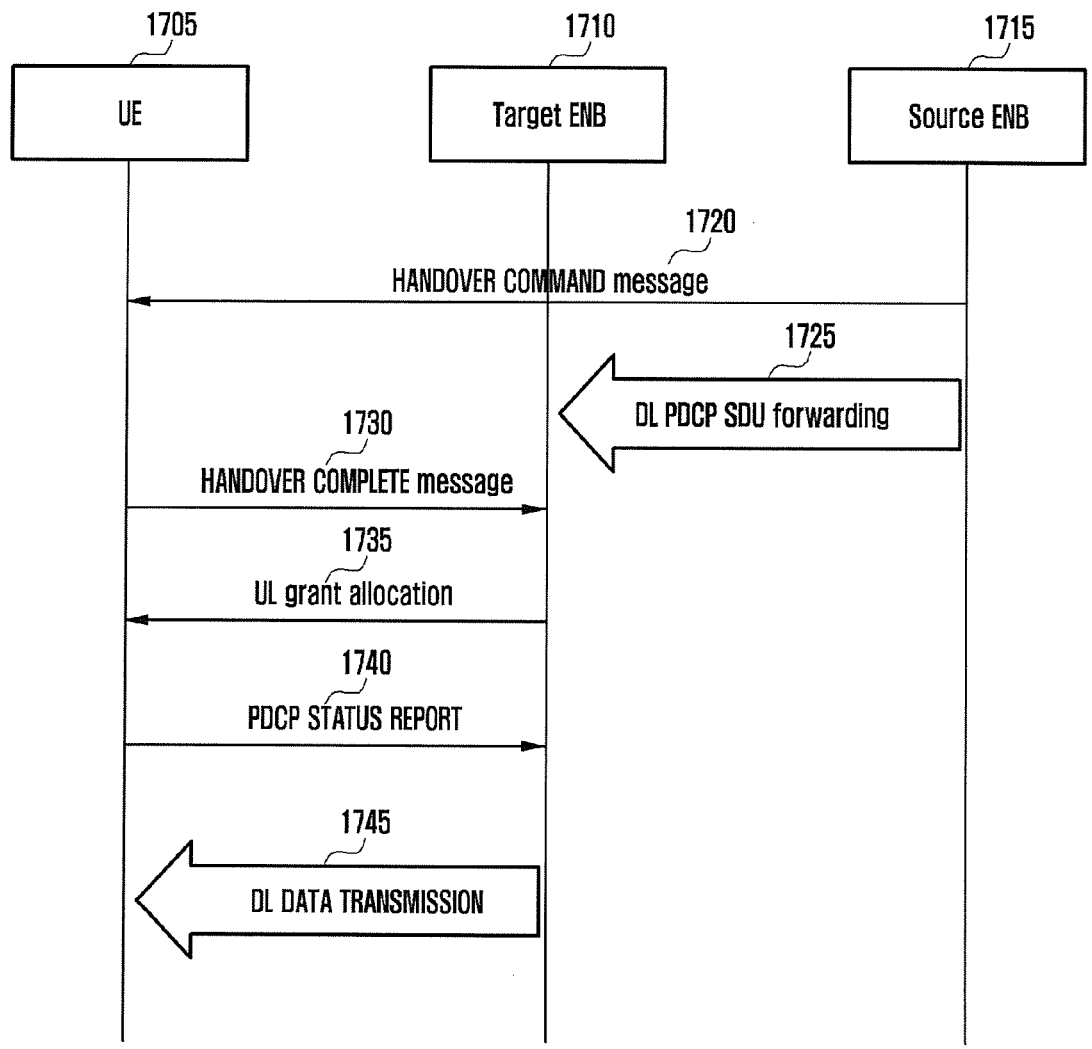
FIG. 17 is a signal flow diagram illustrating a procedure of protecting against data loss using PDCP STATUS REPORT.

FIG. 16 shows another UE operation.

Step 1606 is identical with step 805.

The UE performs uplink transmission in a predetermined HARQ process at step 1610, and the procedure goes to step 1615 to perform buffer management for the data transmitted in uplink.

At step 1615, the UE determines whether the DRX is running. If so, the procedure goes to step 1625 and, otherwise, step 1620. If the DRX is running, this means that the DRX control information (e.g. DRX cycle) is configured to the UE.

At step 1620, the UE applies the third HARQ buffer management operation.

The UE determines whether the first control information is configured to the UE at step 1625 and, if so, the procedure goes to step 1630 and, otherwise, step 1620.

At step 1630, the UE determines whether the condition 2 or 3 is fulfilled. If at least one of the conditions is fulfilled, the procedure goes to step 1620 and, otherwise both the conditions are not fulfilled, step 1635 at which the UE applies the fourth HARQ buffer management operation.

If the second condition is not fulfilled, this means that the reception timing of the HARQ feedback corresponding to the transmitted MAC PDU is not overlapped with the measurement gap. If the condition 3 is not fulfilled, this means that the transmitted MAC PDU is not the MAC PDU acquired from the message 3 buffer. Accordingly, if the HARQ feedback reception failure is neither because the transmitted MAC PDU is not the MAC PDU acquired from the message 3 buffer nor because the reception timing of the HARQ feedback corresponding to the transmitted MAC PDU is not overlapped with the measurement gap, the procedure goes to step 1635. Otherwise if the transmitted MAC PDU is the MAC PDU acquired from the message 3 buffer or the HARQ feedback corresponding to the MAC PDU is not received, the procedure goes to step 1620.

<Third HARQ Buffer Management Operation>

If the CURRENT_TX_NB has not reached the maximum number of transmissions, the UE maintains the data stored in the HARQ buffer and, otherwise if the CURRENT_TX_NB has reached the maximum number of transmissions, discards the data stored in the HARQ buffer regardless of the receipt or not of the HARQ feedback and type of the HARQ feedback.

<Fourth HARQ Buffer Management Operation>

If the received HARQ feedback is NACK (or HARQ_FEEDBACK is NACK) and if the CURRENT_TX_NB has not reached the maximum number of transmissions, the UE maintains the buffer stored in the HARQ buffer.

If the received HARQ feedback is NACK (or HARQ_FEEDBACK is NACK) and if the CURRENT_TX_NB has reached the maximum number of transmissions, the UE discards the data stored in the HARQ buffer.

If the received HARQ feedback is ACK (or HARQ_FEEDBACK is ACK), the UE discards the data stored in the HARQ buffer regardless whether the CURRENT_TX_NB has reached the maximum number of transmissions or not.

Figure 35:
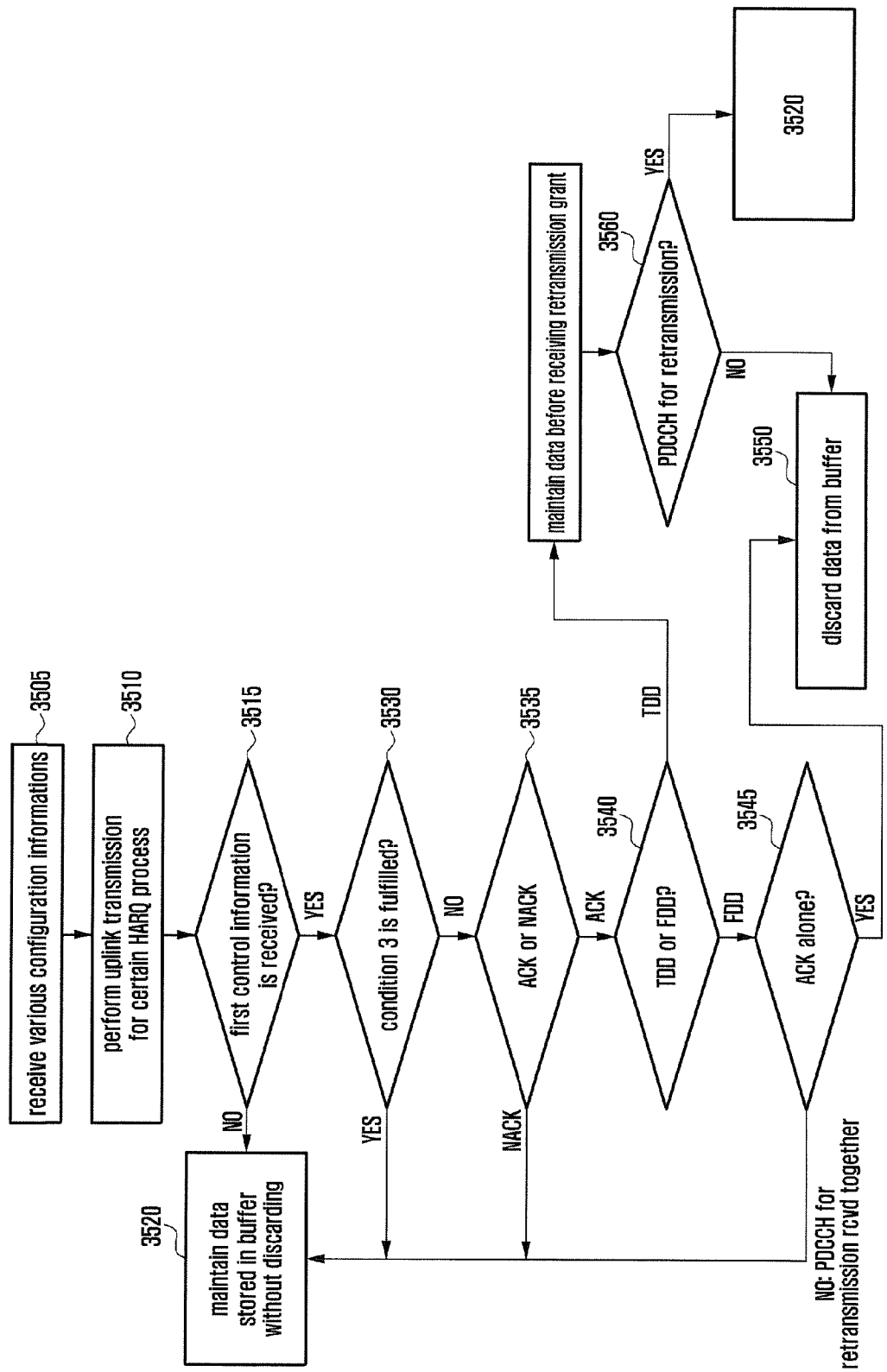
FIG. 35 is a flowchart illustrating the UE operation procedure according to another embodiment of the present invention.

FIG. 35 shows another UE operation.

Step 3505 is identical with step 1605.

The UE in the DRX mode performs uplink transmission of a predetermined HARQ process and waits for the feedback occasion corresponding to the uplink transmission. If the feedback occasion arrives, the UE receives the feedback and determines whether to discard or maintain the data (MAC PDU) based on the received feedback at step 3515. If the DRX is running, this means that the DRX control information (e.g. DRX cycle) is configured to the UE. If the DRX is not running, the non-use of the third type Active Time does not contribute to the battery conservation, the UE operates according to the legacy technology.

The UE determines whether the first control information is configured at step 3515 and, if so, the procedure goes to step 3530 and, otherwise, step 3520.

The UE maintains the data stored in the buffer regardless of the type of the received feedback at step 3520. The data is discarded when a predetermined condition is fulfilled afterward.

The UE determines whether the condition 3 is fulfilled at step 3530. That is, the UE determines whether the transmitted MAC PDU is the MAC PDU acquired from the message 3 buffer. If the transmitted MAC PDU is acquired from the message 3 buffer, this means that the UE is in the random access procedure and the eNB may not identify the UE correctly yet. Accordingly, it is necessary to make in possible to perform adaptive retransmission by applying the third type Active Time. If the transmitted MAC PDU is not acquired from the message 3 buffer and if a predetermined condition is fulfilled, the procedure goes to step 3535 so as not to apply the third type Active Time.

The UE determines whether the received feedback is HARQ ACK or NACK at step 3535. If the HARQ feedback is NACK, this means that the non-adaptive retransmission is commanded and thus the UE maintains the MAC PDU stored in the buffer for use in the non-adaptive retransmission at step 3520. If the HARQ feedback is ACK, the procedure goes to step 3540.

The UE determines whether the current operation mode is FDD or TDD at step 3540. If the current operation mode is FDD, this means that the feedback occasion and retransmission grant occasion is the same subframe and thus the procedure goes to step 3545.

The UE determines whether the PDCCH indicating retransmission is received in the corresponding subframe at step 3545. The UE may determine whether only the feedback is received but not the PDCCH indicating retransmission. If the PDCCH indicating the retransmission is received, the procedure goes to step 3520. If only the ACK is received but the PDCCH indicating retransmission is not received, the UE discards the data stored in the buffer at step 3550.

The UE maintains the data stored in the buffer before the retransmission grant occasion arrives at step 3555. If the retransmission grant occasion arrives, the UE determines whether the PDCCH indicating adaptive retransmission at step 3560. If the PDCCH is received, the procedure goes to step 3520 and, otherwise, step 3550. In the TDD mode, the retransmission grant occasion and the feedback occasion are defined according to the TDD configuration as specified in TS 36.213.

Third Embodiment

In order to increase the data rate of the UE, a technique called carrier aggregation for aggregating multiple serving cells for one UE is introduced.

Figure 11:
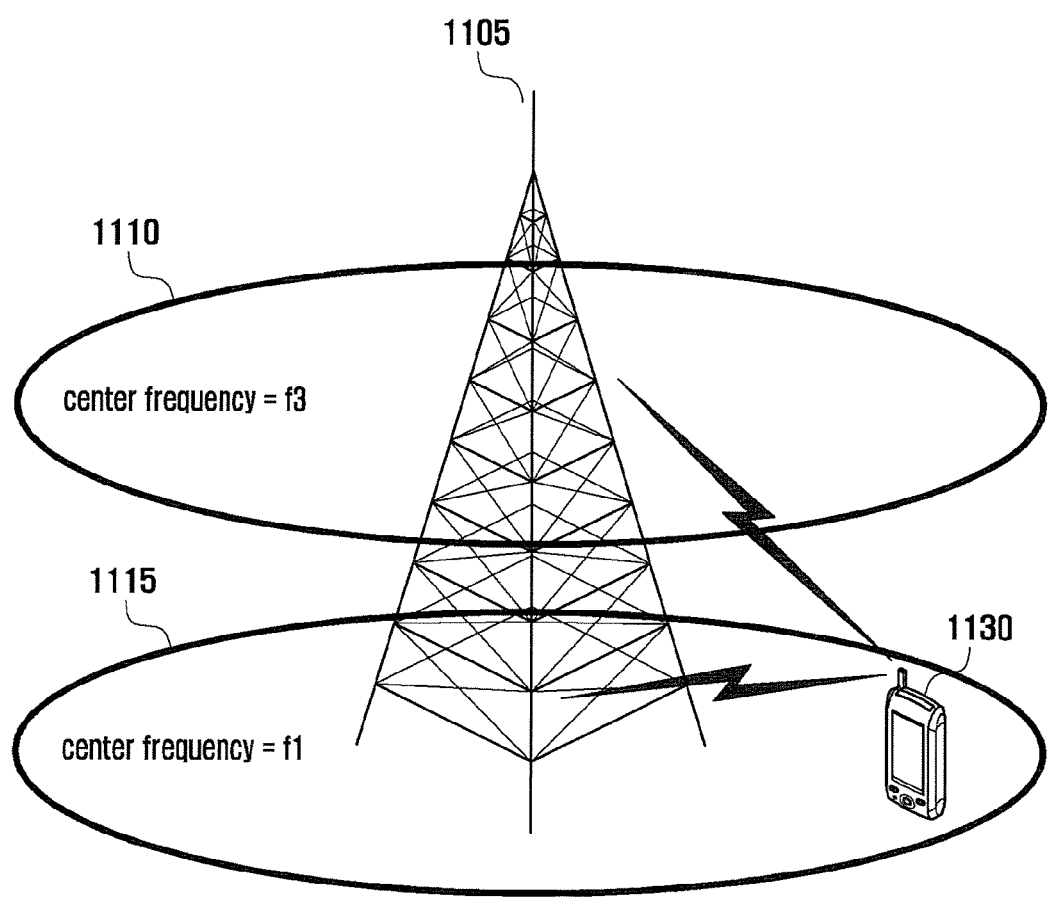
FIG. 11 is a diagram illustrating the carrier aggregation.

FIG. 11 is a diagram illustrating the carrier aggregation.

Referring to FIG. 11, an eNB transmits and receives multiple carriers across several frequency bands in general. For example, in the case that the eNB 105 transmit the carrier 1115 having the downlink center frequency f1 and the carrier 1110 having the downlink center frequency f3, If the carrier aggregation is not supported as in the conventional technology, the UE has to transmit/receive data using one of the two carriers. However, the eNB can allocate more carriers to the UE 1130 having the carrier aggregation capability depending on the situation so as to increase the data rate of the UE 1130. The technique of aggregating the downlink carriers or uplink carriers as described above is referred to as carrier aggregation.

The terms to be used in the following embodiments are described herein.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, the phrase "a UE receives data through a certain downlink carrier or transmits data through a certain uplink carrier" means to receive or transmit data through control and data channels provided in cells corresponding to center frequencies and frequency bands characterizing the carriers. In the present invention, carrier aggregation may be expressed like that a plurality of serving cells are configured with the terms such as primary serving cell (PCell), secondary serving cell (SCell), and activated serving cell. These terms are used in the same meanings as used in the LTE mobile communication system as specified in TS 36.321.

When an SCell is configured or activated to the UE or when the SCell is released or deactivated, the UE may reconfigure the Radio Frequency Frontend. This includes reconfiguring a filter bandwidth of the Radio Frequency Frontend according to the situation of reconfiguration or reactivation or release or deactivation, and the data transmission/reception is suspended while the UE performs reconfiguration. Assuming that the time period for suspending data transmission/reception is time period 1, if the time period 1 occurs frequently, this may cause performance degradation.

The Radio Frequency Frontend reconfiguration is characterized by following features.

- The time period 1 occurs in the serving cell having the same frequency band as the SCell being newly configured or released or activated or deactivated.
- The length of the time period 1 may change depending on the hardware performance as UE processing capability.
- If the Radio Frequency Frontend is not reconfigured, the power consumption of the UE increases as compared to the case of reconfiguring the Radio Frequency Frontend. The Radio Frequency Frontend reconfiguration is not a mandatory operation but has a tradeoff relationship between the power consumption of the UE and the performance degradation.
- If it is determined to perform Radio Frequency Frontend reconfiguration and if the serving cells x and y are configured on certain frequency bands, the Radio Frequency Frontend reconfiguration is required before or after the measurement of neighbor cells of the serving cell x or y.
- If it is determined to reconfigure the Radio Frequency Frontend, the Radio Frequency Frontend reconfiguration is required when the state of the serving cell x transitions from the activated state to the deactivated state or from the deactivated state to the activated state.
- Accordingly, the shorter the neighbor cell measurement cycle is and the more frequently the activation/deactivation occurs, the more significant the performance degradation caused by the Radio Frequency Frontend reconfiguration becomes.

By taking notice of the above characteristics, the present invention proposes the following operation.

- The UE reports the Radio Frequency Frontend reconfiguration necessity per frequency band combination it supports to the eNB.
- The eNB informs the UE of the Radio Frequency Frontend reconfiguration scheme in configuring at least one SCell to the UE. If it is likely to command activation and deactivation of the SCell or neighbor cell measurement for the SCell frequently, the eNB instructs to apply the Radio Frequency Frontend reconfiguration operation 1 and, otherwise, Radio Frequency Frontend reconfiguration operation 2.

Figure 12:
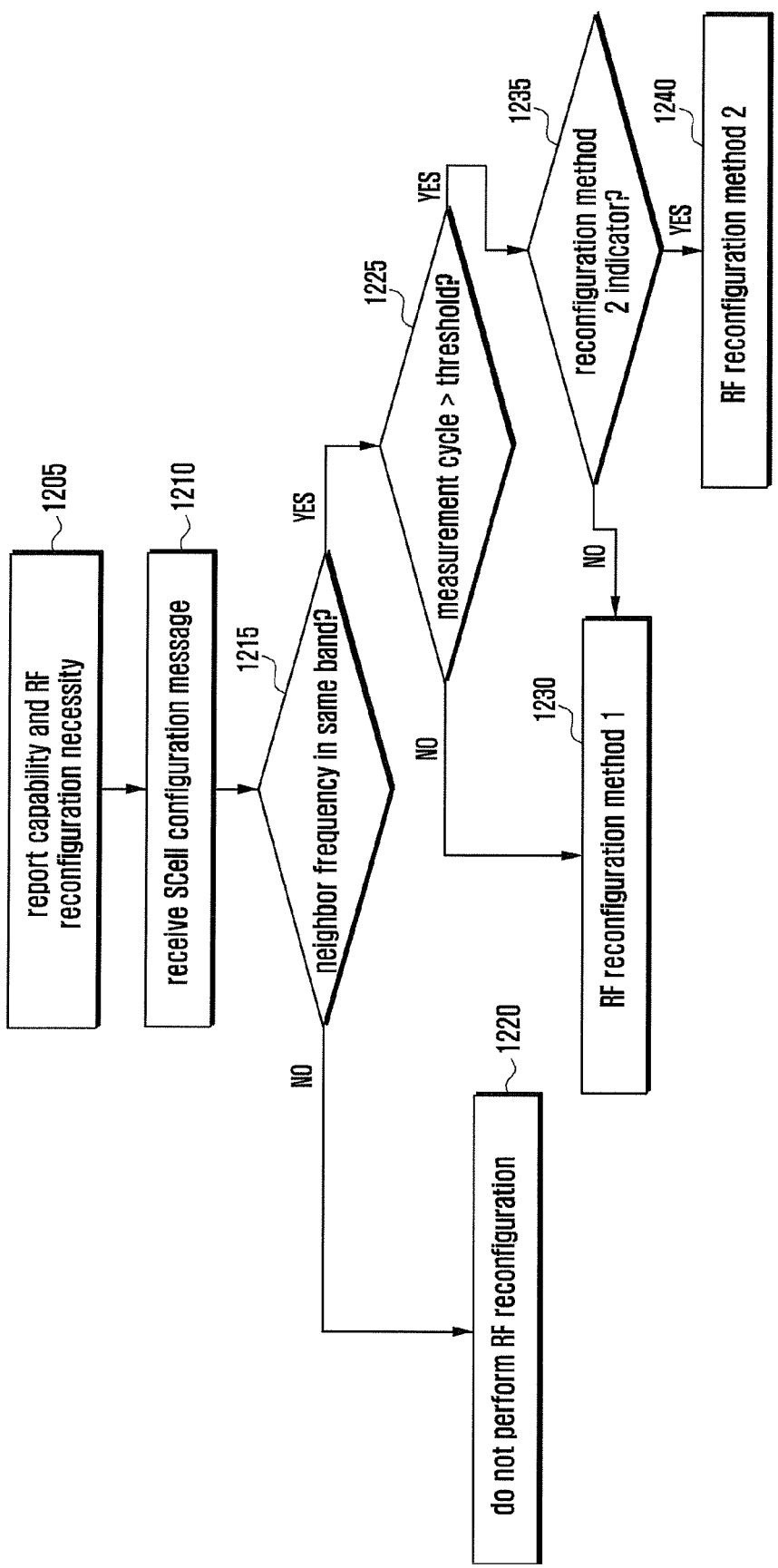
FIG. 12 is a flowchart illustrating the UE operation according to the third embodiment.

FIG. 12 is a flowchart illustrating the UE operation according to the third embodiment.

Referring to FIG. 12, the UE reports its capability to the eNB at step 1205. At this time, the UE reports the frequency bands it supports and frequency band combinations for carrier aggregation and, if the frequency band combination is inter-band combination, reports the Radio Frequency Frontend reconfiguration necessity. For example, the UE may support the frequency bands x and y and carrier aggregation as follows.

TABLE 1

| Band combination | | Radio Frequency Frontend reconfiguration necessity report |
|---|---|---|
| Frequency band combination 1 | 1 serving cell on band x | NO |
| Frequency band combination 2 | 1 serving cell on band y | NO |
| Frequency band combination 3 | 2 serving cells on band x | YES |
| Frequency band combination 4 | 2 serving cells on band y | YES |
| Frequency band combination 5 | 1 serving cell on band x, 1 serving cell on band y | NO |
| Frequency band combination 6 | 2 serving cells on band x, 1 serving cell on band y | YES |

The UE includes the 1-bit information for reporting the Radio Frequency Frontend reconfiguration necessity to the frequency band fulfilling the following condition.

Band combination of configuring at least two serving cell on one band.

Since two serving cells are configured on the band x in the frequency band combination 3 in the above example, the UE reports the Radio Frequency Frontend reconfiguration necessity. Since two serving cells are configured on the band x in the frequency band combination 6 too, the UE reports the Radio Frequency Frontend reconfiguration necessity.

The UE receives a control message for configuring at least one SCell at step 1210. The UE determines whether the frequency of the SCell is neighboring to the frequency of the serving cell configured already in the same frequency band at step 1215. If this condition is not fulfilled, the UE does not perform the Radio Frequency Frontend reconfiguration at step 1220. If the condition is fulfilled, the procedure goes to step 1225.

At step 1225, the UE determines whether the measure cycle to be applied to the SCell in the deactivated state is greater than a threshold at step 1225. The measurement cycle may be configured per frequency and is a value indicating the measurement cycle to be applied when an SCell is configured and in the deactivated state on the frequency while configuring measurement on a certain frequency using a predetermined control unit and when the UE measures the channel state of the SCell. The threshold may be configured by the eNB using a predetermined control message or fixed to a value. If the measurement cycle is equal to or less than the threshold, the procedure goes to step 1230 and otherwise, step 1235.

If the procedure goes to step 1230, this means that the Radio Frequency Frontend reconfiguration occurs frequently and thus the UE reconfigure the Radio Frequency Frontend with the inclusion of the newly configured SCell. Afterward, the UE maintains the reconfigured Radio Frequency Frontend in the SCell deactivation state regardless of the measurement. For example, when the frequency of the newly configured SCell is f1 and the frequency of the serving cell configured already on the same frequency band is f2, if a control message for configuring an SCell is received, the UE reconfigures the Radio Frequency Frontend to include both the f1 and f2 and maintains the reconfigured Radio Frequency Frontend until the SCell is released. When the SCell is newly configured in this way, reconfiguring the radio Frequency Frontend to include the frequency of the configured SCell immediately and maintaining the configuration until the SCell is released is referred to as Radio Frequency Frontend reconfiguration scheme 1.

At step 1235, the UE determines whether the control message includes the control information instructing to apply the Radio Frequency Frontend reconfiguration method 2. If this control information is not included, the procedure goes to step 1230 and otherwise if the control information is included, step 1240.

If the procedure goes to step 1240, this means that the measurement cycle is greater than the threshold (i.e., UE does not need to measure for reconfiguration frequently) and the eNB does not perform SCell activation/deactivation frequency of the eNB frequently and thus the UE applies the Radio Frequency Frontend reconfiguration scheme 2 which is performed at the time when the Radio Frequency Frontend reconfigured is necessary. That is, when the SCell is not activated and there is no need of performing the SCell measurement, if it becomes necessary to configure the radio Frequency Frontend to include f2 and perform the measurement in spite of the deactivated state of the SCell or if the SCell is activated, the UE reconfigure the Radio Frequency Frontend to include both the f1 and f2.

In the present invention, the reconfiguration scheme 2 indicator may be simplified in association with the measurement cycle. For example, if the measurement cycle to be applied to the deactivated SCell is greater than the threshold, it is assumed that the reconfiguration scheme 2 is indicated and, otherwise if the measurement cycle is equal to or less than the threshold, it is assumed that the reconfiguration scheme 2 is not indicated. In this case, when a serving cell which operates on the same frequency band of the previously configured serving cell (e.g., PCell) and which has the frequency neighboring the frequency of previously configured serving cell is configured, if the measurement cycle to be applied when the serving cell to be configured is in the deactivated state is greater than the threshold, the UE applies the Radio Frequency Frontend reconfiguration scheme 2 and, otherwise the measurement cycle is equal to or less than the threshold, applies the Radio Frequency Frontend reconfiguration scheme 1. That is, step 1335 is skipped and, if the condition of step 1330 is fulfilled, the procedure jumps to step 1340.

In summary, the UE selects the Radio Frequency Frontend reconfiguration scheme by taking notice of the following.

When an SCell is configured and a serving cell (e.g. PCell) which is in the activated state and operating on the neighboring frequency in the same frequency band as the SCell;

If the measurement cycle to be applied to the deactivated SCell is greater than a predetermined threshold, the UE has not to generate any interruption in the serving cell in the activated state when configuring or releasing the SCell and may generate interruption in the serving cell in the activated state when the SCell is activated or deactivated or when the SCell has to be measured in the deactivated state (i.e., the Radio Frequency Frontend reconfiguration scheme 2 has to be applied).

If the measurement cycle to be applied to the SCell in the deactivated state is equal to or less than the threshold, the UE may generate interruption in the serving cell in the activated state when configuring or releasing the SCell but has not to generate interruption to the serving cell in the activated state when the SCell is activated or deactivated or the SCell has to be measured in the deactivated state (i.e., Radio Frequency Frontend reconfiguration scheme 1 has to be applied).

When reconfiguring the Radio Frequency Frontend, an interruption may be generated to the serving cell (e.g., PCell) in the activated state. In detail, the UE may not receive or transmit the following signals.

HARQ feedback signal corresponding to PUSCH transmitted through PCell

PUSCH transmission through PCell

CSI signal transmission through PCell

D-SR signal transmission through PCell

Preamble signal transmission through PCell

RAR signal transmission through PCell

The interruption according to the Radio Frequency Frontend reconfiguration may be classified into two types:

Interruption 1: The UE determines the time period in which the interruption caused by the Radio Frequency Frontend reconfiguration is generated. The eNB knows the occurrence of interruption but not the interruption occurrence time.

Interruption 2: The time period when the interruption caused by the Radio Frequency Frontend reconfiguration occurs is predetermined. The eNB may schedule the UE outside the time period in which the interruption is generated.

The Radio Frequency Frontend reconfiguration may be classified into three types:

When the UE configures or releases an SCell in the same frequency band as the PCell When the UE performs measurement to the SCell in the deactivated state in the same frequency band as the PCell When the UE activates or deactivates an SCell in the same frequency band as the PCell Among the above cases, the second case generates interruption 1 always because the UE determines the measurement timing by itself.

In the first and third cases, the UE performs a predetermined operation according to the command of the eNB such that interruption 2 is generate when the UE configures the Radio Frequency Frontend in a predetermined time period, e.g. a predetermined length of period after a predetermined time lapses since the time indicated by the eNB. Even in the first and third cases, however, the UE may have the right to generate the interruption 1. Particularly when an SCell is deactivated due to the expiry of the SCell deactivation timer, the eNB cannot specific the expiry time and thus interruption 1 is generated always.

The UE manages variables as follows to establish synchronization with the eNB for the transmission-related information in performing PUSCH transmission.

HARQ_FEEDBACK: Variable storing HARQ feedback corresponding to PUSCH transmission. If HARQ_FEEDBACK is NACK, retransmission is performed at the next transmission occasion and, otherwise if the HARQ_FEEDBACK is ACK, retransmission is not performed.

CURRENT_TX_NB: Variable storing a number of PUCCH transmissions of the packet to which current HARQ operation is applied. If the CURRENT_TX_NB reaches a predetermined threshold, the UE discards the corresponding packet stored in the buffer.

CURRENT_IRV: Variable storing Redundancy Version (RV) to be applied to the packet to which current HARQ operation is applied. The UE applies the RV indicated by the CURRENT_IRV when transmitting PUSCH.

These variables are updated whenever the UE receives HARQ_FEEDBACK or transmits PUSCH. If the eNB know that the PUSCH transmission is not occurred, it is preferred for the UE and the eNB to maintain the CURRENT_IRV as it is. the uplink HARQ operation is defined to apply a specific RV automatically whenever the non-adaptive retransmission (retransmission performed with the transmission resource which the UE has used at the previous transmission, and the UE performs the non-adaptive retransmission basically upon receipt of NACK as feedback) is performed. For example, the UE applies RV 0 to the initial transmission, RV 2 to the first non-adaptive retransmission, RV 3 to the second non-adaptive retransmission, and RV 3 for the third non-adaptive retransmission. The UE and the eNB determine the RV to be applied to the next retransmission using CURRENT_RV. If the CURRENT_IRV increases even though PUSCH transmission is not performed, the transmission is performed with missing out part of RV, resulting in performance degradation. Accordingly, when the eNB knows that the UE has not transmitted PUSCH, it is preferred to maintain the CURRENT_IRV as it is without increment.

Otherwise if the eNB does not know that the UE has not transmitted PUSCH, it is much important for the UE and the eNB to perform encoding and decoding with the same RV by increasing the CURRENT_IRV. Accordingly, if the PUSCH transmission is omitted by the interruption 1, it is preferred to maintain the CURRENT_IRV and, otherwise if the PUSCH transmission is omitted by the interruption 2, it is preferred to increase the CURRENT_IRV. Or by taking notice that the occurrence frequency of the interruption 2 is higher than that of the interruption 1, it is possible to discard the data instead of increasing the CURRENT_IRV so as to prevent retransmission from occurring.

The CURRENT_TX_NB is used to prevent retransmission from occurring when the transmission fails even it has been performed over a predetermined number of transmissions. If the number of transmissions of the current packets reaches a predetermined threshold, the UE discards the packet stored in the HARQ buffer and does not perform retransmission any more. If the number of transmission of the current packet reaches the predetermined threshold, the eNB assumes that there is no more non-adaptive retransmission of the packet and then allocates the frequency/time transmission resource, which has been allocated for the packet transmission, to another UE. Accordingly, it is important for the UE and the eNB to determine that the number of transmissions of the current packet reaches the threshold at the same timing and, in order to accomplish this, the UE and the eNB manage the CURRENT_TX_NB based on the number of retransmission occasions expired other than the number of actual PUSCH transmissions. That is, the UE and the eNB increment the CURRENT_TX_NB by 1 whenever the transmission occasion of a certain packet expires although no packet is transmitted actually. Accordingly, the UE increments the CURRENT_TX_NB by 1 in any case that the eNB knows or not that the UE has not transmitted PUSCH. Thus, either the interruption 1 or the interruption 2 increments the CURRENT_TX_NB by 1.

Figure 36:
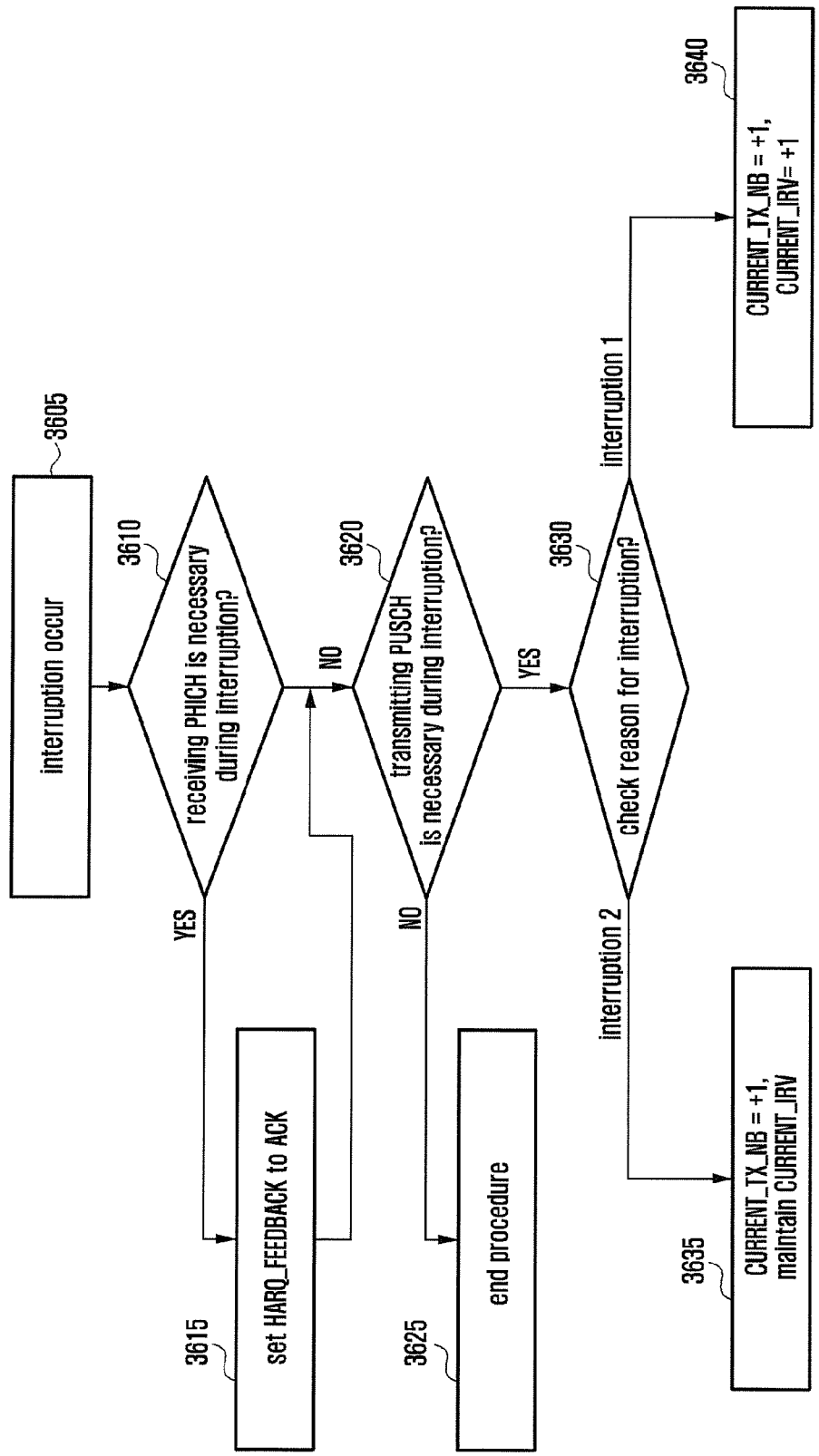
FIG. 36 is a flowchart illustrating a method of adjusting the variables related to the uplink transmission of the UE.

FIG. 36 proposes a method of adjusting the variables related to the uplink transmission at the UE.

An interruption occurs due to the Radio Frequency Frontend reconfiguration fulfilling a predetermined condition at step 3605. The UE determines whether to receive PHICH in a subframe in the course of the occurrence of the interruption at step 3610. For example, when a subframe sf [m] belongs to the interruption time period, if PUSCH is transmitted at sf [m−4] in the PCell, it is necessary to receive PHICH at sf [m], and thus the procedure goes to step 3615. If it is not necessary to receive PHICH, the procedure goes to step 3620. The Radio Frequency Frontend reconfiguration fulfilling the predetermined condition means the Radio Frequency Frontend reconfiguration generating interruption in the PCell.

Although no HARQ feedback is received, the UE sets the related HARQ_FEEDBACK to ACK at step 3615. This is the case that the UE has transmitted PUSCH but has not receive the feedback corresponding thereto and thus sets the feedback to ACK to prevent non-adaptive retransmission from occurring.

The UE determines whether to transmit PUSCH in the interruption occurrence period at step 3620. For example, when sf [n] belongs to the interruption occurrence period, if the PDCCH indicating retransmission or initial transmission or HARQ feedback set to NACK is received at sf [n−4], the UE has to transmit PUSCH at sf [n].

If it is not necessary to transmit PUSCH, the procedure ends at step 3625. If it is necessary to transmit PUSCH, the UE determines whether the interruption is interruption 1 or interruption 2 and, if the interruption is interruption 1, the procedure goes to step 3640 and, otherwise if the interruption is interruption 2, step 3635. For example, the Radio Frequency Frontend reconfiguration triggered the interruption relates to the measurement to the SCell in the deactivated state on the same frequency band as the PCell, the procedure goes to step 3635 and, otherwise if the Radio Frequency Frontend reconfiguration triggered the interruption relates to the activation of the SCell in the deactivated state on the same frequency band as the PCell, step 3640. At step 3635, the UE increments the CURRENT_TX_NB related to the PUSCH transmission by 1 and maintains the CURRENT_IRV as it is. Then the procedure ends.

At step 3640, the UE maintains the CURRENT_TX_NB and the CURRENT_IRV related to the PUSCH transmission as they are. Or the UE discards the data stored in the HARQ buffer for PUSCH transmission and initializes the variables.

The SCell deactivation is performed when the MAC control information indicating SCell deactivation or the SCell deactivation timer expires. In the former case, the eNB instructs the deactivation of the SCell, and the UE reconfigure the Radio Frequency Frontend in a predetermined time period such that the PCell interruption occurs in a predicted time period. In the latter case, the UE deactivates the SCell without eNB's awareness such that the eNB does not predict the interruption occurrence period. For reference, the deactivation timer is managed per SCell and, if the UE does not receive scheduling in the corresponding SCell before expiry of the deactivation timer, the UE deactivates the corresponding SCell by itself. This is to prevent the activated state from being maintained erroneously when the MAC control signal indicating deactivation is lost.

Figure 37:
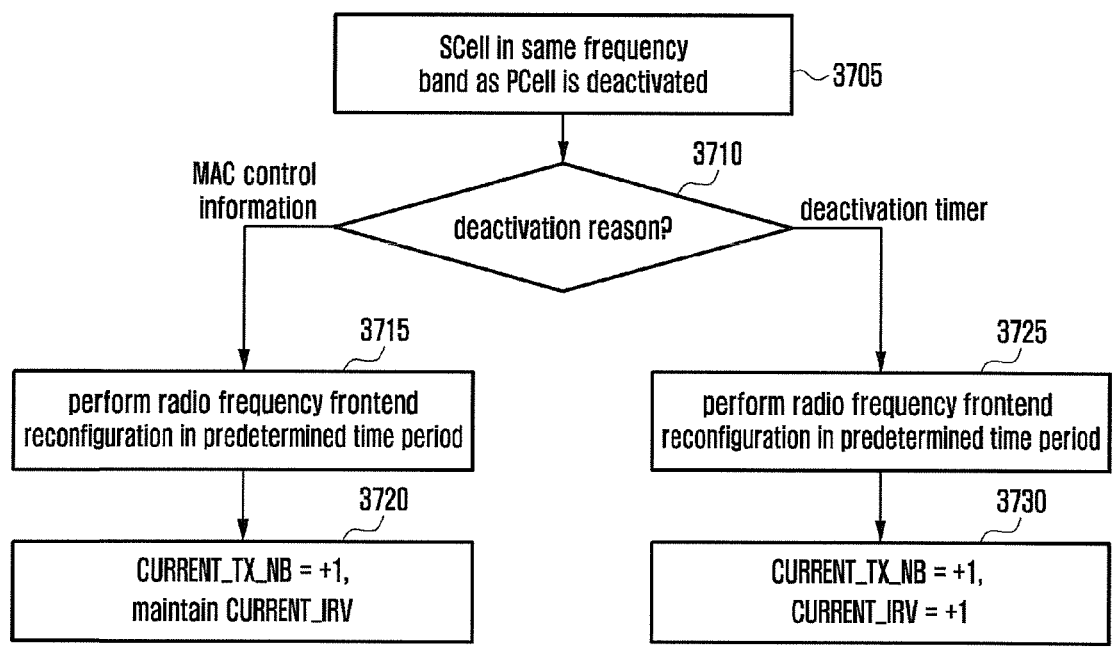
FIG. 37 is a flowchart illustrating the UE operation related to the activation of the SCell configured on the same frequency band as the PCell.

The UE operation related to the deactivation of the SCell configured on the same frequency band as the PCell is depicted in FIG. 37.

An SCell is deactivated at step 3705.

The UE determines whether the SCell is deactivated due to the receipt of a MAC control information indicating deactivation or the expiry of the deactivation timer at step 3710. If the SCell is deactivated due to the receipt of the MAC control information, the procedure goes to step 3715. At step 3715, the UE performs Radio Frequency Frontend reconfiguration in a predetermined time period such that the PCell interruption is generated in a predictable time period. The predictable time period may be defined based on the period in which the MAC control information indicating deactivation is received. For example, if the MAC control information is received a sf [n], the time duration may be sf [n+9]~sf [n+5].

If it is necessary to transmit PUSCH of the PCell in the interruption occurrence period, the UE increment the related CURRENT_TX_NB by 1 and maintains the CURRENT_IRV as it is at step 3720.

If the SCell is deactivated due to the expiry of the deactivation timer, the procedure goes to step 3725. At step 3725, the UE selects the time period fulfilling the following conditions as many as possible and performs the Radio Frequency Frontend reconfiguration to generate the PCell interruption in the corresponding time period.

[PCell Interruption Occurrence Period Selection Condition]

Time duration in which the following signals are not transmitted and received through the PCell. Or time period in which transmission and reception are least. Priorities may be applied in the order as enumerated herein.

PCell preamble transmission
  PUCCH transmission
  PCell PHICH reception
  PCell PUSCH transmission
  PCell SRS transmission For example, if the PCell SRS is transmitted in time period 1 and the PUCCH is transmitted in time period 2, the UE selects the time period 1 with priority.

Next, the UE performs Radio Frequency Frontend reconfiguration to generate the PCell interruption in the selected time period.

If the PCell PUSCH should have to be performed in the selected time period, the UE increment both the related CURRENT_TX_NB and CURRENT_IRV by 1 at step 3730.

The above operation may be generalized for all pc interruptions. For example, if the PCell interruption is generated, the UE determines whether the interruption is interruption 1 or interruption 2 and, if the interruption is interruption 1, performs steps 3725 and 3730 and, otherwise if the interruption is interruption 2, steps 3715 and 3720.

Fourth Embodiment

When a plurality of serving cells are configured to a UE, TAG is used for managing the uplink transmission timings of the serving cells efficiently. The TAG includes at last one serving cell, and at least one TAG is configured to one UE. The serving cells belonging to a TAG share the same uplink transmission timing. The TAG including the PCell is referred to as P-TAG, and the TAG consisting of SCells is referred to as S-TAG.

The eNB has to configure the TAG to the UE appropriately in consideration of the UE location, and it may be necessary to reconfigure the current TAG of the UE as the UE moves. If a serving cell belonging to a TAG moves to another TAG, the UE has to change the uplink transmission timing of the serving cell in adaptation to the new TAG. At this time, changing the transmission timing abruptly is neither possible nor preferable. The eNB and the UE stop downlink/uplink transmission in the serving cell and, when the reconfiguration occurs, deactivate the serving cell implicitly to change the transmission timing gradually.

Figure 13:
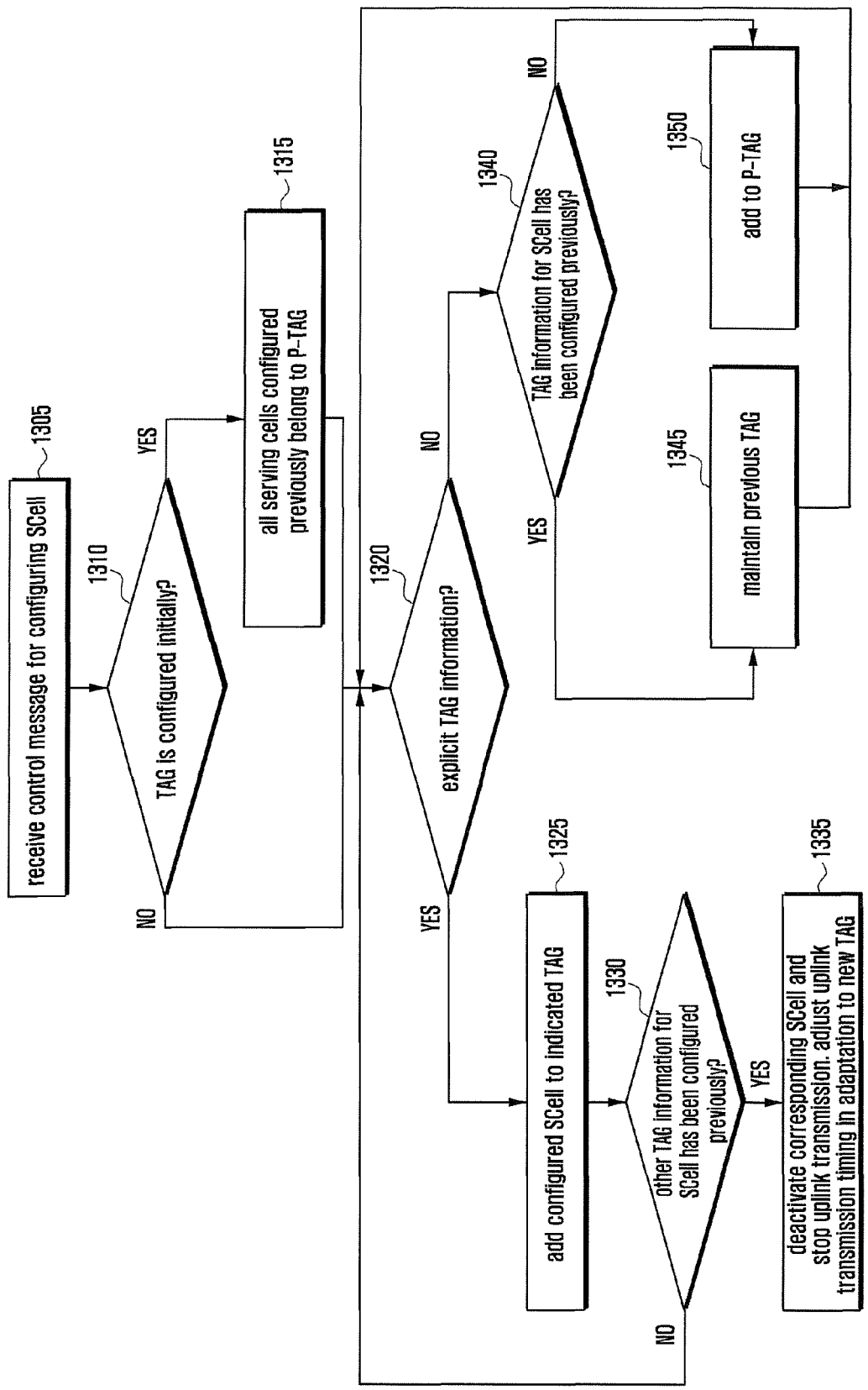
FIG. 13 is a flowchart illustrating the UE operation according to the fourth embodiment.

FIG. 13 is a flowchart illustrating the UE operation according to the fourth embodiment.

Referring to FIG. 13, if the UE receives a control message for configuring SCell and TAG from the eNB at step 1305, the procedure goes to step 1310.

At step 1310, the UE determines whether the control message is the initial control message including the TAG configuration information. That is, no TAG is configured to the UE explicitly before receiving the control message, and the UE determines whether all the serving cells share the same uplink transmission timing. If this condition is fulfilled, the UE configures all of the servings configured previously into P-TAG at step 1315. Then the UE performs steps 1320 to 1350 per SCell to be configured newly or for which TAG information is indicated to determine the TAG to which the corresponding SCell belongs for the SCells to be configured newly.

The UE selects the SCell to which the TAG configuration operation is not performed among the SCells and determines whether the control message includes the TAG information for the SCell explicitly at step 1320 and, if so, the procedure goes to step 1325 and, otherwise, step 1340.

The UE adds the SCell to the TAG indicated by the TAG information (i.e. sets the uplink transmission timing of the SCell to the same value as the other SCells of the TAG) at step 1325, and then the procedure goes to step 1330.

At step 1330, the UE determines whether any TAG information different from the current TAG information has been configured for the SCell. If not so, the UE performs the TAG configuration operation for the next SCell at step 1320. If any TAG information different from the current TAG information has been configured, this means that the TAG of the SCell is changed from on TAG to another, and the procedure goes to step 1335. At step 1335, the UE does not perform uplink transmission in the SCell until the uplink transmission timing is adjusted. Particularly, the UE mutes the periodic uplink signal such as Sounding Reference Signal (SRS). In order to accomplish this, the UE deactivates the SCell by itself. For example, the UE may stop or terminate the deactivation timer of the SCell. The deactivation timer is the timer managed per SCell and restarts whenever scheduling per SCell occurs and, if the timer expires, the UE deactivates the SCell.

The UE adjusts the uplink transmission timing of the SCell in match with the new TAG and then returns the procedure to step 1320.

At step 1340, the UE determines whether the TAG information has been configured for the SCell previously. That is, the UE determines whether the SCell belongs to a TAG. If so, the procedure goes to step 1345 and, otherwise, step 1350.

At step 1345, the UE determines to maintain the TAG of the corresponding SCell and returns the procedure to step 1320.

At step 1350, the UE adds the corresponding SCell to the P-TAG and returns the procedure to step 1320.

Fifth Embodiment

As described above, the PDCP layer processes the data from the upper layer and transfers the processed data to the RLC layer and processes the data from the RLC and transfers the processed data to the upper layer. The PDCP layer is responsible for ciphering data from the upper layer and deciphering the data from the RLC layer. The UE ciphers the upper layer data at an appropriate time and generates PDCP PDU to the RLC layer at the time when the uplink transmission resource is available. The PDCP layer stores the PDCP packet (PDCP PDU or PDCP SDU) until the RLC layer checks that corresponding data is transmitted successfully. If a timer pertaining to the PDCP packet (hereinafter, referred to as timer 1) expires, the PDCP packet is discarded even though the successful transmission is not confirmed by the RLC layer. The timer 1 starts at the time when a PDCP packet arrives at the PDCP layer and the length of the timer is set by the network.

The PDCP reception entity performs deciphering using the PDCP sequence number (PDCP SN) of the received PDCP PDU as follows.

1. COUNT determination. The COUNT is a 32-bit integer incrementing by 1 at every packet. The LSBs of COUNT are PDCP SN, and the rest MSBs are Hyper Frame Number (HFN). The length of the HFN varies depending on the length of the PDCP SN. For example, if the PDCP SN is 12 bits, the HFN is 20 bits; and if the PDCP SN is 15 bits, then the HFN is 17 bits. The PDCP device maintains and manages the variables related to the PDCP SN (Next_PDCP_RX_SN; value obtained by adding 1 to the highest PDCP SN among the received SNs) and which received most recently (or having highest SN or expected to be received next) and the variables (RX_HFN) related the HFN in use currently. If a PDCP PDU is received, the PDCP layer compares the SN of the PDCP PDU with Next_PDCP_RX_SN to determine whether to increment HFN. For example, as the comparison result, if it is determined that the received PDCP SN is wraparound (i.e. SN reaches the maximum value and then returns to 0 to increase again), the PDCP layer increments HFN by 1 and, otherwise, maintains the HFN. In order to determine whether the SN is wraparound, the PDCP layer uses Reordering_Window. The Reordering_Window has a size as long as half the number of sequence numbers indicated by the PDCP SN. For example, if the PDCP SN is 12 bits, the Reordering_Window size is 2048 as half of 4096 and, if the PDCP SN is 15 bits, 16384 as half of 32768. The UE determines whether the difference between the received PDCP SN and Next_PDCP_RX_SN is greater than the size of the Reordering_Window to determine whether to increment HFN.

2. The UE deciphers the received PDCP PDU by applying the determined COUNT and using a predetermined key.

If handover occurs, retransmission of the missing PDCP packet may be requested. After inter-eNB handover is performed, the UE and the eNB protect against data loss by exchanging PDCP STATUS REPORT. In the example of downlink transmission, the source eNB 1715 sends the UE 1705 a HANDOVER COMMAND message at step 1720 and forwards the PDCP SDUs of which successful transmission is not confirmed to the target eNB 1710 at step 1725. After being handed over to the target eNB, the UE sends the target eNB a HANDOVER COMPLETE message to notify that the handover is successful at step 1730. If the target eNB allocates uplink transmission resource to the UE at step 1735, the UE sends the target eNB a PDCP STATUS REPORT including downlink PDCP SDU reception status at step 1740. The target eNB performs downlink data transmission starting from the missing PDCP SDUs by referencing the PDCP STATUS REPORT at step 1745.

At this time, if the difference between the SN of the missing PDCP SDU to be retransmitted and the Next_PDCP_RX_SN of the UE is equal to or greater than the Reordering_Window, the UE regards the missing PDCP SDU as a new PDCP SDU so as to increment HEN by 1 erroneously. For example, the UE requests for retransmission of the PDCP SN 10 using the PDCP STATUS REPORT and, at this time, the Next_PDCP_RX_SN is 3000. If the eNB retransmits the PDCP SN 10, the distance between 10 and 3000 is greater than the Reordering_Window and thus the UE misunderstands the SN 10 as wraparound sequence number.

The above problem occurs because the difference between the sequence number of the PDCP PDU and the Next_PD- CP_RX_SN of the PDCP reception entity is greater than the Reordering_Window size. Accordingly, the best solution is to prevent the PDCP transmission entity from causing the above problem. However, the PDCP transmission entity cannot adjust the Next_PDCP_RX_SN, this solution is not applicable. The present invention proposes the following solution.

The PDCP transmission entity manages the sequence number of the packet to be transmitted next with a variable called Next_PDCP_TX_SN.

The PDCP transmission entity transmits a new packet to update Next_PDCP_TX_SN only when the difference between the Next_PDCP_TX_SN and a predetermined sequence number x is not greater than the Reordering_Window.

The X is the lowest sequence number among the sequence numbers of the PDCP packets that are transmitted but successful transmission thereof are not confirmed by the RLC layer (or the sequence number of the PDCP packet arrived first at the PDCP buffer among the PDCP packets that are stored in the current PDCP buffer but not transferred to the lower layer).

Since the Next_PDCP_TX_SN is equal to or greater than the Next_PDCP_RX_SN always, it is possible to prevent the PDCP reception entity to requesting for retransmission of the PDCP packet of which sequence number is less than the Next_PDCP_RX_SN as much as Reordering_Window by controlling such that the packet of which sequence number is greater than the least sequence number X among the PDCP packets which is likely to be retransmitted (i.e. PDCP packets transmitted already but successful transmission thereof is not confirmed by the RLC layer) as much as Reordering_Window (i.e. the Next_PDCP_TX_SN does not exceed the X+Reordering_Window).

Figure 18:
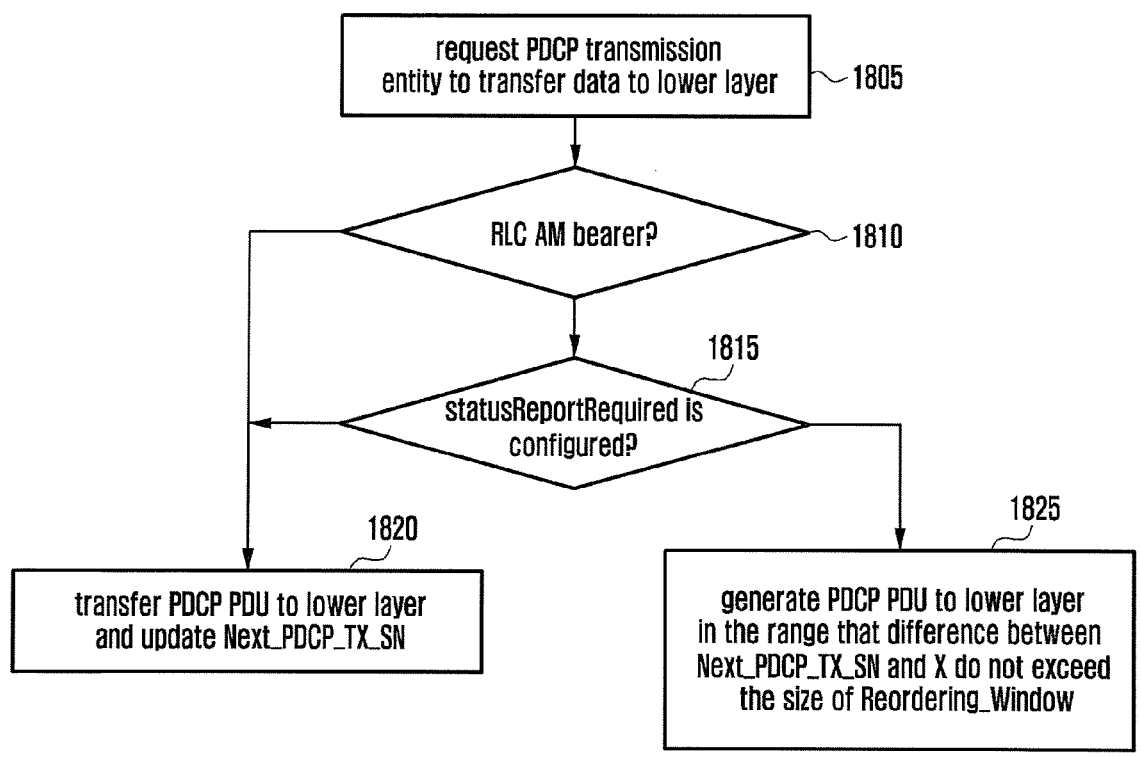
FIG. 18 is a flowchart illustrating a PDCP transmission entity operation according to the fifth embodiment.

The operation of the PDCP entity is depicted in FIG. 18.

A request for transferring data to the lower layer is made to a PDCP entity at step 1805. For example, if the UE is allocated uplink transmission resource, the MAC layer selects a PDCP entity to transmit data according to an predetermined criterion and requests the selected PDCP entity to generate a PDCP PDU.

The PDCP entity determines whether the RLC entity connected thereto is an RLC Acknowledged Mode (AM) entity at step 1810. The RLC entity may operate in one of AM, Unacknowledged Mode (UM), and Transparent Mode (TM) and, the retransmission of the PDCP layer occurs only when the RLC entity is the RLC AM entity, i.e., when the PDCP entity belongs to the RLC AM bearer. If the RLC bearer is the RLC AM bearer, the procedure goes to step 1815 and, otherwise, step 1820. At step 1815, the PDCP entity determines whether statusReportRequired is configured. It is not necessary to apply the retransmission of the PDCP layer to all RLC AM bearers. In order to apply the PDCP layer retransmission operation for RLC AM bearer selectively per bearer, the eNB configures whether to perform the PDCP retransmission operation (operation in which the PDCP reception entity generates the PDCP status report and the PDCP transmission entity retransmits the missing PDCP PDU) to the UE using the parameter per RLC AM bearer. If the parameter is set to 'YES,' this means that there is HFN error probability due to the PDCP retransmission afterward and thus the procedure goes to step 1825. If the parameter is set to 'NO,' there is no probability of error caused by PDCP retransmission and thus the procedure goes to step 1820.

At step 1820, the UE generates PDCP PDUs as many as necessary to the lower layer independently of the distance between X and Next_PDCP_TX_SN. Whenever the PDCP PDU is transferred to the lower layer, the UE updates the Next_PDCP_TX_SN by referencing the sequence number of the corresponding PDCP PDU.

At step 1825, the UE generates the PDCP PDUs to the lower layer in the range that the distance between the Next_PDCP_TX_SN and X does not exceed the size of Reordering_Window. That is, the UE generates PDCP PDUs to the lower layer such that the COUNT value corresponding to (X+Reordering Window) does not becomes greater than the COUNT value corresponding to the Next_PDCP_TX_SN.

The HFN error also may occur when the number of PDCP PDUs to be discarded due to the expiry of the timer 1 is greater than the Reordering_Window. Typically, upon receipt of a packet from the upper layer, the UE ciphers the packet immediately to generate and store a PDCP buffer. If the lower layer requests for data transfers afterward, the PDCP layer transfers the PDCP PDU generated in advance to the lower layer. The reason for deciphering the data in advance is because the deciphering is a very complex operation and thus it may be difficult to continue deciphering especially when the data is transmitted at a high data rate.

If the PDU is not transferred to the low layer until the timer 1 expires after the PDCP PDU is generated, the PDU is discarded. If the number of PDUs discarded consecutively without being transferred to the lower layer is greater than a predetermined threshold (e.g. Reordering_Window), FHN error may occur.

Figure 19:
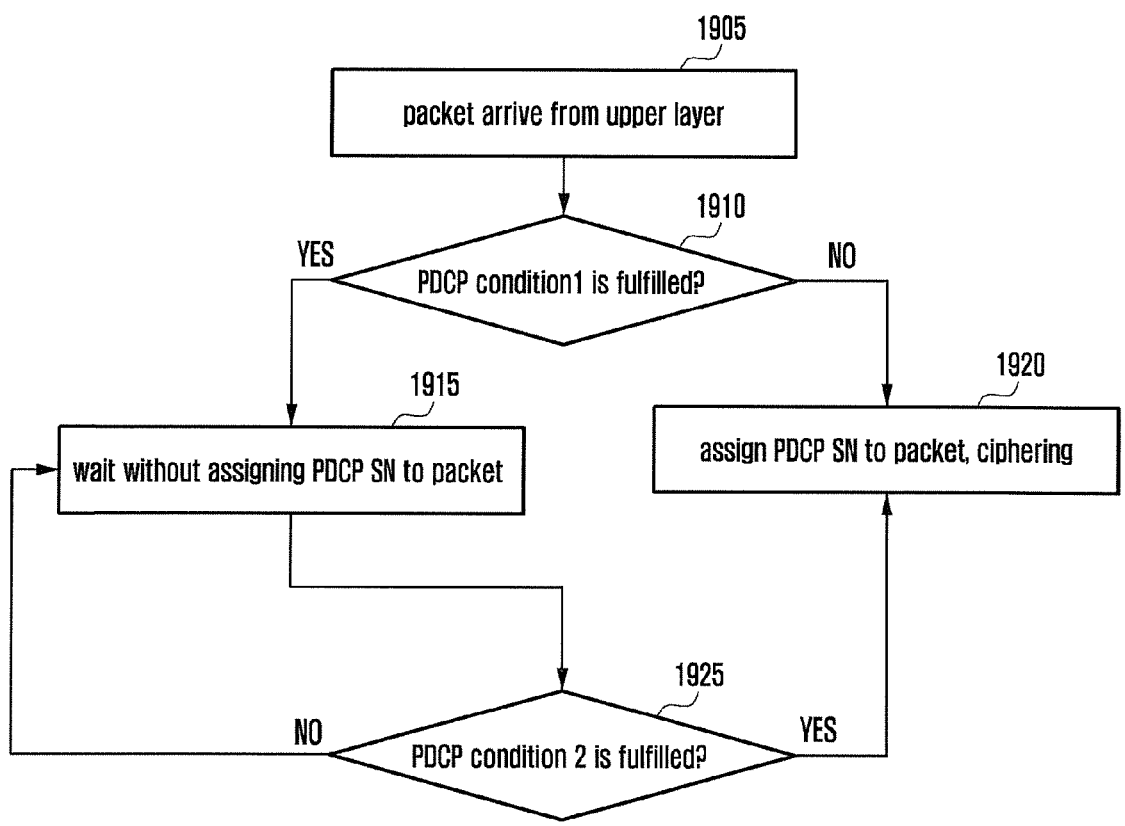
FIG. 19 is a flowchart illustrating another UE operation according to the fifth embodiment.

An operation for solving the above problem is depicted in FIG. 19.

If a packet arrives from the upper layer at step 1905, the UE starts timer 1 for the corresponding packet, and the procedure goes to step 1910. At step 1910, the UE assigns a PDCP SN to the packet and checks the PDCP condition 1 to determine whether to cipher the packet at step. If the PDCP condition 1 is fulfilled, the procedure goes to step 1915 and, otherwise, step 1920. The PDCP condition 1 is of determining the HFN error probability when the sequence number is assigned immediately as follows.

[PDCP Condition 1]

The number of the first type PDCP PDUs is greater than threshold 1.

The first type PDCP PDU is the PDCP PDU which has been assigned a sequence number and ciphered but not transferred to the lower layer (i.e. not transmitted). Since the first type PDCP PDU may become the second type PDCP PDU potentially, whether to assign the PDCP sequence number is determined based on the number of the first type PDCP PDUs. The second type PDCP PDU is the PDCP PDU discarded due to the expiry of the first timer among the PDCP PDUs that have been assigned sequence numbers and ciphered but not transferred to the lower layer. The threshold 1 is set to an appropriate value based on the Reordering_Window size, recent radio channel status, data rate, and UE processing capability. For example, if the UE has a high processing capability, the necessity of ciphering in advance decreases and thus the threshold 1 may be set to a low value. If the channel condition is good and the data rate is high, the threshold 1 may be set to a high value. The maximum value of the threshold 1 cannot exceed the Reordering_Window size.

[Another PDCP Condition 1]

The number of the second type PDCP PDUs is greater than threshold 2.

It is also preferred to set the threshold 2 to a value based on the Reordering_Window size, recent radio channel status, data rate, and UE processing capability but less than threshold 1.

The UE generates a PDCP PDU by assigning a sequence number to the packet and ciphering the packet and stores the PDCP packet in the PDCP buffer at step 1920. Next, the UE waits for a new packet.

The UE waits without assigning any PDCP SN to the packet at step 1915. Next, the UE determines whether the PDCP condition 2 is fulfilled at step 1925. The PDCP condition 2 is of determining whether the UE resumes the 'immediate PDCP SN assignment' operation which has been suspended. If the condition 1 is fulfilled, this means that the PDCP PDU has not been transmitted for relatively long duration and, if the PDCP PDU transmission is resumed and at least one PDCP PDU is transmitted to the peer PDCP entity successfully, the HFN error does not occurs. Accordingly, the PDCP condition 2 may be defined as follows.

[PDCP Condition 2]

After PDCP condition 1 is fulfilled, the number of PDCP PDUs transferred to the low layer is greater than threshold 3.

The threshold 3 may be determined depending on the mode of the connected RLC entity. If an RLC AM entity is connected, the threshold 3 may be set to a relatively low value, e.g. 1 or 2, because the RLC AM provides reliable transmission service. If an RLC UM entity is connected, it is preferred to set the threshold 3 to a value greater than that.

[Another PDCP Condition 2]

After PDCP condition 1 is fulfilled, the lower layer checks the successful transmission of at least one PDCP PDU among the PDCP PDUs transferred to the lower layer.

If the PDCP condition 2 is fulfilled, the UE assigns a PDCP sequence number to the packet and decipher the packet at step 1920.

Sixth Embodiment

The power control of the UE becomes important more and more. Large part of power consumption of the UE occurs in uplink transmission. Therefore, it is very important to minimize unnecessary uplink transmission.

Part of uplink transmission has the following properties.
Information for assisting scheduling other than actual user data
Periodic transmission at a predetermined interval
Information useful in the course of active data transmission but having low usability when there is no data communication The CQI and SRS transmissions are representative examples. The periodic CQI or SRS transmission is performed by the UE autonomously at a predetermined interval. If the eNB determines that there is no data transmission to the UE during a long period, it is necessary for the UE to stop autonomous transmission.

In order to accomplish this, the present invention proposes a new MAC CE (hereinafter, referred to as first MAC CE). The first MAC CE includes a bitmap having a predetermined size. Each bit of the bitmap corresponds to the serving cell identifier or TAG one by one. If the first MAC CE is received, the UE operates as follows.

If a bit corresponding to the PCell is set to a predetermined value, the UE stops CQI and SRS transmissions in the PCell.

If a bit corresponding to an SCell is set to a predetermined value, the UE stops SRS transmission in the SCell.

If a bit corresponding to the P-TAG is set to a predetermined value, the UE stops CQI and SRS transmission in the PCell and SRS transmission in the SCells belonging to the P-TAG.

If a bit corresponding to an S-TAG is set to a predetermined value, the UE stops SRS transmission in the serving cells belonging to the S-TAG.

The UE restarts the CQI and SRS transmissions as follows.

[Transmission Restart Condition]

If a PDCCH control information requesting for aperiodic CQI transmission is received, the UE restarts periodic CQI transmission in the PCell.

If a PDCCH control signal requesting for aperiodic SRS transmission in a predetermined serving cell and if periodic SRS transmission is configured to the serving cell, the UE restarts periodic SRS transmission.

The PDCCH control signal requesting for aperiodic CQI transmission is the uplink transmission resource allocation control message of which a predetermined field (CQI-request) is set to a predetermined value.

The PDCCH control signal requesting for aperiodic SRS transmission is the transmission resource allocation control message of which another predetermined field is set to a predetermined value.

Figure 20:
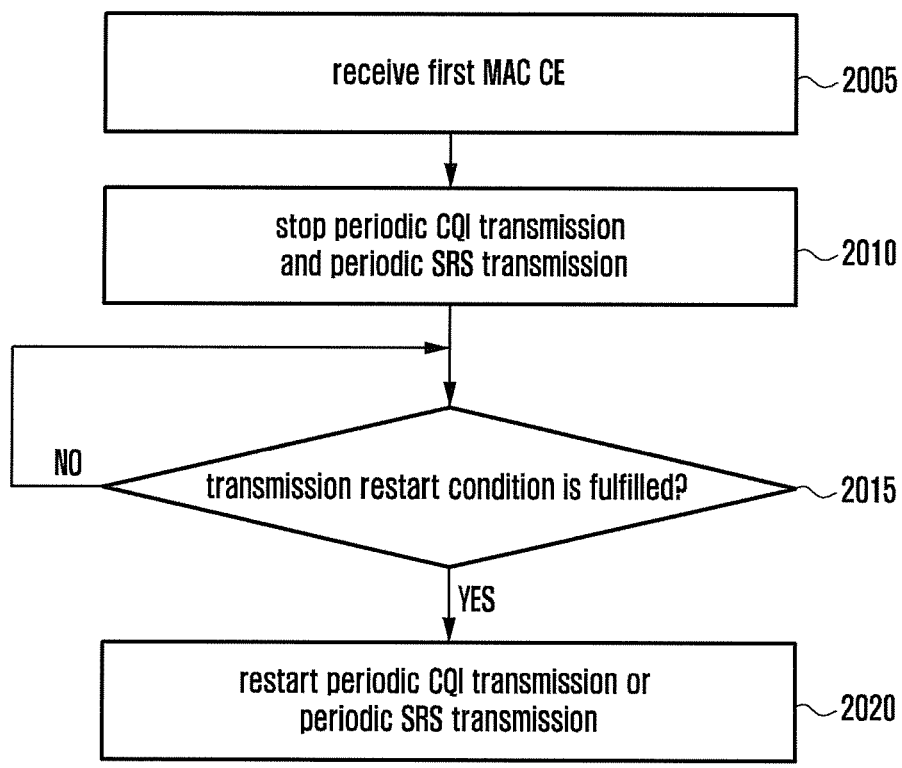
FIG. 20 is a flowchart illustrating the UE operation according to the sixth embodiment.

FIG. 20 shows a UE operation.

The UE receives the first MAC CE at step 2005. The UE checks a predetermined field (Logical Channel Identifier (LCID)) of the MAC header corresponding to the MAC CE to determine whether the MAC CE is the first MAC CE.

The UE checks the bitmap of the first MAC CE to stop the periodic SRS transmission in the indicated serving cell at step 2010. If the indicated serving cell is the PCell, the UE stops the periodic CQI transmission. At this time, the UE maintains the periodic CQI and SRS configuration informations. Also, in order to minimize battery power consumption, if the current DRX cycle is the short DRX cycle, the UE transitions to the long DRX cycle. In order to accomplish this, the UE determines whether the drxShortCycleTimer is running and, if so, stops the drxShortCycleTimer.

The UE monitors to determine whether the transmission restart condition is fulfilled and, if the transmission restart condition is fulfilled in a predetermined serving cell, the UE restarts the periodic CQI or SRS transmission at step 2020.

Seventh Embodiment

Figure 21:
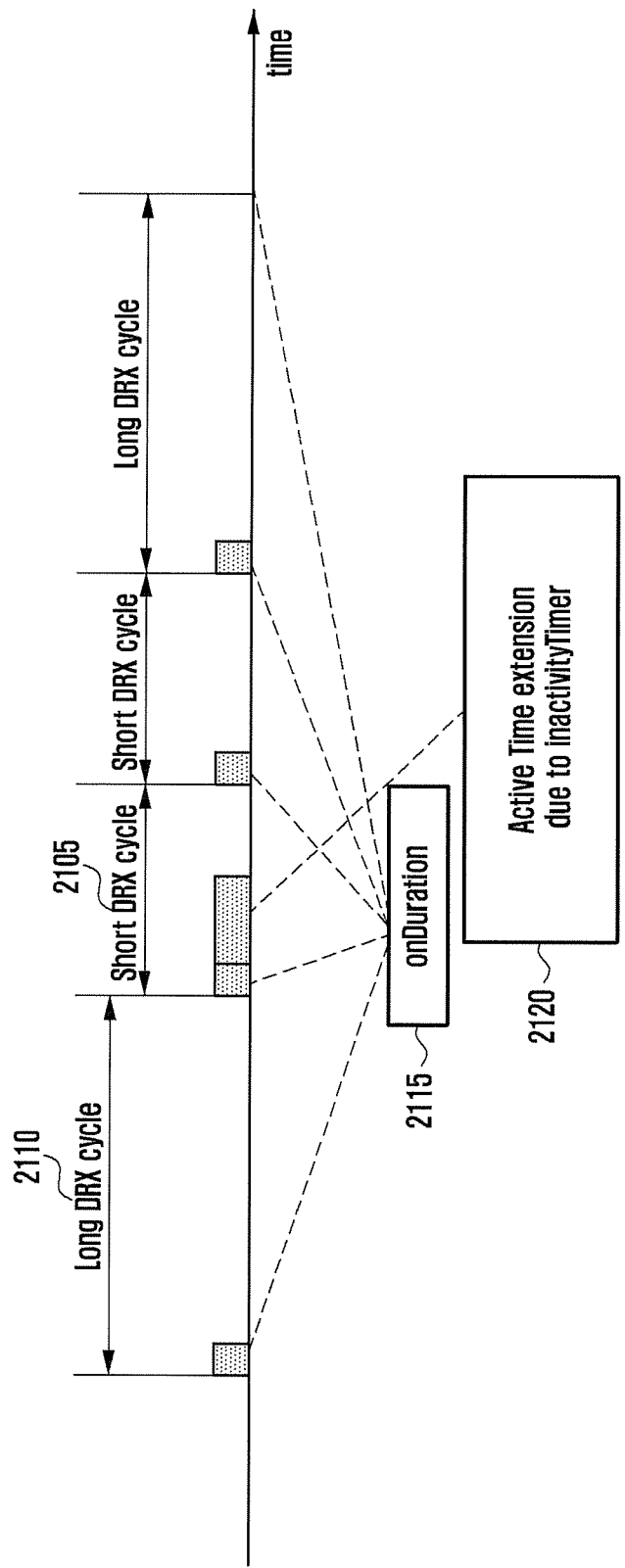
FIG. 21 is a diagram illustrating the normal DRX operation.

FIG. 21 shows a DRX operation.

DRX is a technique to minimize the power consumption of the UE in the non-Active Time by monitoring Physical Downlink Control Channel (PDCCH) and transmitting Channel Status Indicator/Information (CSI) and Sounding Reference Signal (SRS) in a predetermined period called Active Time.

The Active Time occurs at every DRX cycle, and the period of Active Time is applied differently depending on the traffic condition of the UE. For example, if a predetermined condition is fulfilled, the UE uses a short cycle called short DRX cycle 2105 and, otherwise if the condition is not fulfilled, a long cycle called long DRX cycle 2110.

At every DRX cycle, the Active time having a relatively short duration called onDuration 2115 starts and, if new data is scheduled in this duration, the Active Time is extended with the inactivityTimer as denoted by reference number 2120. The inactivity Timer starts or restarts whenever new data is scheduled and, if the UE traffic is large, extends the active time correspondingly.

The CSI means the feedback related to the downlink channel quality such as Channel Quality Indicator (CQI) and Rank Indicator (RI) and MIMO operation and is transmitted through Physical Uplink Control Channel (PUCCH) or Physical Uplink Shared Channel (PUSCH). Typically, CSI means CQI and, in this embodiment, the terms CSI and CQI are used interchangeably. The UE can be configured to transmit CSI through a predetermined PUCCH transmission resource at a predetermined interval and, if the UE transmits CSI on the indicated PUCCH transmission resource, this is referred to as CSI on PUCCH. If PUSCH (or uplink channel for user data or MAC PDU transmission) transmission is scheduled in a subframe for CSI on PUCCH, the UE transmits CSI using a part of the PUSCH transmission resource to comply with the single carrier transmission rule, this is referred to as CSI on PUSCH.

According to the current standard, when the Active Time ends or extended abruptly, the UE may fall into the situation where it cannot control the CSI/SRS transmission during a certain period. For example, if the Active Time ends abruptly, although it is necessary to stop CSI/SRS transmission, the UE cannot to stop the transmission.

In order to solve this problem, degree of freedom for CSI/SRS transmission is granted to the UE during a predetermined period when the Active Time is ended or extended. However, this causes a problem of coercing the eNB into so-called double decoding. For example, the eNB performs decoding once under the assumption that the signal transmitted by the UE is not CSI/SRS transmission and then decoding again under the assumption that the CSI/SRS has been transmitted. The present invention proposes a method of allowing for CSI/SRS transmission when the CSI/SRS transmission is overlapped with the HARQ feedback or PUSCH transmission during n subframes after abrupt expiry of the Active Time and granting degree of freedom for CSI/SRS transmission when the CSI/SRS transmission is not overlapped with the HARQ feedback or PUSCH transmission.

Figure 22:
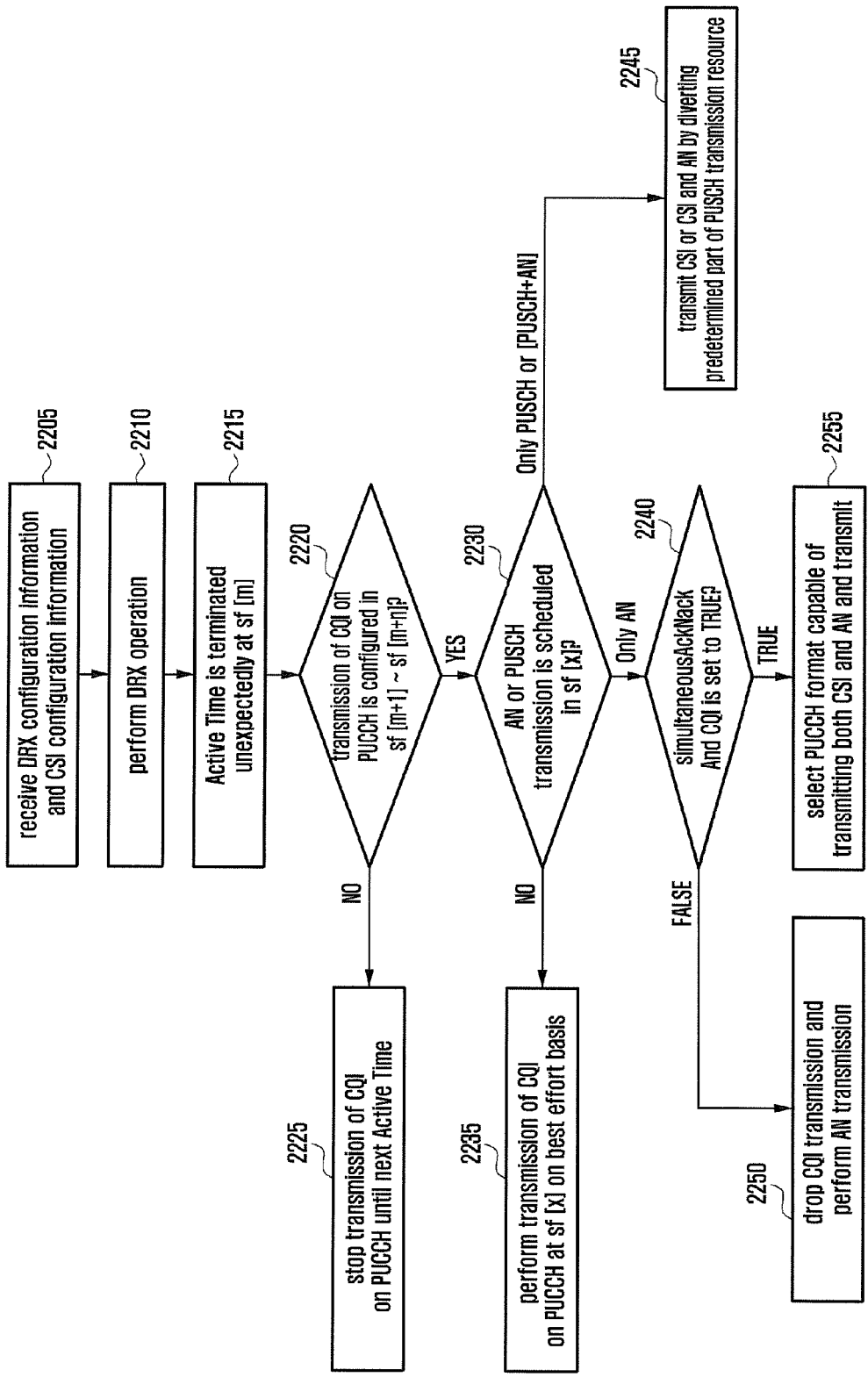
FIG. 22 is a flowchart illustrating the UE operation of determining whether to transmit CQI according to the fifth embodiment.

FIG. 22 shows the UE operation related to CSI transmission when the Active Time is terminated.

FIG. 22 shows the UE operation according to the first embodiment.

The UE receives DRX configuration information and CSI configuration information at a certain timing from the eNB at step 2205. The DRX configuration information includes DRX cycle length, DRX start time calculation information, onDuration length, and inactivityTimer length.

The CSI configuration information includes the informations as follows.

CQI transmission time information in the form of an index.
    For example, the cycle and offset mapped to an index x is predetermined such that only the index is provided.
Information on CQI transmission resource
Indicator indicating whether to allowing for simultaneous transmission of CQI and HARQ ACK/NACK (simultaneousAckNackAndCQI)

If the above information is received, the RRC of the UE transfers the information to the MAC control entity. The MAC control entity of the UE performs normal DRX operation and CQI transmission operation based on the control information at step 2210. That is, the MAC control entity determines whether it is Active Time at every subframe and, if it is the Active Time, monitors PDCCH and, if the CQI transmission is configured, performs CQI transmission. In the present invention, if the CQI transmission is configured in a certain subframe, this means that periodic CQI transmission is scheduled in the subframe. if the Active Time ends unexpectedly in the course of the normal DRX operation at step 2215, the procedure goes to step 2220. If the Active Time ends unexpectedly, this means that one of the following two situations has occurred. For explanation convenience, it is assumed that the subframe at which the Active Time ends unexpectedly is m (sf [m]) hereinafter.

1. The Discontinuous Reception MAC Control Element (DRX MAC CE) is received at the UE which maintains the Active time because the onDurationTimer or DRX-inactivityTimer is running.
2. The PDCCH indicating HARQ retransmission is received at the UE which maintains the Active Time because the HARQ retransmission timer is running.

The DRX MAC CE is the MAC control information transmitted from the eNB to the UE to instruct the UE to stop the onDuration timer and inactivityTimer. The Active time may be started and maintained for various reasons of which most normal reason is that one of the above two timers is running. Accordingly, if the DRX MAC CE is received frequently, this may entail the termination of the Active Time. If the Active time is maintained for other reasons than the running of the two timers, the UE does not stop the Active Timer although the DRX MAC CE is received.

The HARQ retransmission timer is the timer for the UE to receive the HARQ retransmission such that the UE maintains the Active Time while the timer is running. If the Active Time is maintained for other reasons than the running of the HARQ retransmission timer, the UE does not stop the Active Time although the DRX MAC CE is received.

The UE determines whether periodic CQI transmission during a predetermined number of subframes or through PUCCH is scheduled after the unexpected termination of the Active Time at step 2220. If no CQI transmission is scheduled, the UE stops the periodic PUCCH transmission or CQI transmission on PUCCH before the next Active Time at step 2225.

If the CQI transmission on PUCCH is scheduled between sf[m+1] and sf[m+n], the procedure goes to step 2230. Here, n denotes a parameter determined in consideration of the processing capability of the UE and set to a relatively large value, e.g. about 4, so as to be applied to all the UEs including the UEs having low processing capability.

If n is 4, this means that all of the UEs have to stop CQI transmission after at least 4 subframes since the end of the Active Time. For explanation convenience, the subframe at which CQI transmission is scheduled is sf [x] among the subframes sf [m+1]~sf [m+n].

The UE determines whether HARQ feedback or PUSCH transmission is scheduled in sf[x] at step 2230. For example, if the HARQ NACK or uplink grant indicating initial transmission or retransmission is received at sf [x−1], the UE transmits HARQ feedback (HARQ ACK/NACK or HARQ AN) at sf [x].

If neither HARQ feedback transmission nor PUSCH transmission is scheduled in sf [x], the procedure goes to step 2235. If only the HARQ feedback transmission is scheduled in sf [x], the procedure goes to step 2240. If both the HARQ feedback and PUSCH transmissions are scheduled or only PUSCH transmission is scheduled, the procedure goes to step 2245.

If the procedure goes to step 2235, this means that although the UE performs CQI transmission on PUCCH during the subframes sf[m+1]~sf[m+n] this does not compel the eNB to perform double decoding. Accordingly, the UE performs CQI transmission at sf [x] on a best effort basis. That is, the UE recognizes the termination of the Active Time and maintains the CQI transmission until the subframe at which the CQI transmission is supposed to be terminated arrives.

If the procedure goes to step 2240, this means that both the CQI and HARQ AN transmissions are scheduled in sf [x] and the eNB knows that the UE is transmitting the HARQ AN but does not know whether the UE is transmitting the CQI. For example, the eNB does not know whether the UE detects the expiry of the Active Time so as to transmit only the AN or does not detect yet so as to try to transmit both the CQI and AN. The UE knows that if the sf [x] falls in Active Time it is necessary to send both the CQI and AN already before 4 subframes. If sf [x−4] falls in the Active Time, it is preferred to preventing the eNB from doing double decoding by transmitting both the CQI and HARQ AN simultaneously at sf [x] in consideration that the probability in which sf [x] falls in Active time is greater than the probability in which sf [x] falls in non-active time. Also it is preferred that if sf [x−4] falls in Active Time the eNB performs decoding under the assumption that the UE transmits both the CQI and AN simultaneously regardless whether sf [x] falls in Active Time. The UE determines whether simultaneousAckNackAndCQI is set to TRUE at step 2240. If this parameter is set to FALSE, the procedure goes to step 2250. If the simultaneousAckNackAndCQI is set to False, this means that when the AN and CQI transmissions collide in the same subframe the eNB commands the UE to give up CQI transmission and transmit only the AN to maintain the property of single carrier transmission of the UE. Accordingly, at this step, since the UE has determined to give up CQI transmission already before 4 subframes, unexpected termination of Active Time does not cause any problem related to the CQI transmission, and the UE give up CQI transmission and transmits the AN at sf [x].

If the simultaneousAckNackAndCQI is set to TRUE, the UE transmit the CSI and AN at sf [x] at step 2255. In detail, the UE selects a PUCCH format capable of transmitting both the CSI and AN using the resource allocated for CSI transmission, generates the PUCCH signal in the selected PUCCH format, and transmits the PUCCH signal at sf [x]. The PUCCH format for transmitting both the CSI and AN may be any of PUCCH formats 2a, 2b, and 3. The PUCCH formats are specified in 36.213 and 36.211. Although the UE does not recognize that the sf [x] falls in Active Time due to its low processing capability, the UE performs the operation necessary, at sf [x−4], for transmitting both the CSI and AN in consideration that sf [x] is likely to fall in Active Time because the sf [x−4] falls in Active time.

If the procedure goes to step 2245, this means that the UE knows at sf [x−4] that PUSCH and CQI or PUSCH, CQI, and AN have to be transmitted simultaneously at sf [x]. If sf [x−4] falls in Active Time, sf [x] is likely to fall in Active Time. Accordingly, the UE performs, at sf [x−4], a procedure for transmitting the PUSCH and CQI simultaneously or PUSCH, CQI, and AN simultaneously. In detail, the UE diverts a part of the PUSCH transmission resource to transmit the CQI or both the CQI and AN. Which part of the transmission resource is to be diverted is specified in the standard. Also, the eNB decodes PUSCH under the assumption that if sf [x−4] falls in Active time the UE transmits the CQI or both the CQI and AN using PUSCH at sf [x] in consideration that sf [x] is likely to fall in Active Time.

Figure 25:
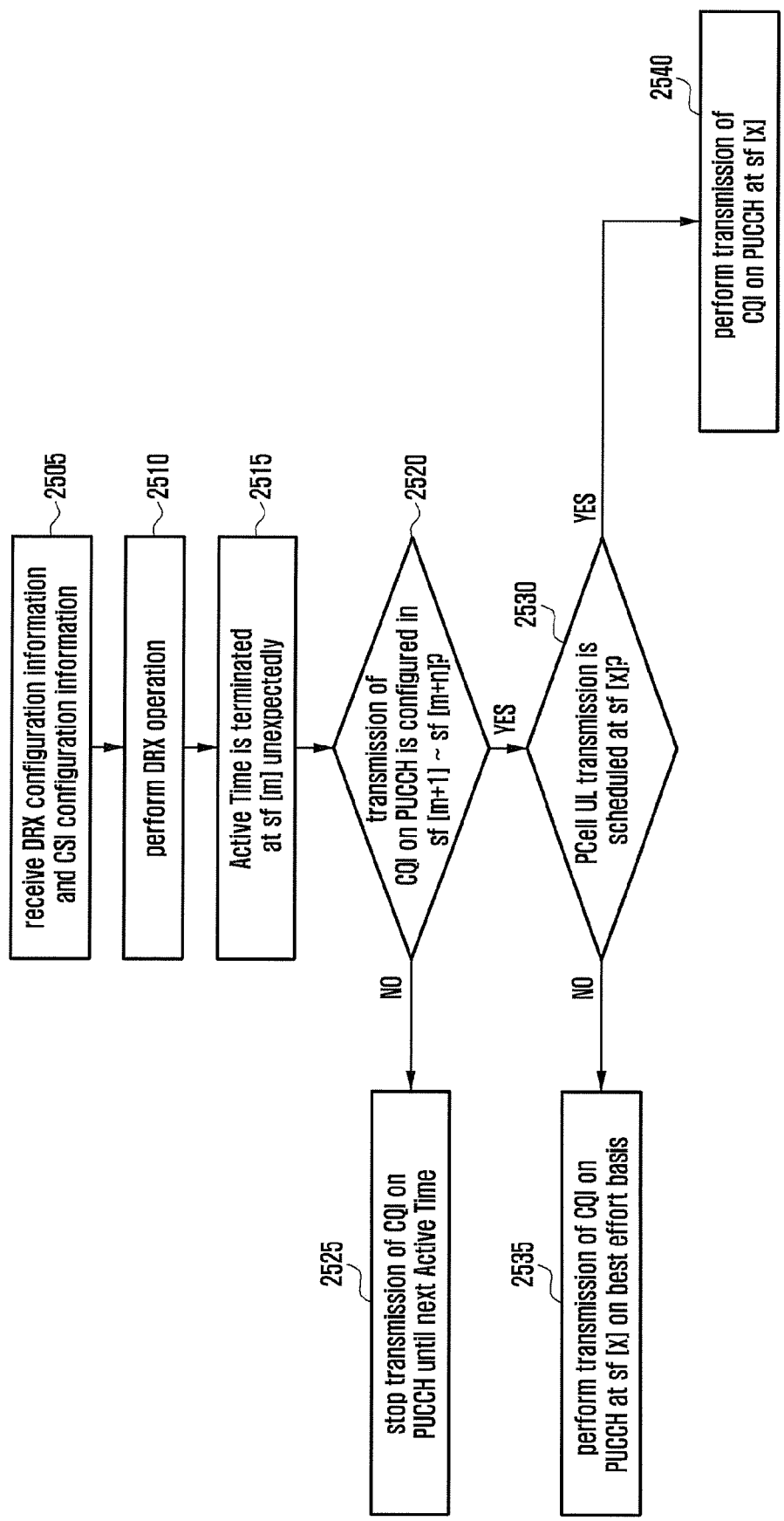
FIG. 25 is a flowchart illustrating another UE operation of determining whether to transmit CQI according to the seventh embodiment.

In sf [x], the uplink signal such as Scheduling Request (SR) as well as PUSCH and AN may be scheduled. If a plurality of serving cells is configured, the PUSCH or SRS of other serving cells may be scheduled in sf [x]. At this time, the SR transmission also may influence the CQI transmission. Meanwhile, the PUSCH or SRS transmission of a serving cell other than PCell does not influence the CQI transmission of the PCell. FIG. 25 shows the UE operation thereof.

Step 2505 is similar to step 2205. At step 2505, however, it is different that the SR transmission resource information may be configured to the UE. SR is the signal for the UE to request the eNB for transmission resource allocation. The eNB may allocate the resource for transmitting 1-bit SR to the UE in PUCCH region and, if new data with a high priority occurs, the UE transmits the SR using the SR transmission resource configured in the PUCCH region.

Step 2510 is identical with step 2210.
Step 2515 is identical with step 2215.
Step 2520 is identical with step 2220.
Step 2525 is identical with step 2225.

The UE determines whether other uplink transmission of the PCell is scheduled in sf [x] and, if so, the procedure goes to step 2540 and, otherwise, step 2535. PCell is a specific serving cell among the plural serving cells configured to the UE and likely to be the serving cell which was the serving cell of the UE before Carrier Aggregation (CA) is configured. The serving cells configured to the UE are sorted into PCell and SCell that are characterized as follows in view of uplink transmission.

PCell: To support PUSCH, PUCCH, and SRS transmissions.

SCell: To support PUSCH and SRS transmission but not PUCCH transmission.

The PUCCH carries CQI, AN, and SR.

Other uplink transmissions of the PCell include AN transmission, SR transmission, PCell SRS transmission, and PCell PUSCH transmission with the exception of CQI transmission.

For example, if the HARQ NACK corresponding to the PCell PUSCH or uplink grant indicating initial transmission or retransmission in the PCell at sf [x−4], the UE performs PCell PUSCH transmission at sf [x]. If the PDSCH is received through at least one serving cell among the serving cells including the PCell at sf [x−4], the UE transmit HARQ feedback (HARQ ACK/NACK or HARQ AN) at sf [x]. For reference, the PCell PUSCH transmission is performed only when the uplink grant to (or for) the PCell is received, but the AN is transmitted through the PCell although the PDSCH is received through a serving cell which is not the PCell.

If the procedure goes to step 2535, this means that although the UE has transmitted CQI on PUCCH in the subframes sf [m+1] ~sf [m+n] and the eNB does not compelled to perform double decoding. Accordingly, the UE transmit CQI at sf [x] on a best effort basis. That is, the UE recognizes the termination of the Active Time and maintains the CQI transmission until the subframe at which the CQI transmission is supposed to be terminated arrives.

If the procedure goes to step 2540, this means that the UE has to perform the CQI transmission along with other uplink transmission at sf [x] of the PCell. Typically, the other uplink transmission is scheduled before at least 4 subframes, the UE knows at least at sf [x−4] that the CQI and other uplink transmissions have to be performed simultaneously. If sf [x−4] falls in Active Time, sf [x] is also likely to fall in Active time. Accordingly, the UE the UE performs a procedure at sf [x−4] for transmitting the CQI and other uplink signal of the PCell. In detail, the UE diverts a part of the PUSCH transmission resource to transmit the CQI or both the CQI and AN or selects the PUCCH format capable of transmitting both the CQI and other uplink signal and generates the PUCCH signal. Also, the eNB decodes PUSCH under the assumption that if sf [x−4] falls in Active time the UE transmits the CQI or both the CQI and AN using PUSCH at sf [x] in consideration that sf [x] is likely to fall in Active Time.

Figure 23:
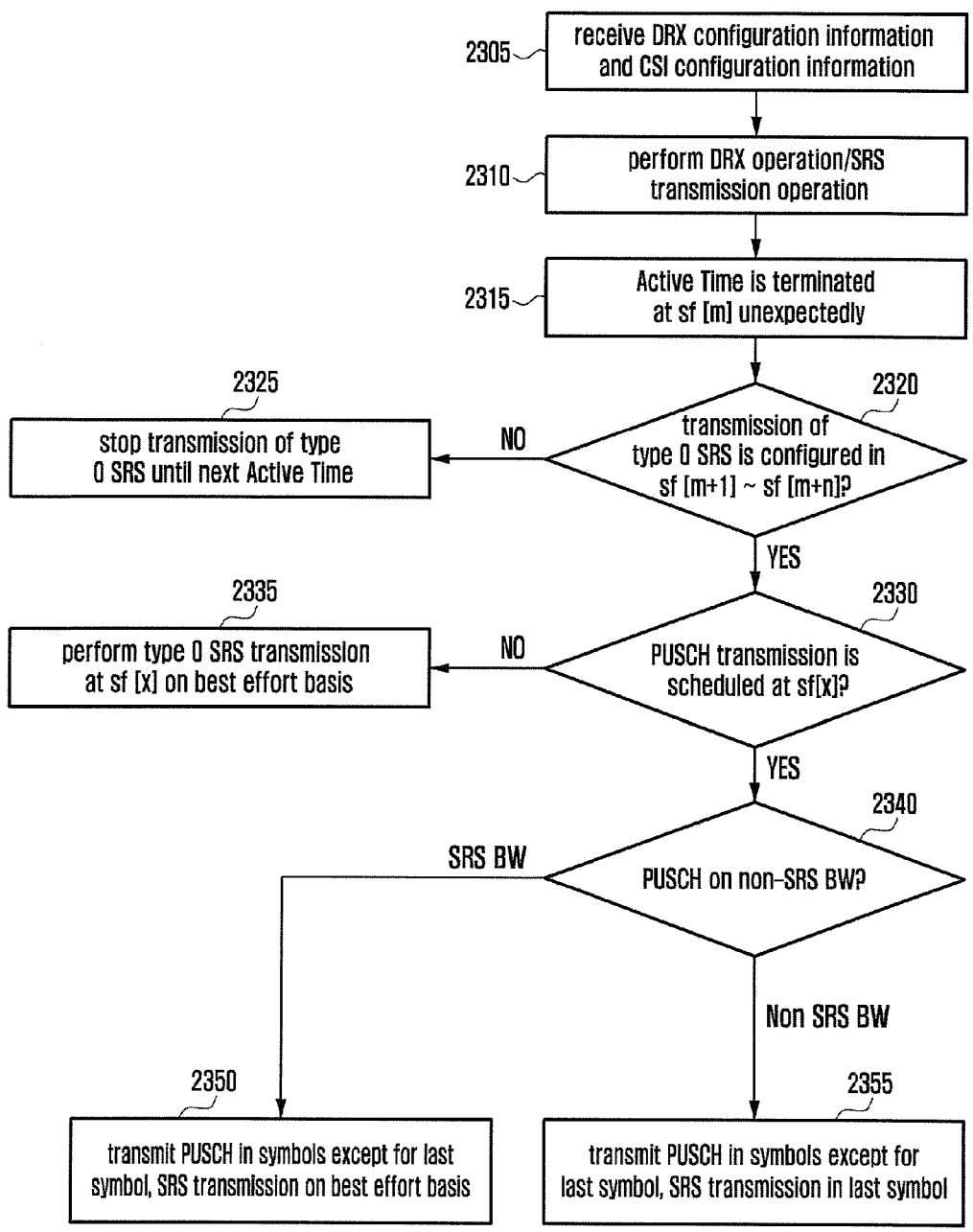
FIG. 23 is a flowchart illustrating the UE operation of determining whether to transmit SRS according to the fifth embodiment.
Figure 24:
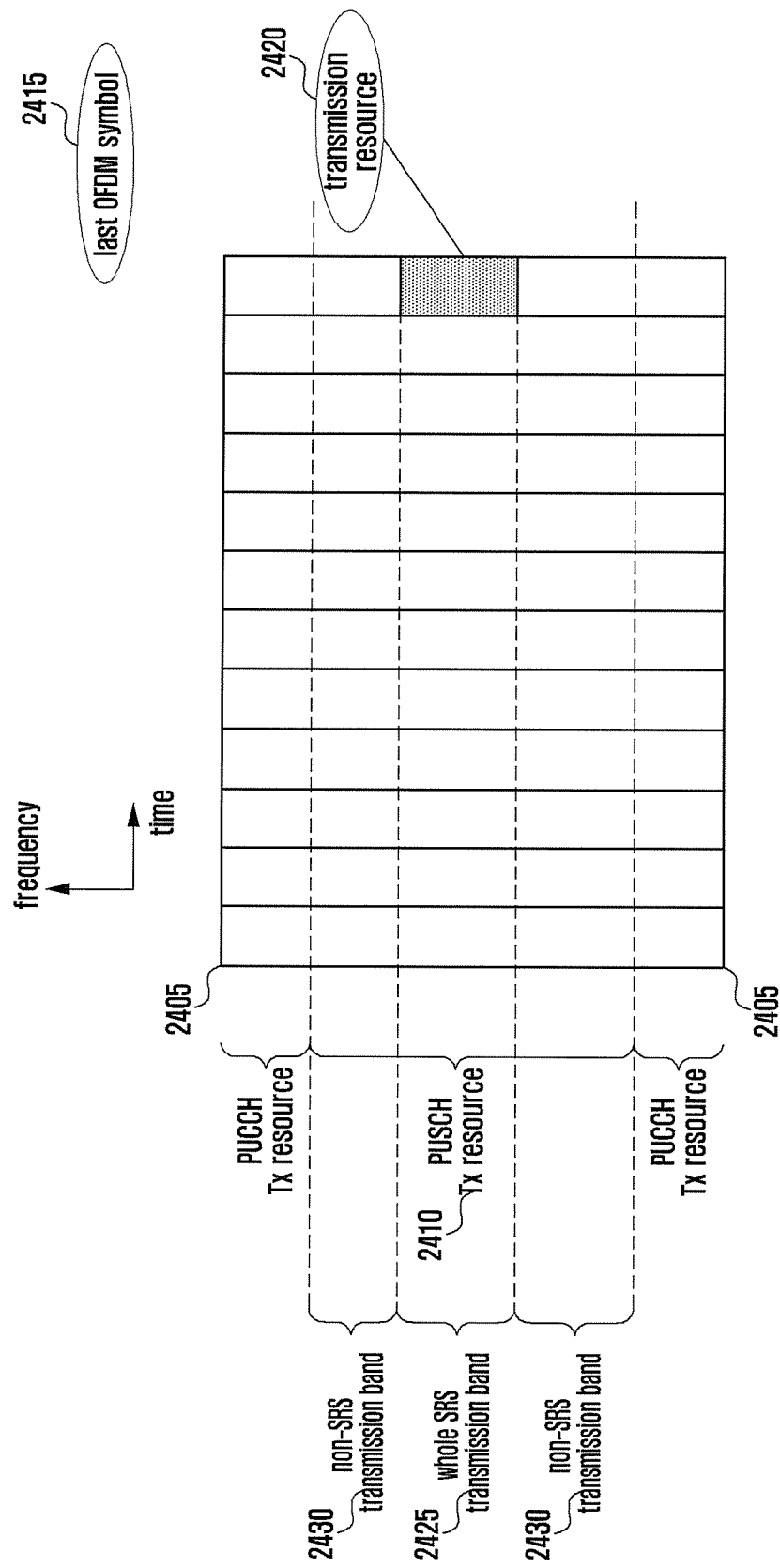
FIG. 24 is a diagram illustrating SRS transmission.

FIG. 23 shows the UE operation related to SRS transmission when the Active Time ends.

The UE receives DRX configuration information and type 0 SRS configuration information from the eNB at a certain time point at step 2305. The type 0 SRS is the SRS transmitted periodically for a relatively long time and include the following configuration informations. For reference, type 1 SRS is the SRS which is transmitted by the eNB through PDCCH to command transmission as much as predetermined number of time in a short period unlike the type 0 SRS.

Dedicated SRS transmission bandwidth

The SRS transmission time information is given in the form of an index.

In more detail, the SRS is transmitted at the last OFDM symbol of a subframe across a predetermined transmission bandwidth. The frequency resource of a subframe includes PUCCH transmission resource region 2405 and PUSCH transmission resource region 2410. One subframe consists of a predetermined number of OFDM symbols, and the SRS transmission resource 2420 may be configured at part or whole of the PUSCH transmission resource of the last symbol 2415. The SRS transmission resource is configured to predetermined frequency resources, and the entire bandwidth 2425 of the SRS transmission resource is broadcast through the system information. The UE transmits SRS through part or whole of the SRS transmission bandwidth and this is given as the dedicated SRS transmission bandwidth information of the RRC control message.

The UE determines the subframe and frequency resource therein for transmitting SRS using the SRS transmission time information and dedicated transmission bandwidth information.

If the DRX configuration and type 0 SRS configuration information is received, the RRC of the UE sends the above information to the MAC control entity of the UE. The MAC control entity of the UE performs the normal DRX operation and type 0 SRS transmission operation by applying the above control information at step 2310. That is, the MAC control entity determines whether every subframe falls in Active Time and, if so, monitors PDCCH and, of the type 0 SRS transmission is configured, transmits SRS using a predetermined transmission resource of the last symbol. If the type 0 SRS transmission is configured in a subframe, this means the type 0 SRS transmission is scheduled in the subframe according to the type 0 SRS configuration information. If the Active Time is terminated unexpectedly in the course of the normal DRX operation at step 2315, the procedure goes to step 2320. For explanation convenience, it is assumed that the Active time is terminated unexpectedly at sf [m].

At step 2320, the UE determines whether type 0 SRS transmission is scheduled during a predetermined number of subframes after the unexpected termination of the Active Time. If not scheduled, the UE suspends the type 0 SRS transmission to the next Active time at step 2325.

If the type 0 SRS transmission is scheduled in the subframes sf [m+1] ~sf [m+n], the procedure goes to step 2330. Here, n is a parameter determined in consideration of the processing capability of the UE and set to a relatively large value, e.g. about 4, so as to be applied all the UEs including the UEs having low processing capabilities.

If n is 4, this means that all of the UEs have to stop type 0 SRS transmission after at least 4 subframes since the end of the Active Time. For explanation convenience, the subframe at which type 4 SRS transmission is scheduled is sf [x] among the subframes sf [m+1]~sf [m+n].

The UE determines whether the PUSCH transmission is scheduled in sf [x] at step 2330. For example, if an HARQ NACK or an uplink grant indicating initial transmission or retransmission is received at sf [x−4], the UE transmits PUSCH at sf [x].

If no PUSCH transmission is scheduled in sf [x], the procedure goes to step 2335 and, otherwise if PUSCH transmission is scheduled in sf [x], step 2340.

If the procedure goes to step 2335, this means that although the type 0 SRS transmission which should be suspended is in the subframes sf [m+1]~sf [m+n] is performed the eNB is not compelled to perform double decoding. Accordingly, the UE performs type 0 SRS transmission on the best effort basis at sf [x]. That is, the UE recognizes the termination of the Active Time and maintains the type 0 SRS transmission until the subframe at which the type 0 SRS transmission is supposed to be terminated arrives.

If the procedure goes to step 2340, this means that both the type 0 SRS and PUSCH transmissions are scheduled in sf [x] and the eNB knows that the UE is transmitting the PUSCH but does not know whether the UE is transmitting the type 0 SRS. For example, the eNB does not know whether the UE detects the expiry of the Active Time so as to transmit only the PUSCH or does not detect yet so as to transmit both the PUSCH and type 0 SRS. The UE knows that if the sf [x] falls in Active Time it is necessary to send both the PUSCH and type 0 SRS already before 4 subframes. Accordingly, if sf [x−4] falls in the Active Time, it is preferred to preventing the eNB from doing double decoding by transmitting both the PUSCH and type 0 SRS simultaneously at sf [x] in consideration that the probability in which sf [x] falls in Active time is greater than the probability in which sf [x] falls in non-active time. Also, it is preferred that if sf [x−4] falls in Active Time the eNB also performs decoding under the assumption that the UE transmits both the PUSCH and type 0 SRS simultaneously regardless whether sf [x] falls in Active Time. The UE determines whether the PUSCH is transmitted on the SRS frequency band or non-SRS frequency band at step 2340. For example, if the PUSCH transmission resource is allocated on the non-SRS transmission band 2430, the procedure goes to step 2355 and, otherwise if the PUSCH transmission resource is overlapped with the SRS transmission band 2425 at least in part, step 2350.

The UE transmits PUSCH through all the symbols with the exception of the last symbol in which type 0 SRS transmission is performed on the best effort basis. Since the PUSCH transmission is scheduled on the type 0 SRS transmission band, the PUSCH transmission is performed in all the symbols with exception of the last symbol regardless whether the UE transmits type 0 SRS or not and thus the eNB does not need to perform double decoding to receive the PUSCH.

If the procedure goes to step 2355, this means that although the SRS should not be because sf [x] does not fall in Active Time the UE may know this or not. If the expiry of the Active Time is recognized, the UE transmits PUSCH even in the last symbol and, otherwise, SRS instead of PUSCH. This is the reason for the eNB to perform double decoding to prepare for both the cases. In order to avoid this, the present invention proposes transmitting PUSCH and SRS simultaneously regardless whether sf [x] falls in Active time or not because sf [x] is likely to fall in Active Time if sf [x−4] falls in Active Time. Accordingly, the UE transmits PUSCH in the symbols with the exception of the last symbol in which SRS is transmitted.

Figure 26:
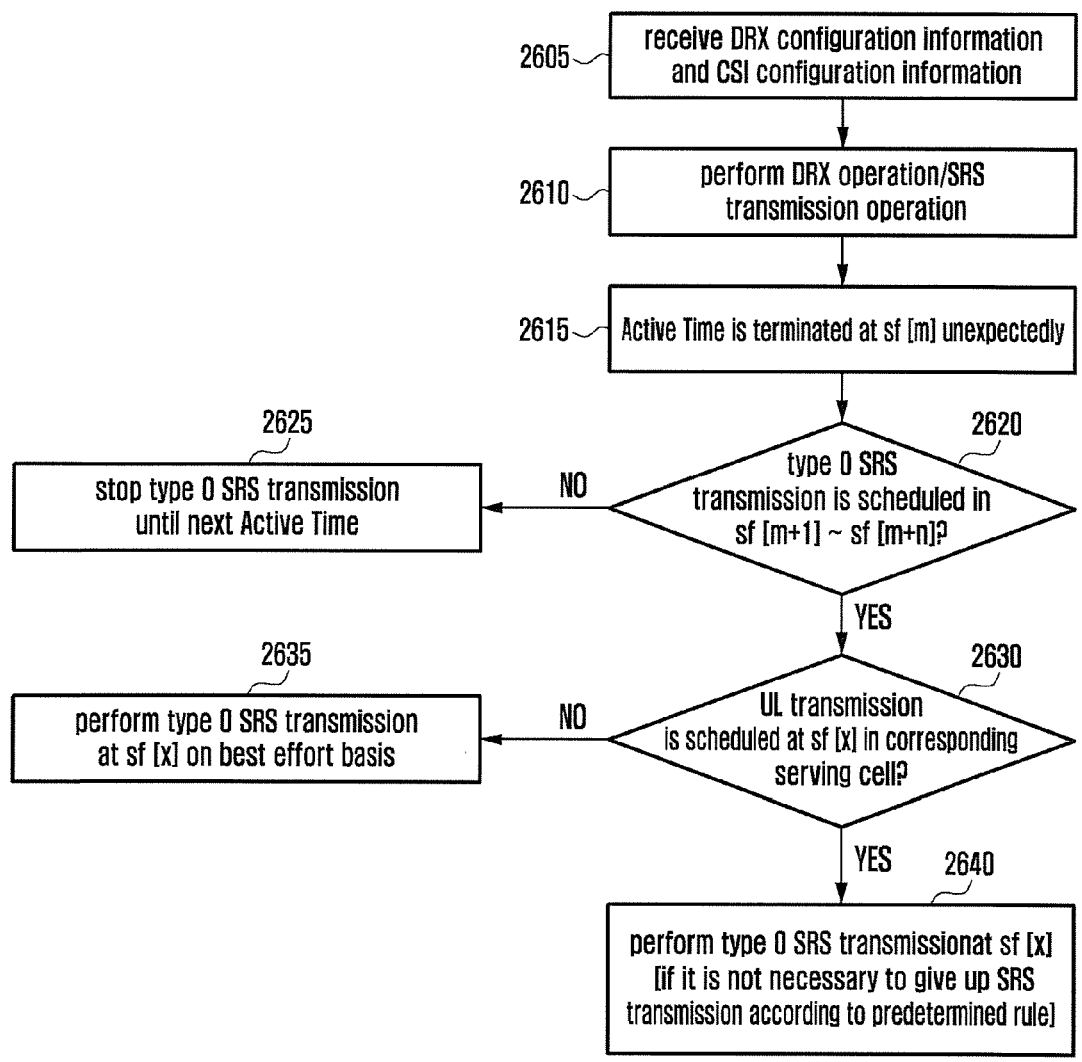
FIG. 26 is a flowchart illustrating another UE operation of determining whether to transmit SRS according to the seventh embodiment.

In sf [x], other uplink signal such as Scheduling Request (SR) may be scheduled along with PUSCH and AN. If a plurality of serving cells is configured, the PUSCH or SRS of other serving cells may be scheduled in sf [x]. At this time, the SR transmission also may influence the SRS transmission of the PCell. Meanwhile, the PUSCH or SRS transmission of a serving cell other than PCell does not influence the SRS transmission of the PCell. FIG. 26 shows the UE operation thereof.

Step 2605 is similar to step 2305. At step 2605, however, it is different that the SR transmission resource information may be configured to the UE. SR is the signal for the UE to request the eNB for transmission resource allocation. The eNB may allocate the resource for transmitting 1-bit SR to the UE in PUCCH region and, if new data with a high priority occurs, the UE transmits the SR using the SR transmission resource configured in the PUCCH region.

Step 2610 is identical with step 2310.

Step 2615 is identical with step 2315.

The UE determines whether at least one type 0 SRS transmission is scheduled in a predetermined number of subframes after the Active Time is terminated unexpectedly at step 2620. If no type 0 SRS transmission is scheduled in any serving cell, the UE suspends type 0 SRS transmission to the next Active Time at step 2625. If there is at least one serving cell in which type 0 SRS transmission is scheduled, the procedure goes to step 2630.

Step 2625 is identical with step 2325.

The UE determines whether other uplink transmission is scheduled in the serving cell in which type 0 SRS transmission is scheduled at sf [x] at step 2630 and, if so, the procedure goes to step 2640 and, otherwise, step 2635. If the serving cell in which type 0 SRS transmission is scheduled is the PCell, the other uplink transmission includes the PCell PUSCH transmission and PUCCH transmission including CQI. If the serving cell in which type 0 SRS transmission is scheduled is an SCell, the other uplink transmission means PUSCH transmission in the corresponding SCell.

Step 2635 is identical with step 2335.

If the procedure goes to step 2640, this means that the UE has to perform other uplink transmission along with type 0 SRS transmission at sf [x] in the corresponding serving cell. Typically, the other uplink transmission is scheduled before at least 4 subframes, the UE knows at sf [x−4] already that the type 0 SRS transmission and other uplink transmission have to be performed simultaneously. If sf [x−4] falls in Active Time, sf [x] is also likely to fall in Active Time. Accordingly, the UE prepares for the procedure for transmitting type 0 SRS and other uplink signal of the serving cell in advance at sf [x−4]. In more detail, if the serving cell is the PCell, the UE selects a transmission format capable of transmitting the type 0 SRS and other uplink signal simultaneously. Depending on the case, if it is impossible to perform the simultaneous transmission, it may be possible to give up the type 0 SRS transmission according to a predetermined rule. For example, if PUSCH transmission is scheduled but no PUCCH transmission format capable of simultaneous transmission of PUCCH and SRS is configured, the UE may give up SRS transmission and transmit PUCCH. If it is not the case to give up the SRS transmission according to the predetermined rule, the UE transmits type 0 SRS and PUSCH simultaneously. If the serving cell is an SCell, the UE transmits type 0 SRS and PUSCH simultaneously. That is, the UE transmits PUSCH in the symbols without exception of the last symbol in which type 0 SRS is transmitted.

Figure 33:
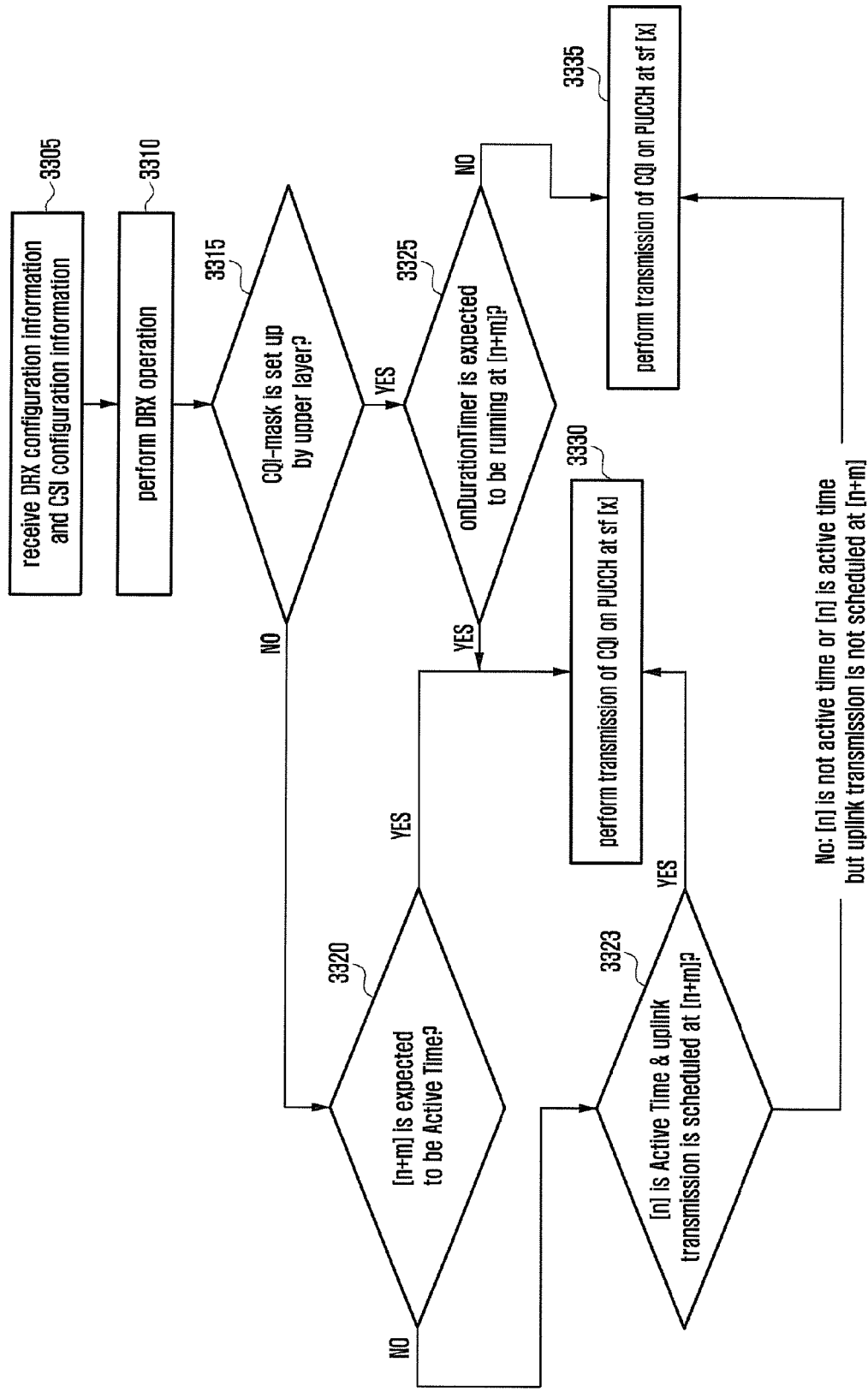
FIG. 33 is a flowchart illustrating another UE operation of determining whether to transmit CQI according to the seventh embodiment.

FIG. 33 shows another UE operation.

Typically, the UE transmits CSI on PUCCH during the Active Time, the eNB may send the UE an RRC control message having a bit called cqi-Mask to instruct the UE to transmit CSI on PUCCH only in onDuration for more efficient PUCCH transmission resource management.

Here, onDuration occurs in every short DRX cycle or long DRX cycle according to the DRX cycle at the corresponding time point. Accordingly, the UE has to know the DRX cycle at the corresponding time point is the short DRX cycle of the long DRX cycle correctly. However, the UE may fail to check the DRX cycle correctly. For example, if the DRX cycle is changed from the long DRX cycle to the short DRX cycle at a time point unexpectedly or in a situation where the short DRX cycle is maintain due to an event occurring at subframe [n−m] (m is small enough) although the UE has predicted the change to the long DRX cycle at subframe [n], onDuration may occur or disappear due to the unexpected event. At this time, the UE may fail transmitting CSI on PUCCH in the new onDuration or cancelling CSI on PUCCH transmission in the abruptly disappeared onDuration.

In order to overcome the above problem, the present invention proposes a method for controlling transmission of CSI on PUCCH depending on whether onDuration is determined at the time before m subframes other than controlling the transmission of CSI on PUCCH in the actual onDuration. In this way, when the onDuration occurs or disappears unexpectedly, the UE and the eNB predict the transmission of CSI on PUCCH correctly. Here, m may be 4.

Step 3305 is similar to step 2205. At step 3305, however, it is different that a CQI-mask may be set up to the UE. If the CQI-mask is set up, the UE transmits CQI on PUCCH only in the onDuration with some exceptional situations. If no CQI-mask is set up, the UE transmits CQI in the Active Time with some exceptional situations.

The UE performs a normal DRX operation at step 3310. The UE determines whether CSI on PUCCH is present at in sf [n] at step 3315.

At step 3315, the UE determines whether a CQI-mask is set up (whether the CQI-mask is set up by the upper layer in view of the MAC entity).

If no CQI-mask is set up, the procedure goes to step 3320.

If the CQI-mask is set up, the procedure goes to step 3325.

The UE determines whether sf [n+m] falls in Active Time at step 3320. If so, the procedure goes to step 3330. Otherwise, the procedure goes to step 3323. If it is predicted at sf [n] that sf [n+m] falls in Active Time, this means the following cases.

drx-InactivityTimer is running at sf [n] and ongoing drx-InactivityTimer is not expired onDurationTimer is running at sf [n+m] when current or near-future DRX cycle (before sf [n+m]) is applied It is necessary to check PDCCH indicating adaptive retransmission at sf [n+m] in consideration of ongoing HARQ operation It is possible for HARQ retransmission Timer is running at sf [n+m]

It is necessary to monitor PDCCH at sf [n+m] for random access procedure

If the procedure goes to step 3323, this means that it is predicted that sf [n+m] does not fall in Active Time. However, if it is Active Time and sf [n+m] falls in Active time unexpectedly, this may cause the aforementioned problem in which the UE may not prepare the Active Time occurring abruptly and thus, if HARQ A/N or SR on PUCCH or PUSCH transmission is scheduled at sf [n+m], the UE transmits CSI on PUCCH to prevent the eNB from being compelled to perform double decoding. Accordingly, the UE determines whether sf [n] falls in Active Time and any uplink transmission such as HARQ A/N, SR, and PUSCH is scheduled in the corresponding serving cell at sf [n+m] at step 3323. If both the two conditions are fulfilled, the procedure goes to step 3330. If at least one of the two condition is not fulfilled, i.e. if sf [n] does not fall in Active Time or if no other uplink transmission is scheduled in sf [n+m] although sf [n] falls in Active time, the procedure goes to step 3335. If whether sf [n+m] falls in Active Time is determined at sf [n], the prediction reliability is very high although not perfect. The more important thing is that the UE and the eNB make the same decision on transmission of CSI on PUCCH by determining whether a subframe falls in Active Time before m subframes in advance.

The UE determines whether sf [n+m] falls in Active Time at step 3325. That is, the UE determines whether the onDurationTimer is running at sf [n+m] when the DRX cycle predicted to be applied in the near future. If so, the procedure goes to step 3330 and, otherwise, step 3335.

At step 3335, the UE does not transmit CSI on PUCCH although the CSI on PUCCH is scheduled at sf [n+m].

At step 3330, if CSI on PUCCH is scheduled at sf [n+m], the UE transmits CSI on PUCCH.

Figure 34:
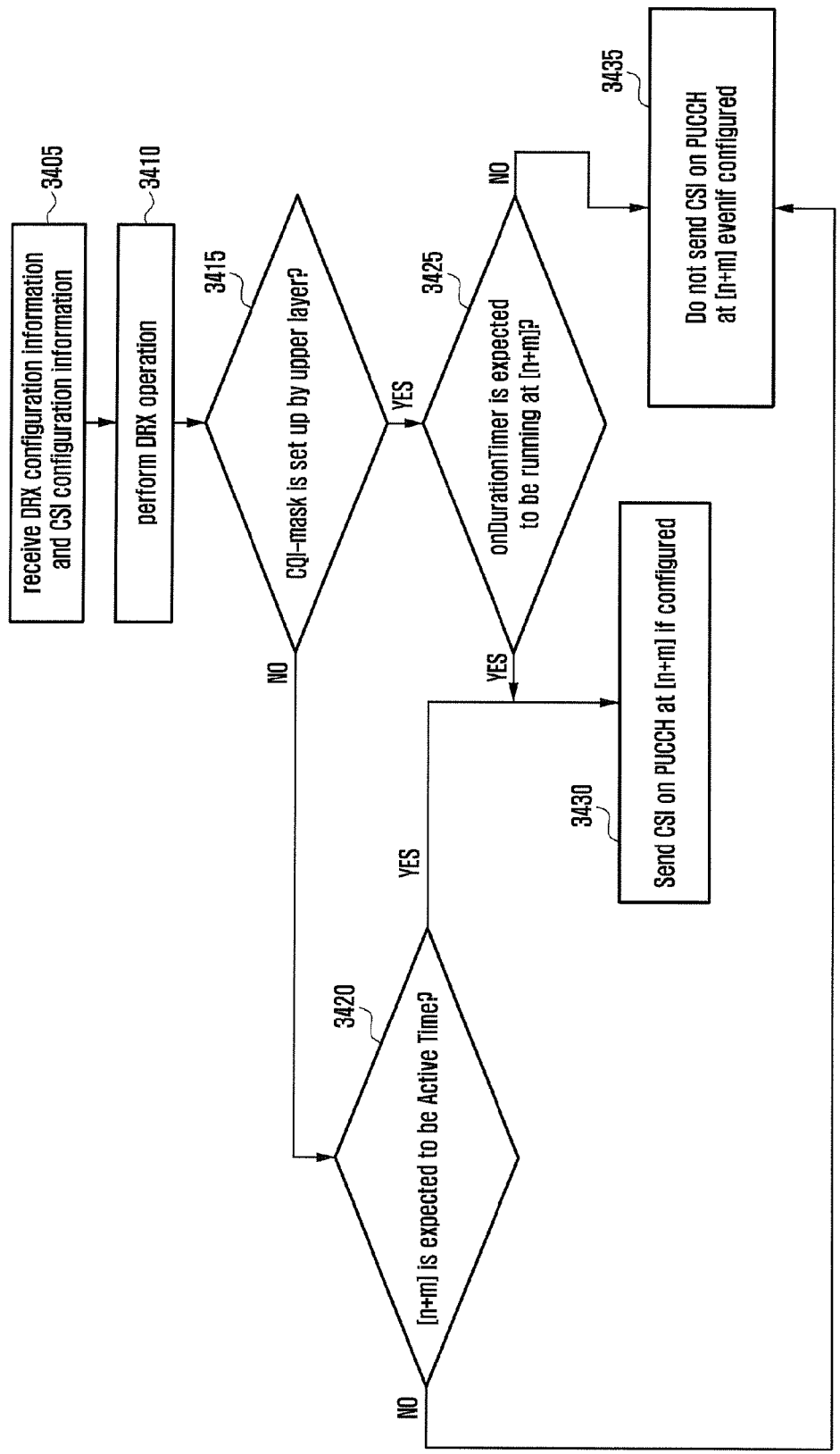
FIG. 34 is a flowchart illustrating another UE operation of determining whether to transmit CQI according to the seventh embodiment.

FIG. 34 shows the UE operation simplified by modifying FIG. 33 a little.

Step 3405 is identical with step 3305.
Step 3410 is identical with step 3310.
Step 3415 is identical with step 3315.

If it is predicted that sf [n+m] falls in Active Time at step 3420, the procedure goes to step 3430 and, otherwise, step 3435. That is, whether to transmit CSI on PUCCH at current subframe is determined depending on the UE prediction, made before m subframes, about whether the current subframe falls in Active Time.

If CSI on PUCCH is scheduled in sf [n+m], the UE transmits CSI on PUCCH at step 3430.

At step 3435, the UE does not transmit CSI on PUCCH at sf [n+m]. That is, if it is determined before m subframes that the current subframe does not fall in Active Time, the UE does not transmit CSI on PUCCH although sf [n+m] falls in Active Time and CSI on PUCCH is scheduled therein actually.

The UE determines whether sf [n+m] falls in onDuration at step 3425. The UE determines whether the onDurationTimer is running at sf [n+m] when the DRX cycle predicted to be applied in the near feature. If so, the procedure goes to step 3335 and, otherwise, step 3330. If it is determined that the onDurationTimer is running at sf [n+m] when the DRX cycle applied at sf [n] is applied, the procedure goes to step 3440. If it is determined that the onDurationTimer is not running at sf [n+m], the procedure goes to step 3435. That is, if it is predicted at sf [n] that sf [n+m] falls in onDuration, the procedure goes to step 3430 and, otherwise, step 3435.

The start time of the onDurationTimer is determined by following equation, and the size of the onDurationTimer is configured by the eNB to the UE.

In the case that the short DRX cycle is applied, the onDurationTimer starts at the subframe fulfilling the following equation.

$$[(SFN*10)+\text{subframe number}] \bmod (\text{shortDRX-Cycle}) = (\text{drxStartOffset}) \bmod (\text{shortDRX-Cycle})$$

In the case that the long DRX cycle is applied, the onDurationTimer starts at the subframe fulfilling the following equation.

$$[(SFN*10)+\text{subframe number}] \bmod (\text{longDRX-Cycle}) = \text{drxStartOffset:}$$

At step 3430, if CSI on PUCCH is scheduled in sf [n+m], the UE transmits the CSI on PUCCH.

At step 3435, the UE does not transmit CSI on PUCCH at sf [n+m]. That is, if it is determined before m subframes that the current subframe does not fall in onDuration, the UE does not transmit CSI on PUCCH although sf [n+m] falls in onDuration and CSI on PUCCH is scheduled therein actually. If CSI on PUCCH is not transmitted, this may include dropping scheduled CSI on PUCCH.

Eighth Embodiment

The present invention relates to a method and apparatus for transmitting an RLF report including useful UTRAN cell information to the E-UTRA cell. Particularly, the present invention proposes a method for the UE to determine to store the useful UTRAN cell information as the RLF report information in consideration of a specific condition.

Researches are being conducted on the cell service area optimization in the LTE (E-UTRA) standard under the name of Mobility Robust Optimization (MRO). In the MRO issue, consideration is taken to other Radio Access Technologies such as UMTS (UTRAN) as well as the service area of LTE cell.

The RLF report is the Information Element (IE) reporting diverse informations which the UE has recorded in RLF situation to the eNB. In MRO, the RLF report is used in optimizing the cell service area. In the conventional technology, the RLF report includes the informations as follows.

TABLE 2

```
RLF-Report-r9 ::=                         SEQUENCE {
    measResultLastServCell-r9                 SEQUENCE {
        rsrpResult-r9                                 RSRP-Range,
        rsrqResult-r9                                 RSRQ-Range         OPTIONAL
    },
    measResultNeighCells-r9                   SEQUENCE {
        measResultListEUTRA-r9
            MeasResultList2EUTRA-r9                   OPTIONAL,
        measResultListUTRA-r9
            MeasResultList2UTRA-r9                    OPTIONAL,
        measResultListGERAN
            MeasResultListGERAN                       OPTIONAL,
        measResultsCDMA2000-r9
            MeasResultList2CDMA2000-r9                OPTIONAL
    }                                         OPTIONAL,
    ...,
    [[   locationInfo-r10                             LocationInfo-r10      OPTIONAL,
        failedPCellId-r10                             CHOICE {
            cellGlobalId-r10
                CellGlobalIdEUTRA,
            pci-arfcn-r10
```

TABLE 2-continued

```
SEQUENCE {
                physCellId-r10
    PhysCellId,
                carrierFreq-r10
    ARFCN-ValueEUTRA
            }
        }
                                  OPTIONAL,
        reestablishmentCellId-r10    CellGlobalIdEUTRA
    OPTIONAL,
        timeConnFailure-r10          INTEGER
(0..1023)       OPTIONAL,
        connectionFailureType-r10    ENUMERATED {rlf, hof}
    OPTIONAL,
        previousPCellId-r10          CellGlobalIdEUTRA
            OPTIONAL
    ]]
}
```

TABLE 3 connectionFailureType

This field is used to indicate whether the connection failure is due to radio link failure or handover failure.
failedPCellId This field is used to indicate the PCell in which RLF is detected or the target PCell of the failed handover.
measResultLastServCell This field refers to the last measurement results taken in the PCell, where radio link failure happened.
previousPCellId This field is used to indicate the source PCell of the last handover (source PCell when the last RRC-Connection-Reconfigurationmessageincludingmobility ControlInfowasreceived).
reestablishmentCellId This field is used to indicate the cell in which the re-establishment attempt was made after connection failure.
timeConnFailure This field is used to indicate the time elapsed since the last HO initialization until connection failure. Actual value = IE value * 100 ms. The maximum value 1023 means 102.3 s or longer.

Among the informations, previousPCellID and reestablishmentCellId are identifiers of specific cell at the time when RLF has occurred. The previousPCellId is the Evolved Cell Global Identifier (ECGI) value of the PCell to which the UE is handed over lastly. Meanwhile, the reestablishmentCellId is the ECGI value of the cell to which the UE has tried reestablishment after RLF. These cell informations are reported to the E-UTRA eNB for use in cell service area optimization.

All of the cell informations are restricted to the E-UTRA cell. Accordingly, the informations on the cell belonging to different RATs such as UTRAN cell are not associated. Actually, the handover occurs frequently between mobile communication systems. This is referred to as inter-RAT handover. Accordingly, it is necessary to consider other RATs in optimizing the cell service area. It is also required to modify the RLF report restricted to the E-UTRA cell information so as to include the UTRAN cell information necessary in the optimization procedure, thereby optimizing the cell service area more inclusively.

In the present invention, two useful UTRAN cell informations are introduced, and the UE operation of including these informations in the RLF report. The two useful UTRAN cell informations are as follows.

1) selectedUTRA-CellID

This UTRAN cell information is the identifier of the UTRAN to which the UE tries to attach after RLF occurrence in the E-UTRA cell.

2) previousUTRA-CellID

This UTRAN cell information is the identifier of the UTRAN cell which has served the UE before the inter-RAT handover to the E-UTRA cell.

Among the above UTRAN cell informations, the UTRAN cell id may be included in the RLF report in the form of global cell identifier or physical cell identifier of the UTRAN cell. One of the two formats may be applied according to a predetermined rule. For example, if it fails to acquire the global cell identifier of the UTRAN cell, the UE may include the physical cell identifier in the RLF report instead. Or if possible, may include both the global cell identifier and physical cell identifier in the RLF report.

The necessity of UTRAN cell information and UE operation of including the cell information in the RLF report are described in different embodiments in detail.

In this embodiment, a description is made of scenario related to the necessity of cell information selectedUTRA-CellID. Particularly, the condition and UE operation for including the cell information in the RLF report are proposed.

Figure 27:
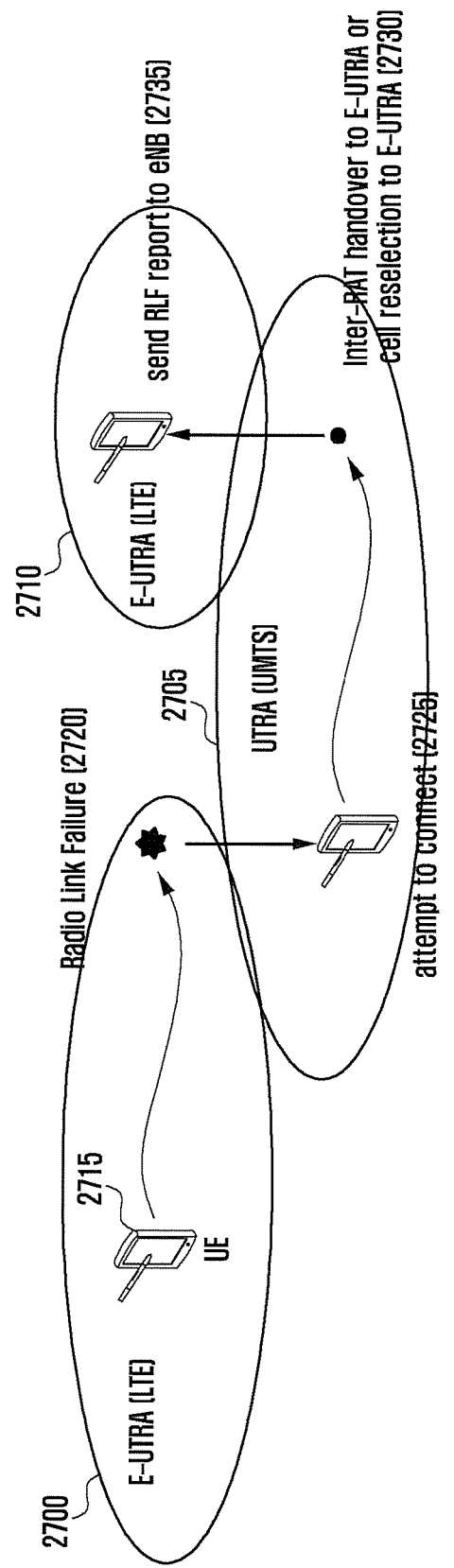
FIG. 27 is a diagram illustrating a scenario related to the cell information selectedUTRA-CellID.

FIG. 27 is a diagram illustrating a scenario related to the cell information selectedUTRA-CellID.

The UE 2715 connected to the E-UTRA 2700 experiences RLF 2720 and performs RRC Connection Reestablishment. At this time, the UE performs measurement and records the aforementioned informations at the RLF occurrence time. The UE selects the UTRAN cell 2705 as the cell suitable for attachment and attempts connection at step 2725. The UE performs inter-RAT handover to the E-UTRA cell 2710 in the connected mode or cell reselection process to the E-UTRA cell in the idle mode at step 2730. The UE connected in the E-UTRA cell reports RLF to the E-UTRA cell at step 2735. At this time, if the UTRAN cell id of the UTRAN cell 2705 to which the UE attempts connection after RLF occurrence in the E-UTRA cell 2700 is further added as the RLF report information, it is possible to identify the potential UTRAN cell around at the RLF occurrence time. It is also possible to determine whether the UE is connected to the E-UTRA cell or UTRAN cell after the RLF. This is the information very useful in the procedure of optimizing the cell service area afterward. For example, it is possible to check the service coverage hole of the E-UTRA cell and whether the coverage hole is covered by the service area of the UTRAN cell.

Figure 28:
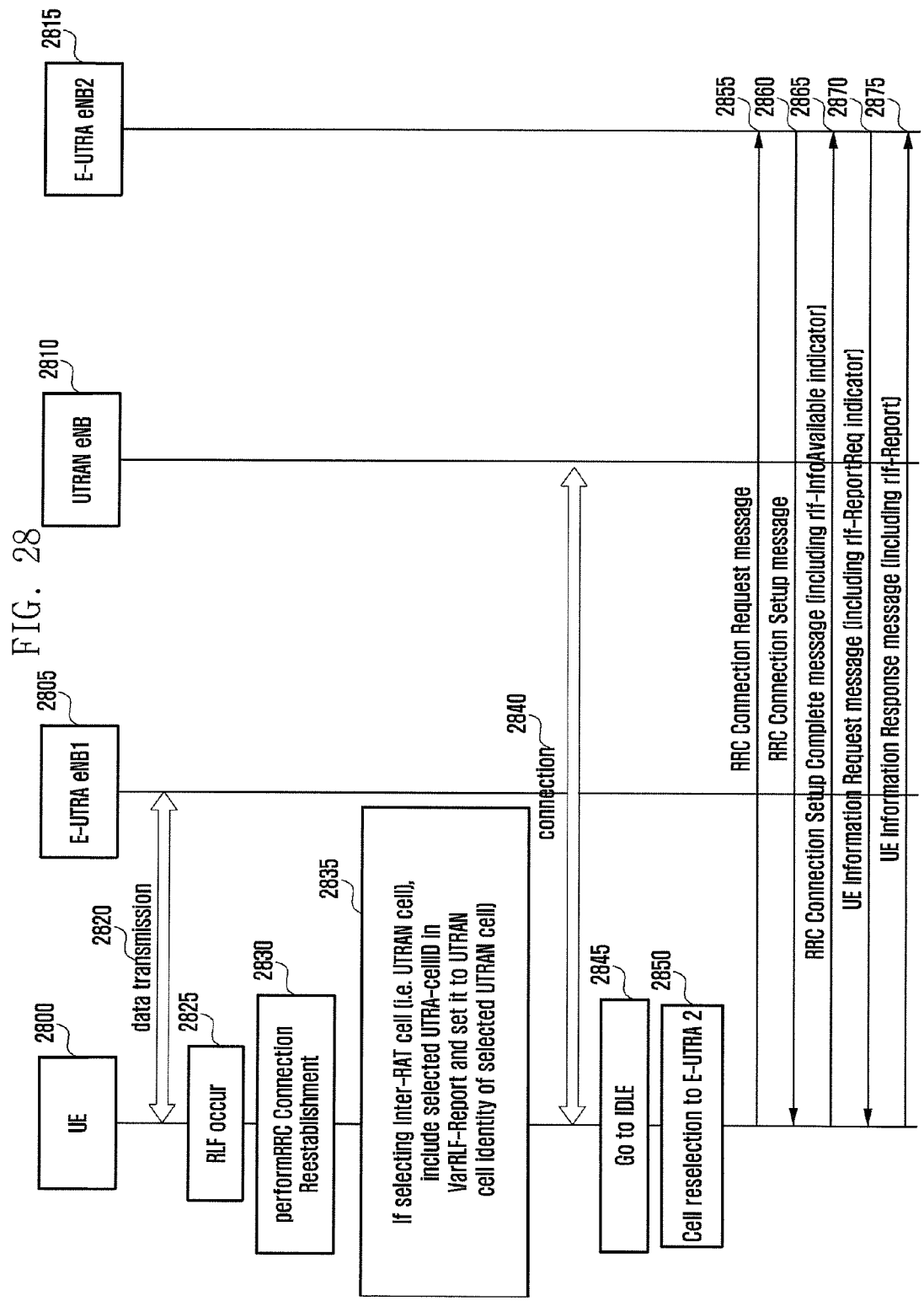
FIG. 28 is a signal flow diagram illustrating a procedure of including the cell information selectedUTRA-CellID.

FIG. 28 is a signal flow diagram illustrating a procedure of including the selectedUTRA-CellID.

In the course of data communication with the E-UTRA 2805 at step 2820, the UE 2800 experiences RLF at step 2825. The UE performs RRC Connection Reestablishment at step 2830. If an inter-RAT cell (i.e., UTRAN cell) is selected as the cell to attempt connection, the UE stores the UTRAN cell id of the selected UTRAN cell as RLF report information at step 2835. The UE connects to the UTRAN cell at step 2840. The UE ends the communication and enters the idle mode at step 2845. The UE performs sell reselection to the E-UTRA cell at step 2850. The UE attempts connection to the E-UTRA cell and sends the eNB an RRC Connection Request message at step 2855. The UE receives an RRC Connection Setup message from the eNB at step 2860. The UE sends the eNB an RRC Connection Complete message including an indicator rlf-InfoAvailable to notify the eNB whether the UE has RLF report at step 2865. This indicator is included only when the RPLMN of the current serving cell belongs to the RPLMN list or ePLMN list at the RLF occurrence time. The UE receives a UE Information Request message including an indicator rlf-ReportReq at step 2870. If this indicator is included, the UE has to send the eNB the RLF report. The UE sends the eNB the RLF report using a UE Information Response message at step 2875.

Figure 29:
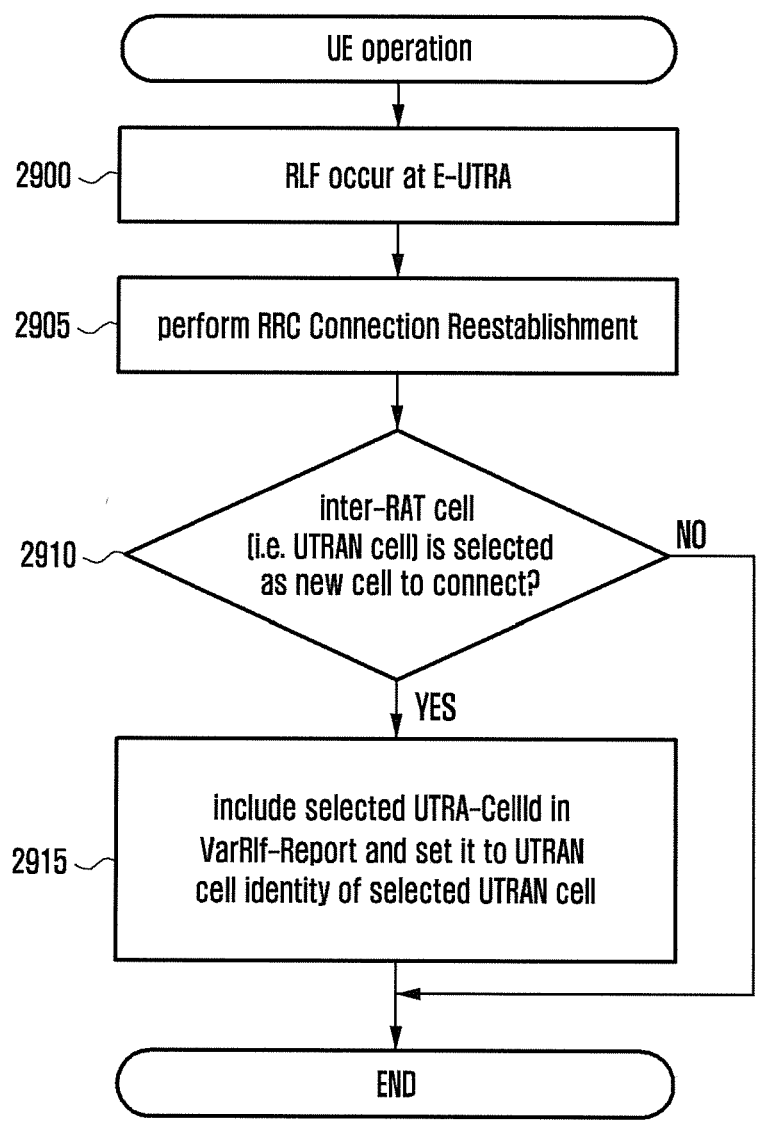
FIG. 29 is a flowchart illustrating the UE operation of including the cell information selectedUTRA-CellID.

FIG. 29 is a flowchart illustrating the UE operation of including the cell information selectedUTRA-CellID.

The UE experiences RLF in the connected E-UTRA at step 2900. The UE performs RRC Connection Reestablishment at step 2905. The UE determines whether an inter-RAT cell (i.e., UTRAN cell) is selected as a new cell to connect at step 2910. If so, the UE stores the UTRAN cell id of the selected UTRAN cell as RLF report information at step 2915.

Ninth Embodiment

A description is made of the scenario related to the necessity of the cell information selectedUTRA-CellId in this embodiment. Particularly, the condition and UE operation of including the cell information in the RLF report are proposed.

Figure 30:
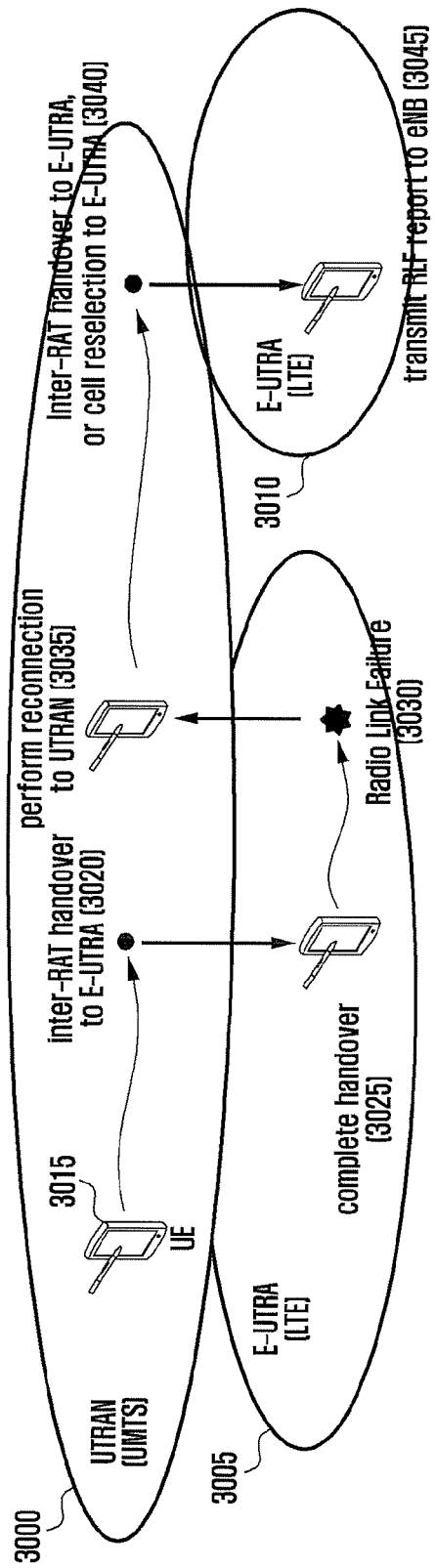
FIG. 30 is a diagram illustrating a scenario related to the cell information previousUTRA-CellID.

FIG. 30 is a diagram illustrating a scenario related to the cell information previousUTRA-CellId.

The UE 3015 connected to the UTRAN 3000 performs inter-RAT handover to an E-UTRA cell at step 3020. The UE completes the inter-RAT handover to the E-UTRA at step 3025. However, the UE experiences RLF not long after at step 3030 and performs RRC Connection Reestablishment. At this time, the UE performs measurement and records the aforementioned informations. The UE connects to the UTRAN cell again at step 3035. Afterward, the UE performs inter-RAT handover to the E-UTRA cell 3010 in the connected mode or the cell reselection procedure to the E-UTRA cell in the idle mode at step 3040. The UE connected to the E-UTRA cell reports RLF to the E-UTRA cell at step 3045. At this time, if the UTRAN cell id of the UTRAN cell 3000 to which the UE attempts connection after RLF occurrence in the E-UTRA cell 3005 is further added as the RLF report information, it is possible to transfer the RLF report information to the UTRAN cell 3000. The RLF report information transferred to the UTRAN cell can be used for solving the mobility problem in the UTRAN cell. In this scenario, the main cause of the RLF is the inter-RAT handover from the UTRAN cell to the E-UTRA cell is performed too fast (i.e. too early handover).

Figure 31:
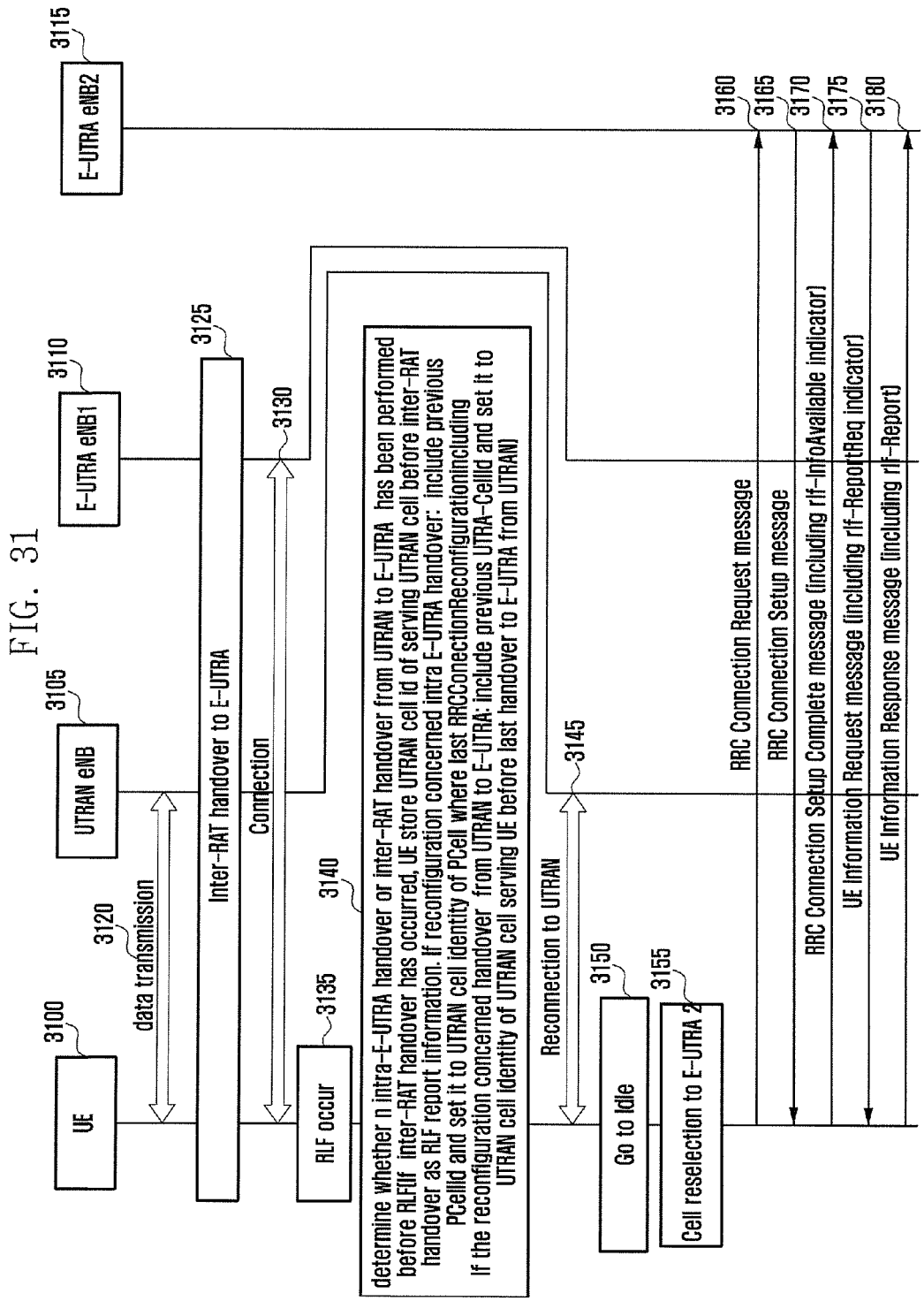
FIG. 31 is a signal flow diagram illustrating a procedure of including the cell information previousUTRA-CellID.

FIG. 31 is a signal flow diagram illustrating a procedure of including the cell information previousUTRA-CellID.

In the course of data communication with the UTRAN 3105 at step 3120, the UE 3100 performs inter-RAT handover to the E-UTRA cell at step 3125. The UE completes the inter-RAT handover at step 3130 and then experience RLF immediately at step 3135. The UE determines whether an intra-E-UTRA handover or inter-RAT handover from UTRAN to E-UTRA has been performed before the RLF at step 3140. If the inter-RAT handover has occurred, the UE stores the UTRAN cell id of the serving UTRAN cell 3105 before the inter-RAT handover as the RLF report information. Otherwise, the UE stores the legacy previousPCellId. The UE connects to the UTRAN cell again at step 3145. The UE completes the communication and enters the idle mode at step 3150. The UE performs cell reselection to the E-UTRA cell at step 3155. The UE attempts connection to the E-UTRA cell by transmitting an RRC Connection Request message at step 3160. The UE receives an RRC Connection setup message from the eNB at step 3165. The UE sends the eNB an RRC Connection Setup Complete message including and indicator rlf-InfoAvailable to notify the eNB that the UE has the RLF report at step 3170. This indicator is included only when the RPLMN of the current serving cell belongs to the RPLMN list or ePLMN list at the RLF occurrence time. the UE receives a UE Information Request message including the indicator rlf-ReportReq at step 3175. If this indicator is included, the UE has to send the RLF report to the eNB. the UE sends the eNB the RLF report using a UE Information Response message at step 3180.

Figure 32:
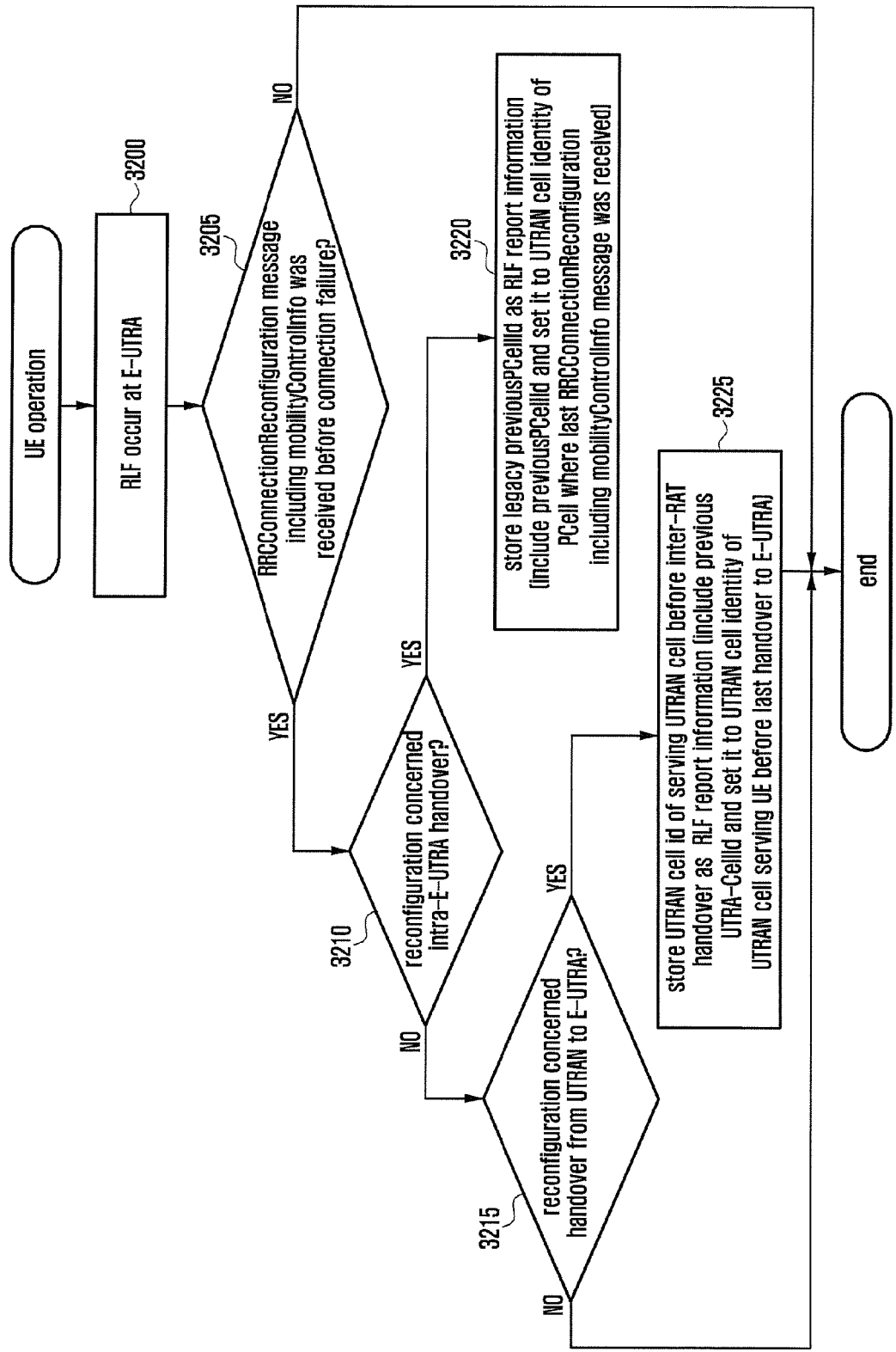
FIG. 32 is a flowchart illustrating the UE operation of including the cell information previousUTRA-CellID.

FIG. 32 is a flowchart illustrating the UE operation of including the cell information previousUTRA-CellID.

The UE experiences RLF in the connected E-UTRA cell at step 3200. The UE determines whether the RRC Connection Reconfiguration message including a mobilityControlInfo IE from the eNB before the RLF occurrence at step 3205. If so, the UE determines whether the reconfiguration message is of instructing to perform intra-E-UTRA handover at step 3210. If so, the UE stores the legacy previousPCellId as the RLF report information at step 3220. Otherwise, the UE determines whether the reconfiguration message is of instructing to perform inter-RAT handover from UTRAN to E-UTRA at step 3215. If so, the UE stores the UTRAN cell id of the serving UTRAN cell before the inter-RAT handover as the RLF report information at step 3225.

Figure 14:
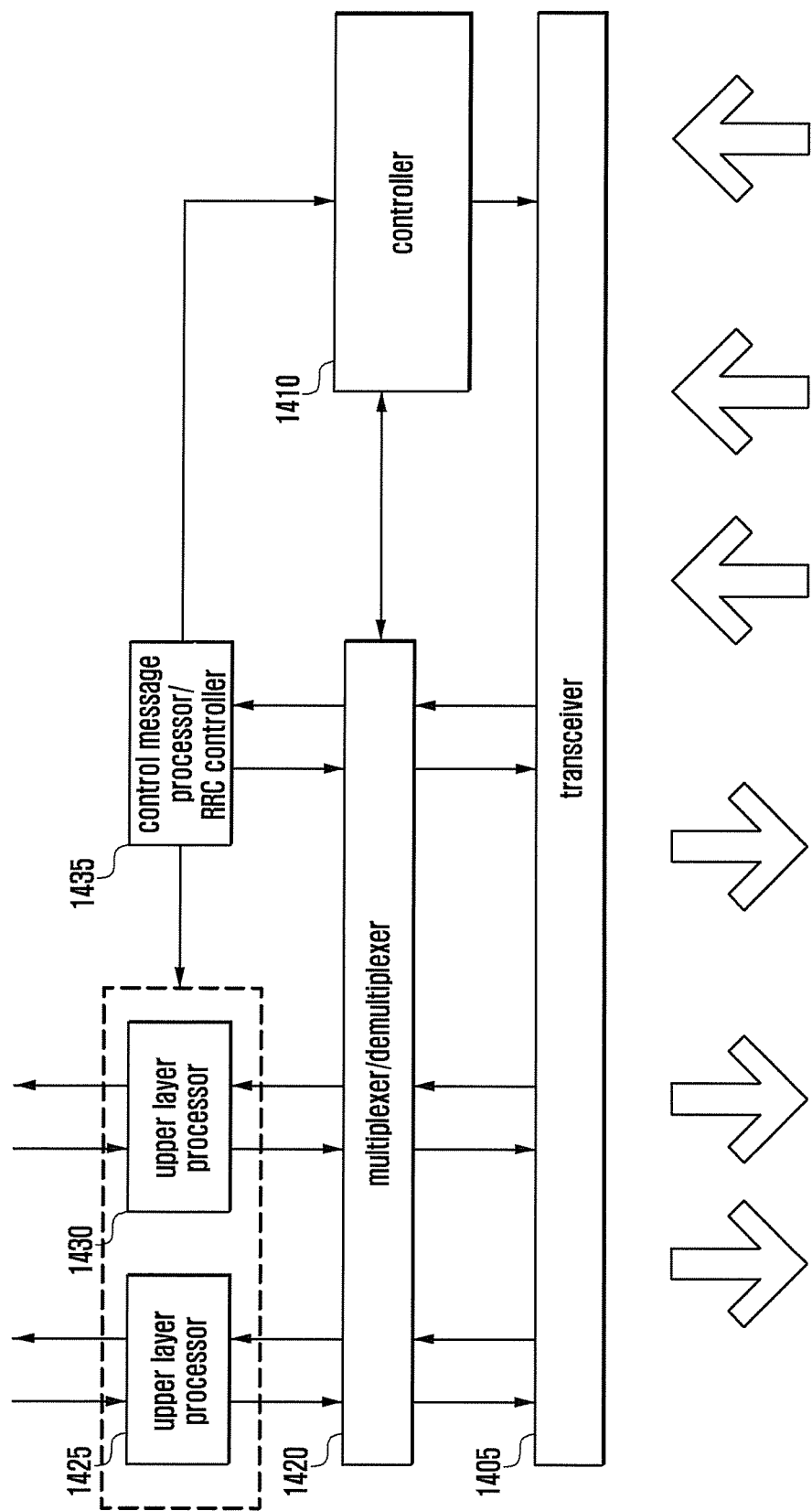
FIG. 14 is a block diagram illustrating a configuration of the UE according to an embodiment of the present invention.

FIG. 14 is a block diagram illustrating a configuration of the UE according to an embodiment of the present invention.

Referring to FIG. 14, the UE according to an embodiment of the present invention includes a transceiver 1405, a controller 1410, a multiplexer/demultiplexer 1420, a control message processor/RRC controller 1435, and upper layer processors 1425 and 1430.

The transceiver 1405 is responsible for receiving data and predetermined control signal through a downlink channel of the serving cell and transmitting data and predetermined control signals through an uplink channel. In the case that a plurality of serving cells is configured, the transceiver 1405 transmits and receives data and control signals through the plural serving cells.

The multiplexer/demultiplexer 1420 is responsible for multiplexing data generated by the upper layer processors 1425 and 1430 and the control message processor 1435 or demultiplexing data received by the transceiver 1405 to deliver the demultiplexed data to the upper layer processors 1425 and 1430 and the control message processor 1435.

The control message processor 1430 is an RRC layer entity for processing the control message received from the eNB to takes a necessary action. For example, the control message processor 1430 receives RRC control message and transfers the SCell information and DRX information to the controller. The control message processor also transfers the information on the SCell and TAG to which the SCell belongs to the controller.

The upper layer processor 1425 and 1430 is established per service. The upper layer processor processes the data generated in the user service such as File Transfer Protocol (FPT) and Voice over Internet Protocol (VoIP) and transfers the processed data to the multiplexer/demultiplexer 1420 or processes the data from the multiplexer/demultiplexer 1420 and delivers the processed data to the upper layer service applications. The upper layer processor is made up of an RLC layer entity, a PDCP layer entity, and an IP layer entity.

The control unit 1410 checks the scheduling command, e.g. uplink grants, received through the transceiver 1405 and controls the transceiver 1405 and the multiplexer/demultiplexer 1420 to perform uplink transmission with appropriate transmission resource at an appropriate timing. The controller 1410 measures and reports the SFN offset and determines the SFN of the target cell by applying the indicated SFN offset. The controller controls the operation related to the adaptive retransmission. The controller performs the DRX operation and controls CSI and SRS transmission. The controller also calculates the uplink transmission power and controls to apply an appropriate uplink transmission power. The controller also controls the operations of configuring SCells and activating/deactivating the SCells. The control unit also controls the Radio Frequency Frontend reconfiguration procedure. The control unit controls the TAG configuration procedure.

Figure 15:
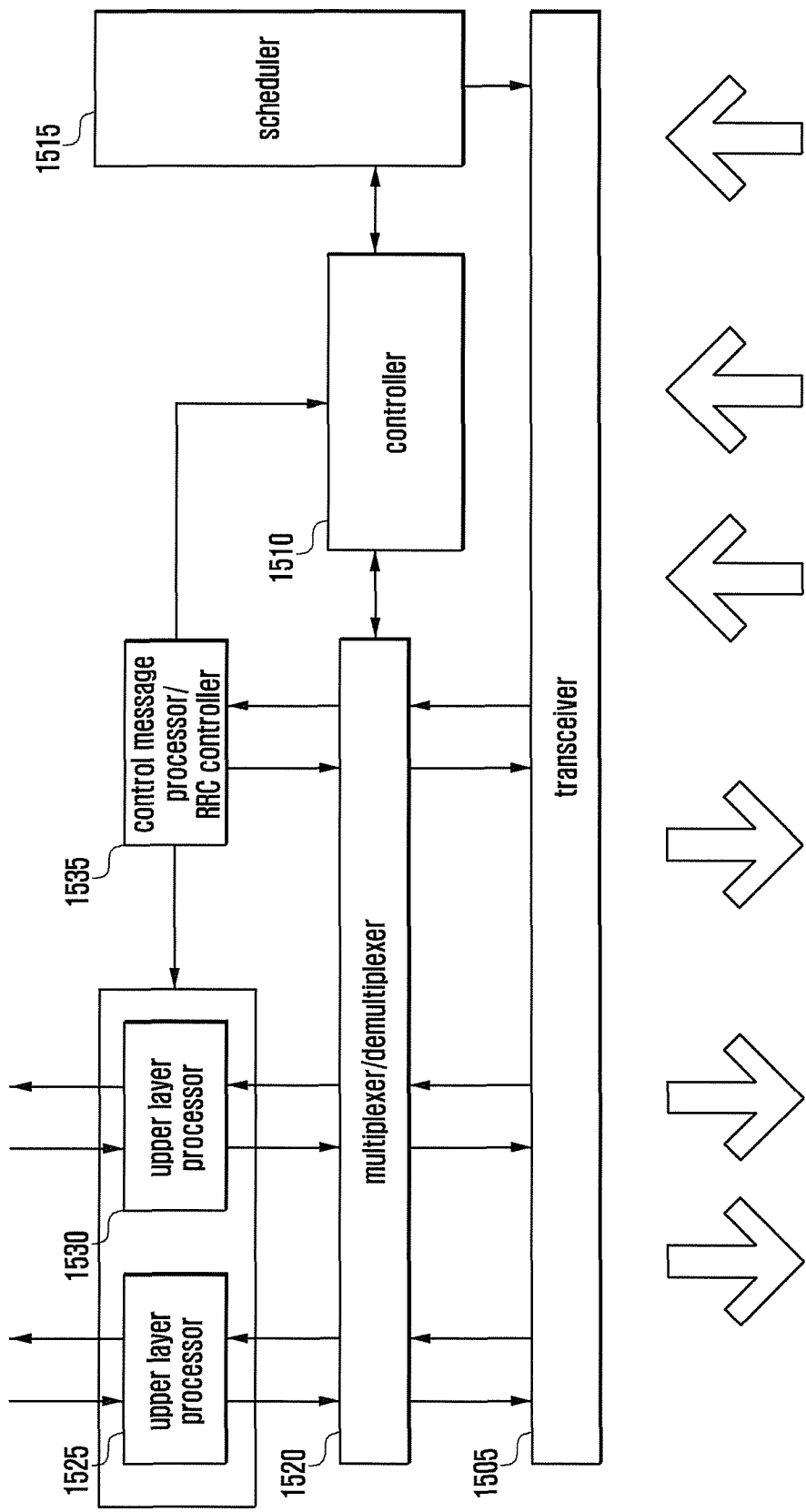
FIG. 15 is a block diagram illustrating a configuration of the eNB according to an embodiment of the present invention.

FIG. 15 is a block diagram illustrating a configuration of the eNB according to an embodiment of the present invention, and the eNB includes a transceiver 1505, a controller 1510, a multiplexer/demultiplexer 1520, a control message processor/RRC controller 1535, upper layer processors 1525 and 1530, and a scheduler 1515.

The transceiver 1505 is responsible for transmitting data and predetermined control signal through a downlink channel and receiving data and predetermined control signals through an uplink channel. In the case that a plurality of carriers is configured, the transceiver 1505 transmits and receives data and control signals through the plural carriers.

The multiplexer/demultiplexer 1520 is responsible for multiplexing data generated by the upper layer processors 1525 and 1530 and the control message processor 1535 or demultiplexing data received by the transceiver 1505 to deliver the demultiplexed data to the upper layer processors 1525 and 1530 and the control message processor 1435. The control message processor 1535 processes the control message transmitted by the UE to take a necessary action or generates a control message addressed to the UE to the lower layer.

The upper layer processor 1455 and 1530 is established per service, processes the data to be transmitted to the S-GW or another eNB into RLC PDU and transfers the RLC PDU to the multiplexer/demultiplexer 1520, and processes the RLC PDU from the multiplexer/demultiplexer 1520 into PDCP SDU to be transmitted to the S-GW or another eNB.

The scheduler allocates transmission resource to the UE at an appropriate timing in consideration of the buffer state and channel condition of the UE and processes the signal transmitted form the UE or to be transmitted to the UE.

The controller controls overall operations of configuring SCells and activating/deactivating the SCells. The controller determines the Active Time of the UE in consideration of the DRX operation of the UE and controls PDCCH transmission and CSI/SRS reception. The controller controls the operation of managing the TAGs. The controller also controls the operation related to SFN offset.

The invention claimed is:

1. A method for transmitting channel state information by a terminal in a communication system, the method comprising:
   receiving configuration information from a base station;
   determining whether a channel quality indicator (CQI) mask is to be setup based on the configuration information;
   if the CQI mask is setup, determining, in a first subframe, whether an on-duration timer (onDurationTimer) is expected to be running in a second subframe;
   if the onDurationTimer is expected to be running in the second subframe, transmitting channel state information in the second subframe; and
   if the onDurationTimer is not expected to be running in the second subframe, causing the channel state information to be not transmitted in the second subframe.

2. The method of claim 1, wherein causing the channel state information to be not transmitted comprises causing the channel state information to be not transmitted even though the base station is configured to transmit the channel state information in the second subframe through an uplink control channel.

3. The method of claim 1, wherein causing the channel state information to be not transmitted comprises dropping a transmission of the channel state information in the second subframe even though the base station is configured to transmit the channel state information in the second subframe through an uplink control channel.

4. The method of claim 1, wherein the configuration information provides an instruction whether to transmit the channel state information only in an on-duration (onDuration) period of a discontinuous reception (DRX) operation.

5. The method of claim 4, wherein the configuration information further comprises information on a DRX cycle and a DRX offset; and
   wherein determining whether the onDurationTimer is expected to be running in the second subframe comprises determining whether the second subframe is included in the on Duration period based on the DRX cycle and the DRX offset.

6. The method of claim 1, further comprising:
   if the CQI mask is not setup, determining, in the first subframe, whether the second subframe is expected to be active time; and
   if the second subframe is expected to be active time, transmitting the channel state information in the second subframe.

7. The method of claim 6, further comprising:
   skipping, if the second subframe is not expected to be active time, a transmission of the channel state information in the second subframe.

8. A terminal to transmit channel state information in a communication system, the terminal comprising:
   a transceiver configured to transmit and receive information to and from a base station; and
   a control unit configured to:
      control receiving configuration information from the base station,
      determine whether a channel quality indication (CQI) mask is to be setup based on the configuration,
      determine in a first subframe, if the CQI mask is setup, whether an on-duration timer (onDurationTimer) is expected to be running in a second subframe, control transmitting, if the onDurationTimer is expected to be running in the second subframe, of channel state information in the second subframe, and control causing, if the onDurationTimer is expected to be not running in the second subframe, the channel state information to be not transmitted in the second subframe.

9. The terminal of claim 8, wherein the control unit is configured to control causing the channel state information to be not transmitted even though the base station is configured to transmit the channel state information in the second subframe through an uplink control channel.

10. The terminal of claim 8, wherein the control unit is configured to control dropping transmission of the channel state information in the second subframe even though the base station is configured to transmit the channel state information in the second subframe through an uplink control channel.

11. The terminal of claim 8, wherein the configuration information provides an instruction whether to transmit the channel state information only in an on-duration (onDuration) period of a discontinuous reception (DRX) operation.

12. The terminal of claim 11, wherein the control unit is configured to control receiving information on a DRX cycle and a DRX offset, and determine whether the second subframe is included in the onDuration period based on the DRX cycle and the DRX offset.

13. The terminal of claim 8, wherein the control unit is configured to:

determine, in the first subframe, if the CQI mask is not setup, whether the second subframe is expected to be active time; and control transmitting, if the second subframe is expected to be active time, the channel state information in the second subframe.

14. The terminal of claim 13, wherein the control unit is configured to control skipping, if the second subframe is not expected to be active time, a transmission of the channel state information in the second subframe.

* * * * *